United States Patent
Cantrell et al.

(10) Patent No.: US 12,536,416 B2
(45) Date of Patent: Jan. 27, 2026

(54) GENERATIVE ARTIFICIAL INTELLIGENCE FOR CONTENT GENERATION WITH SEARCHABLE REPOSITORY

(71) Applicant: Reve AI, Inc., Palo Mill Rd., CA (US)

(72) Inventors: Christian Cantrell, Palo Alto, CA (US); Sam Breed, Palo Alto, CA (US); Nick Nikolov, London (GB); Joe Penna, Palo Alto, CA (US); Alex Peysakhovich, Palo Alto, CA (US); Sam Pullara, Palo Alto, CA (US); Michael Storm, Palo Alto, CA (US); Luke Wroblewski, Palo Alto, CA (US); Amelia Wattenberger, Palo Alto, CA (US)

(73) Assignee: REVE AI, INC., Palo Alto, CA (US)

( * ) Notice: Subject to any disclaimer, the term of this patent is extended or adjusted under 35 U.S.C. 154(b) by 0 days.

(21) Appl. No.: 19/072,823

(22) Filed: Mar. 6, 2025

(65) Prior Publication Data
US 2025/0284936 A1 Sep. 11, 2025

Related U.S. Application Data

(60) Provisional application No. 63/562,662, filed on Mar. 7, 2024.

(51) Int. Cl.
*G06N 3/0475* (2023.01)
(52) U.S. Cl.
CPC ................... *G06N 3/0475* (2023.01)
(58) Field of Classification Search
CPC .............. G06N 3/0475; G06N 3/045
See application file for complete search history.

(56) References Cited

U.S. PATENT DOCUMENTS

| | | | |
|---|---|---|---|
| 4,969,097 A | 11/1990 | Levin | |
| 5,724,457 A | 3/1998 | Fukushima | |

(Continued)

FOREIGN PATENT DOCUMENTS

| | | | |
|---|---|---|---|
| WO | WO-2024145209 A1 | * | 7/2024 |
| WO | WO-2024166446 A1 | * | 8/2024 |

OTHER PUBLICATIONS

Dinan, Emily, et al. "Anticipating safety issues in e2e conversational ai: Framework and tooling." arXiv preprint arXiv:2107.03451v3 (2021). (Year: 2021).*

(Continued)

*Primary Examiner* — Randall K. Baldwin
(74) *Attorney, Agent, or Firm* — Pillsbury Winthrop Shaw Pittman, LLP

(57) ABSTRACT

A system may include a content repository that stores multi-modal content comprising text, visual content, and/or audio content. The system may include a processor programmed to: access a prompt comprising a text query, a visual query comprising text that describes a visual to be found, and/or an audio query comprising text that describes audio to be found, execute a language model based on the prompt to identify content from the content repository, receive, from the language model, a request for a callback function that seeks additional information to satisfy the multi-modal query, execute the callback function to obtain the additional information and provide the additional information to the language model in response to the request for the callback function, re-execute the language model based on the multi-modal query and the additional information, obtain, from the language model, content responsive to the prompt based on the additional information.

20 Claims, 44 Drawing Sheets

(56) References Cited

U.S. PATENT DOCUMENTS

| | | | |
|---|---|---|---|
| 5,805,159 A | 9/1998 | Bertram | |
| 5,864,340 A | 1/1999 | Bertram | |
| 5,959,629 A | 9/1999 | Masui | |
| 6,002,390 A | 12/1999 | Masui | |
| 6,321,158 B1 | 11/2001 | Delorme | |
| 6,337,698 B1 | 1/2002 | Keely, Jr. | |
| 6,675,169 B1 | 1/2004 | Bennett | |
| 7,171,353 B2 | 1/2007 | Trower, II | |
| 7,194,404 B1 | 3/2007 | Babst | |
| 7,387,457 B2 | 6/2008 | Jawerth | |
| 7,447,627 B2 | 11/2008 | Jessee | |
| 7,689,684 B2 | 3/2010 | Donoho | |
| 8,015,482 B2 | 9/2011 | Simova | |
| 8,396,582 B2 | 3/2013 | Kaushal | |
| 10,034,645 B1 | 7/2018 | Williams | |
| 10,719,301 B1 | 7/2020 | Dasgupta | |
| 11,030,485 B2 | 6/2021 | Karam | |
| 11,789,837 B1 | 10/2023 | Jain | |
| 11,907,674 B1 | 2/2024 | Akerlund et al. | |
| 11,972,333 B1* | 4/2024 | Horesh | G06N 3/0475 |
| 11,978,437 B1* | 5/2024 | Thattai | G10L 13/027 |
| 2002/0015042 A1 | 2/2002 | Robotham | |
| 2002/0024506 A1 | 2/2002 | Flack | |
| 2002/0052900 A1 | 5/2002 | Freeman | |
| 2002/0156864 A1 | 10/2002 | Kniest | |
| 2004/0239681 A1 | 12/2004 | Robotham | |
| 2005/0012723 A1 | 1/2005 | Pallakoff | |
| 2005/0195221 A1 | 9/2005 | Berger | |
| 2005/0223308 A1 | 10/2005 | Gunn | |
| 2005/0283364 A1 | 12/2005 | Longe | |
| 2006/0020904 A1 | 1/2006 | Aaltonen | |
| 2006/0026521 A1 | 2/2006 | Hotelling | |
| 2006/0026535 A1 | 2/2006 | Hotelling | |
| 2006/0026536 A1 | 2/2006 | Hotelling | |
| 2006/0088356 A1 | 4/2006 | Jawerth | |
| 2006/0095842 A1 | 5/2006 | Lehto | |
| 2006/0101005 A1 | 5/2006 | Yang | |
| 2006/0161870 A1 | 7/2006 | Hotelling | |
| 2006/0161871 A1 | 7/2006 | Hotelling | |
| 2006/0265648 A1 | 11/2006 | Rainisto | |
| 2006/0274051 A1 | 12/2006 | Longe | |
| 2007/0061704 A1 | 3/2007 | Simova | |
| 2007/0263007 A1 | 11/2007 | Robotham | |
| 2008/0270138 A1 | 10/2008 | Knight et al. | |
| 2015/0278226 A1 | 10/2015 | Franks et al. | |
| 2015/0293995 A1 | 10/2015 | Chen et al. | |
| 2015/0379429 A1 | 12/2015 | Lee | |
| 2019/0147357 A1* | 5/2019 | Erlandson | G06N 3/08 706/12 |
| 2019/0318099 A1 | 10/2019 | Carvalho | |
| 2020/0372395 A1 | 11/2020 | Mahmud | |
| 2021/0232632 A1 | 7/2021 | Howard | |
| 2021/0304452 A1 | 9/2021 | Lee | |
| 2023/0088796 A1 | 3/2023 | Grue et al. | |
| 2023/0315856 A1* | 10/2023 | Lee | G06N 3/08 |
| 2023/0359903 A1* | 11/2023 | Cefalu | G06F 40/279 |
| 2024/0029345 A1 | 1/2024 | Selvert | |
| 2024/0029862 A1 | 1/2024 | Ahmed | |
| 2024/0054233 A1* | 2/2024 | Ohayon | G06F 21/577 |
| 2024/0078732 A1 | 3/2024 | Beith | |
| 2024/0221719 A1 | 7/2024 | Kothari | |
| 2024/0256840 A1 | 8/2024 | Song | |
| 2024/0257470 A1 | 8/2024 | Gupta | |
| 2024/0289863 A1* | 8/2024 | Smith Lewis | G06N 3/008 |
| 2024/0354555 A1* | 10/2024 | Knipfing | G06N 3/0455 |
| 2024/0419246 A1* | 12/2024 | Ullrich | G10L 13/08 |
| 2025/0007870 A1* | 1/2025 | Kim | G06F 40/20 |
| 2025/0077487 A1 | 3/2025 | Groenewegen | |
| 2025/0110618 A1 | 4/2025 | Kumar | |
| 2025/0110975 A1 | 4/2025 | Shea | |
| 2025/0111334 A1 | 4/2025 | Wilson | |
| 2025/0111335 A1 | 4/2025 | Wilson | |
| 2025/0111380 A1 | 4/2025 | Wilson | |
| 2025/0124262 A1* | 4/2025 | Badr | G06N 3/0475 |
| 2025/0124620 A1 | 4/2025 | Arora | |
| 2025/0131020 A1* | 4/2025 | Gupta | G06N 3/045 |
| 2025/0131024 A1 | 4/2025 | Gupta | |
| 2025/0148218 A1 | 5/2025 | Gusarov | |

OTHER PUBLICATIONS

Lu, Qinghua, et al. "Towards Responsible Generative AI: A Reference Architecture for Designing Foundation Model based Agents." arXiv preprint arXiv:2311.13148 v2 (2023). (Year: 2023).*

Rahman, Md Abdur. "A survey on security and privacy of multimodal llms-connected healthcare perspective." 2023 IEEE Globecom Workshops (GC Wkshps). IEEE, 2023. (Year: 2023).*

Urban, Matthias, and Carsten Binnig. "CAESURA: Language Models as Multi-Modal Query Planners." arXiv preprint arXiv:2308.03424 (2023). (Year: 2023).*

Lu, Qinghua, et al. "A Taxonomy of Foundation Model based Systems through the Lens of Software Architecture." arXiv e-prints (Jan. 2024): arXiv-2305 v6. (Year: 2024).*

International Search Report and Written Opinion of the International Searching Authority dated Jul. 4, 2025, issued in corresponding International Application No. PCT/US2025/018770 (10 pgs.).

\* cited by examiner

REVE | The Limey ▼ | ELEMENTS | STORY | PRODUCTION | TEAM

Elements

Script — 1002
VIEW AS:
A hardened Englishman with a criminal past, Wxxxn, ...

Summaries
Narrative
Arc Scene
Storyboards
Color Script

EDIT — 1006

Style — 1004
Big Sur Coast | LAGrit | Overall

ADD — 1008

Characters
Exxxd Rxxa | Wxxxxn
Exxxxe
Axxxxy
Txxy Vxxxe

ALL — 1010

Music
Ed Intro
Big Sur Highway

ADD

Market
Audience — Most appropriate for an adult audience comfortable with action-oriented...
Genre Comps

ADD
Animals
Camera
Costumes
Dialog
Extras
Props

MORE — 1012

REVE It — 1020 | All ▼

∞ Here's how Ed Rxxa might sound given ... — 1022

Add to Character | Edit play this back in voice suitable for Ed — 5min

∞ 1024

Backstory
" Served time in the daunting Corcoran State Prison ... — 1026

Scenes
Small House at Night
Ed's House
Ed's Backyard at Night
Ed's Car
Exterior of Arrivals Highlighted Ed Rxxa — 5min — 1028

EXT. ED'S — 10min
They sit at an outdoor table.
Wxxxxn ... — 1030

INT. ED'S — 10min
Wxxxn back to his motel. Wxxxxn ...

REVE (The Limey ▼)　ELEMENTS　STORY　PRODUCTION　TEAM　≡

STORY　　　　　　　　　　　　　　1502

(Script ▼) (All ▼) 🖼

Wxxxxn could remember, he had only ever seen or eight swimming pools ...

The (one at the Bxxxxn's holiday camp where he had) there was the one at Crystal Palace he had gone to once or twice nearby in what he now though ...

EXT. ARRIVALS

WXXXXN steps out into the late sunlight and the heat of the day. A slow-motion moment while he gets acclimatized. ...

EXT. MOTEL. EVENING

Wxxxxn's not here for comfort. Shown to a shitty room, round the corner of close by.

INT. MOTEL ROOM. EVENING got (one light bag. unzips, unpacks a few things.) clothes, a travel kit, and some familiar items ...

the (bathroom. Turns on the shower in there.) Comes back to jacket. ENVELOPE Turns it over

INT. TAXI. NIGHT the (back. Stares at the impenetrable name on the) driver's posted ID. Glances at the driver. DRIVER glances back at his quiet ...

EXT. SMALL HOUSE. NIGHT himself if any shows up, which it has.

WXXXXN　　　　　　　1504
Exxxxd Rxxa?

ED
Exxxxxo.
ED
(rolling the R)
Rxxa.

WXXXXN
　　1506

---

REVE It (All ▼)

∞ |　　　　　　　▶

∞ Here's how Ed　5min
Rxxa might sound
given ...
▶ ▁▂▃▁▂▃▁▂▃

Add to Character | Edit

▶ play this back in　5min
voice suitable
for Ed

∞

Backstory
" Served time in the
daunting Corcoran
State Prison ...

Scenes
Small House at Night
Ed's House
Ed's Backyard at Night
Ed's Car
Exterior of Arrivals ▶ Highlighted Ed　5min
Rxxa ▶ EXT. ED'S　10min
They sit at an ...

Show Settings　✎

▁▂▃▁▂▃▁▂▃　▶　ADD TO CHARACTER

VOICE　Latino descent, ex-convict, cook in a Lxxs Axxxxs restaurant

READ　HIGHLIGHT IN SCRIPT

| Characters |
| Extras |
| Supplies |
| Cars |
| Costumes |
| VP |
| Sound |
| Music |
| Stunts |
| Sets |
| Vehicles |

1606

REVE (The Limey ▼) ELEMENTS STORY PRODUCTION TEAM 🔊 ≡

STORY                                      1602

(Script ▼) (All ▼) (🖼) (✏️)

Wxxxn could remember, he had on
seen or eight swimming pools ...

The (one at the Bxxxxn's holiday c
there was the one at Crystal Palace h
gone to once or twice nearby in what ...

EXT. ARRIVALS

WXXXXN steps out into the late sunlight and
the heat of the day. A slow-motion ...

EXT. MOTEL. EVENING

Wxxxxn's not here for comfort. Shown to a
shitty room, round the corner of close by.

INT. MOTEL ROOM. EVENING got (one light bag. unzips, unpacks a few ...
clothes, a travel kit, and some familiar ...

the bathroom Turns on the shower in there.)
Comes back to jacket. ENVELOPE ...

INT. TAXI. NIGHT the (back. Stares at the impenetrable name ...
driver's posted ID. Glances at the driver.
DRIVER glances back at his quiet ...

1608

EXT. SMALL HOUSE. NIGHT himself if any shows up. which it has.

WXXXXN
Exxxxd Rxxa?

1610  ED

Exxxxo.

ED
(rolling the R)
Rxxa.

WXXXXN
You're home, then.
waves away the taxi he's kept waiting ...

WXXXXN
My name's Wxxxn.

WXXXXN
You're home, then.
waves away the taxi he's kept waiting ...

---

REVE It (All ▼)

🔊 |                    ▶

∞ Here's how Ed     5min
   Rxxa might sound
   given ...

▶ ▬▬▬▬▬

Add to Character | Edit

🔊 play this back in   5min
   voice suitable
   for Ed

∞

Backstory
" Served time in the
daunting Corcoran
State Prison ...

Scenes
Small House at Night
Ed's House
Ed's Backyard at Night
Ed's Car
Exterior of Arrivals 🔊 Highlighted Ed    5min
   Rxxa 🔊 EXT. ED'S         10min
   They sit at an
   outdoor table.
   Wxxxn ...

🔊 INT. ED'S         10min
   Wxxxn back to his
   motel. Wxxxn ...

FIG. 16

| REVE | The Limey ▼ | ELEMENTS | STORY | PRODUCTION | TEAM | ≡ |

Character    1802

REVE It    Character ▼

1806

Paint brush ●    5min

Paint brush ●    5min

Description
Latino male, stocky, small thin mustache, scruffy, white, tank top, short sleeve button down

VISUALIZE
character: male, Latino descent, ex-convict style: somber, gritty, foreboding, embraces the aesthetics of film noir merged with elements of late '90s Axxxxn Cinema, desaturated browns and grays

1804

Name
Exxxo Rxxa

Style
La GRIT

Description
Latino male, stocky, small thin mustache, scruffy, white tank top, short sleeve button down Save Version

FIG. 18

| REVE | The Limey ▼ | ELEMENTS | STORY | PRODUCTION | TEAM | |
|---|---|---|---|---|---|---|

Story       1902

| Scenes ▼ | | History | Story ▼ |
|---|---|---|---|
| | | Jan 20 | |
| | 1904 | STORY | |
| EXT. ARRIVALS | WXXXXN | INT. MOTEL ROOM ... | |
| EXT. MOTEL ... | | In his shabby model room, | |
| INT. MOTEL ROOM ... | | Wxxxxn unpack a light ... | |
| INT. TAXI. NIGHT | | 1906 | |
| EXT. SMALL HOUSE ... | WXXXN | Jan 20 | |
| INT. ED'S | ED. WXXXN | STORY | |
| EXT. ED'S | | EXT. ED'S | |
| INT. ED'S | WXXXN. ED | They sit a outdoor table. Wxxxn with a TV dinner ... | |
| EXT. WXXXXX'S | ED. WXXXN | Jan 20 | |
| INT. GUN SHOW. DAY | ED. WXXXN | STORY | |
| INT. ED'S | | INT. ED'S ... | |
| INT. RENTAL CAR. DAY | PA SYTEM, BEAM | Wxxxxn back to his motel. Wxxxxn silent. Ed still ... | |
| EXT. BOULEVARD. DAY | WXXXN. ED | Jan 19 | |
| EXT. A STREET | | STORY | |
| INT. CAR. DAY | | INT. GUN SHOW DAY | |
| EXT. SIDE | | Hundreds of tables. Under bright lights. Displaying ... | |
| EXT. THE BUILDING. | | Jan 19 | |
| INT. WAREHOUSE HALLWAY. | | STORY | |
| INT. WAREHOUSE | SUPERVISOR ... | INT. GUN SHOW DAY | |
| EXT. BUILDING. DAY | WXXXN | Trying out pistol gross -or pushing baby carriages. ... | |
| INT/ EXT. | | Jan 19 | |
| EXT. BALCONY. EVENING | VXXXXXE ... | STORY | |
| EXT. VXXXXXE'S HOUSE. ... | VXXXXXE... | INT. GUN SHOW DAY | |
| EXT. APARTMENT BUILDING. EVENING | | shotgun, rifle, or sidearm and will project a small, ... | |
| EXT. EXXXXE'S | EXXXXE. WXXXN | Jan 19 | |
| INT. EXXXXE'S | EXXXE | STORY | |
| INT. RESTAURANT. NIGHT | WXXXN. EXXXE | INT. GUN SHOW DAY | |
| EXT. OCEANFRONT. NIGHT | EXXXE. WXXXN | to be studying Ed's driving techniques. Paying to ... | |
| INT. EXXXXE'S | EXXXE. WXXXN | | |

Dropdown menu:
Animals
Characters
Costumes
Events
Extras
Foley
Locations
Motivation
Movement
Props
Stunts
Themes
Vehicles

Screenshot showing a screenwriting workspace interface with:

Browser tabs: Concept.art, http://localhost:5171

Tabs: HOME | WRITE | CHAT

Workspace: Screenwriting

Left panel (3301) — FOUNTAIN | PREVIEW:
- TITLE PAGE
- INT. DAVENPORT HOME - BED...
- INT. DAVENPORT HOME - BAT...
- INT. DAVENPORT HOME - MAI...
- INT. DAVENPORT HOME - MAI...
- I/E. DAVEPORT HOME - FOYER...
- EXT. DAVEPORT HOME - FRO...
- INT. DAVEPORT HOME - FA...
- EXT. RAVINE - MORNING
- EXT. RAVINE - SAME
- INT. MAJOR'S OFFICE - MORNI...
- INT. DINER ENTRANCE - DAY
- INT. DINER - WINDOW BOOTH...
- EXT. JUST OUTSIDE THE DINE...
- INT. DINER ENTRANCE - DAY
- INT. DAVENPORT HOME - KITC...
- INT. GOVERNMENT OFFICE - SA...
- EXT. PITTSBURGH STREETS - ...
- I/E. FORT PITT BRIDGE - RENT...
- I/E. RT. 376 - RENTAL CAR - TE...
- I/E. PITTSBURGH INTERNATIO...
- EXT. PITTSBURGH INTERNATI...

[NEW] [DELETE]

Subversion — 3303

Center panel:
INT. DAVENPORT - KITCHEN - DAY

CLOSE-UP on an ipad showing an elaborate, profession...

CUT TO:

CLOSE-UP on Mxxxe's contemplative expression. Blue ...

CUT TO:

CLOSE-UP on Mxxxe's attempt at the same mermaid bir...

But Mxxxie is not deterred. With the image of perfection n...

SXXXA (O.S.)
Is it ready?

Mxxxie peeks through the pass-through. Sxxxa and TATY...

MXXXE
Not yet, honey.

SXXXA (O.S.)
How does it look?

MXXXE
(to herself)
Like it crawled out of Lake Chernobyl.

FaceTime CHIMES on the ipad. The pretty and perky ava...

Right panel (3305) — NOTES | HISTORY | SIDEKICK:

Please summarize the story...

'Subversion' is a dramatic series that sets its scene in San Diego, focusing on the Davenport family'...

Parallely, the world stage is disastrous as the United States comes under threat from an adva...

As the situation spirals out of control, the U.S. government launches the Compulsory Conscri...

On the international front, the series introduces characters navigating military training exerci...

Through this, 'Subversion' so far presents a jouissance of personal disconnection from the everyday ...

Please summarize the story up to this point.

| Concept.art | | |
|---|---|---|
| http://localhost:5171 | | Workspace Pre-production ▼ |

| HOME | SUMMARIZE | CHAT |
|---|---|---|

Subversion

SUMMARY   ENHANCE (2X)   ENHANCE (3X)   ORIGINAL

Download • Copy • Regenerate from here

Logline

In the midst of a global crisis, the Davenport family in Sxxn Dxxxo, Cxxxxxa, unwittingly becomes entangled in a web of international espionage and military...

Synopsis

"Subversion" opens in the Davenport home, where MXXXXE and JXXXXN DAVENPORT discuss their decision to unplug from technology and their concerns...

The narrative shifts to a news report about a joint military exercise between the Cxxxxe People's Liberation Army and the Rxxxxn Armed Forces, believed to be an...

In a cold, leafless woodland, a group of soldiers, including Corporal Dxxe and Cxxn Kxxxxh, are seen working on a bridge. Dxxxe is shot by Kxxxxxh, who criticizes the...

In Pittsburgh, Pennsylvania, SADIE PEREZ, a Department of Defense journalist, meets RALEIGH HOLLOWAY, who works in counterintelligence. They discuss Sadi...

Back in the Davenport home, Mxxxe is attempting to recreate a mermaid birthday cake she saw on Pxxxxt...

In a small, nondescript government office, Kxxxxn and Mxxxxe engage in a light-hearted video call. They discuss Mxxxxe's daughter's mermaid-themed birthday cake inspired by an Axxxxxxn soap opera about teenagers who turn into mermaids when wet...

FIG. 35

HOME    SUMMARIZE    CHAT

Subversion
SUMMARY   ENHANCE (2X)   ENHANCE (3X)   ORIGINAL

Download • Copy • Regenerate from here

The narrative begins in the Davenport home in Sxxn Dxxxo, Cxxxxa, where MXXXXE DAVENPORT (40s) and her husband, JXXXN (40s), engage in a playful...

The scene shift to their children, BXXXXT (15) and SXXXXA (10), working on a jigsaw puzzle. The peaceful scene is disrupted when Sxxxa reveals that she and Bxxxxt...

The narrative takes a dramatic turn when Jxxxxn opens the front door to find three black polymer crates marked with "NDK" and "PROPERTY OF U.S. GOVT." Inside the...

The television broadcasts a news report about a joint military exercise between the Cxxxxe People's Liberation Army and the Rxxxxn Armed Forces, which is now...

The narrative then shifts to a cold, leafless woodland, where a group of multiethnic soldiers, including Corporal Dxxe and Cxxxn Kxxxxh, are seen working...

In the major's office, Major Mxxxs Bxxxxt informs Kxxxxh of his new assignment, which involves a mission on Ascension Island that could last up to nine months...

The narrative then shifts to Pittsburgh, Pennsylvania, where SADIE PEREZ, a Department of Defense journalist, meets RALEIGH HOLLOWAY, who works in counte...

Back in the Davenport home, Mxxxe is attempting to recreate a mermaid birthday cake she saw on Pxxxxt . Her daughter SXXXA and their Rxxxn exchange student TXXXXXA are captivated by something on TV, while another daughter, GXXXE, is engrossed in her phone. Mxxxe receives a FaceTime call from her sister, KXXXN...

In a small, nondescript government office, Kxxxxn and Mxxxe engage in a light-hearted video call. They discuss Mxxxe's daughter's mermaid-themed birthday cake...

FIG. 36

| Concept.art | | | |
|---|---|---|---|
| http://localhost:5171 | | | Workspace — Pre-production ▼ |

HOME   SUMMARIZE   CHAT

Subversion
SUMMARY   ENHANCE (2X)   ENHANCE (3X)   ORIGINAL

Download • Copy • Regenerate from here

INT. DAVENPORT HOME - BEDROOM - MORNING
In the early morning, the camera focuses on old split-flap alarm clock about to strike 8:00. The scene is set in Sxxn Dixxxo, Cxxxxxa. MXXXXE DAVENPORT (40s) lunges......

INT. DAVENPORT HOME - BATHROOM - MORNING
In the bathroom, Jaxxxxn and Mxxxxe continue their morning rituals, discussing their family's therapy sessions and their decision to unplug from technology. They express...

INT. DAVENPORT HOME - MAIN LEVEL - MORNING
The scene shifts to the main level of the Davenport home, where BXXXXT (15) and SXXXA (10) are seen working on a jigsaw puzzle by the fireplace. The family dog...

INT. DAVENPORT HOME - MAIN LEVEL - Later
Later, Jxxxxn servers pancakes to the family, with one place remaining empty for their eldest daughter, GXXXE. The family begins a game where they ask questions...

I/E. DAVENPORT HOME - FOYER - SAME
The scene shifts to the foyer, where Jxxxn opens the front three black polymer crates marked with "NDK" and "PROPERTY OF U.S. GOVT."......

EXT. DAVENPORT HOME - FRONT PORCH - SAME
Outside, Jxxxxn opens one of the crates to reveal an arsenal of weapons and ammunition, along with booklets marked "NATIONAL DEFENSE KIT" and "PROPERTY OF THE UNITED STATES GOVERBMENT." The...

FIG. 37

SUMMARY  ENHANCE (2X)  ENHANCE (3X)  ORIGINAL

INT. DAVENPORT HOME - BEDROOM - MORNING
CLOSE - UP on an ancient, split - flap alarm clock matching the mysterious background sounds. It's 7:59.
SUPER: "Sxxn Diego, Cxxxxxa"
We know that at any second we will be assaulted by an unnerving, tooth-grinding buzz. we...
The number flip anticlimactically to 8:00.
The hand belongs to MXXXXE DAVENPORT (40s) who has lunged,
bodily, over her husband, JXXXXM (40s), in order to prevent the imminent klaxon.

JXXXXN
(blearily)
What's going on?

MXXXXE
(wild-eyed)
I refuse to be awakened by that damn...

As Jxxxxn reaches for his tortoiseshell glasses, we see that he has just enough gray...

JXXXXN
This is the last day. you can...

MXXXXE
Oh, I don't think so. tomorrow it...

JXXXXN
What happened to that sweet girl...
she wouldn't even wear leather Birkenstocks?

MXXXXE
she gew up. And then her husband took her iphone away.

INT. DAVENPORT HOME - BATHROOM - MORNING
Jxxxxn and Mxxxxe stand at their own sinks conducting their

Workspace: Pre-production

CHAT  PROPS▾  NUMBERS▾  COLORS▾  ACTORS▾  LUNCH▾  SAVE THE CAT▾  NEW▾

HOME   BREAKDOWN   CHAT

Subversion

Extract information on every prop required for shooting this TV show. Do not include vehicles, costumes, visual effects, or sets...

Here is a detailed list of the props required for shooting the TV show. The list includes a brief description... ← 4103

| Prop | Description | Scene(s) | Notes |
|---|---|---|---|
| Spin-flap alarm clock | An ancient clock used to depict the... | Wakeup | Should match the mysterious... |
| Tortoiseshell glasses | Worn by Jxxxxn while in the bedroom | Bedroom | Should confer a professional... |
| Breakfast Set | Pancake mix, plate, utensils, coffee... | Breakfast | The family eats breakfast... |
| Assorted electron... | Various devices seen in a drawer | Family... | The family has locked their... |
| Jigsaw puzzle | Puzzle pieces that Sxxxxa and... | Living... | |
| Assorted morning... | Things like coffee mugs, toothpaste... | Bathroom... | |
| NDK | Mysterious black cases delivered... | Multiple | Each should be impact-resis... |
| Davenport Family... | Place at the front door of the... | Front... | |
| Cakes | One home made mermaid birthday... | Birthday | |
| Birthday candles | Lights up Txxxxa's birthday cake | Birthday | |
| Family dinner | Laid out on a table for the Davenport's... | Dinner... | |
| Birthday presents | Unwrapped presents for Txxxxa... | Birthday | |
| Walnut Cake | A butchered cake made for... | Txxxxa's... | Should match a far better... |
| M4 Rifle, Beretta... | Weapons found inside the NDKs | Multiple | |
| Phone | Used by Gxxxxe to show something... | Unspeci... | |
| Cell phone | Used by Mxxxxe to answer a... | Unspe... | |
| Fast food bag | Used by Pxxxr Q to conceal... | Peter... | |

Let me know if you need assistance with anything else.

What time do we see on the alarm clock?  [Ask About ▾] [Ask questions about Subversion]

GENERATIVE ARTIFICIAL INTELLIGENCE FOR CONTENT GENERATION WITH SEARCHABLE REPOSITORY

CROSS-REFERENCE TO RELATED APPLICATIONS

This application claims priority to U.S. Provisional Patent Application No. 63/562,662, filed on Mar. 7, 2024, the entire content of which is incorporated by reference in its entirety herein.

BACKGROUND

Automated content generation has been advancing at a rapid rate. Artificial intelligence ("AI") systems such as large language models ("LLMs") trained to generate text and visual models, such as diffusion models trained to generate visuals, are becoming increasingly sophisticated. Research and advancements in generative audio are likewise gaining traction. Furthermore, three-dimensional ("3D") engines that provide development capabilities for users to render realistic 3D (and two dimensional (2D)) environments and objects are becoming increasingly powerful. Despite these advancements, there are many challenges introduced by these and other related systems.

BRIEF DESCRIPTION OF THE DRAWINGS

Features of the present disclosure may be illustrated by way of example and not limited in the following figure(s), in which like numerals indicate like elements, in which:

FIGS. 10-23 each illustrates examples of user interfaces, according to various implementations.

FIGS. 32-43 each illustrates examples of user interfaces, according to various implementations.

DETAILED DESCRIPTION

Figure 1:
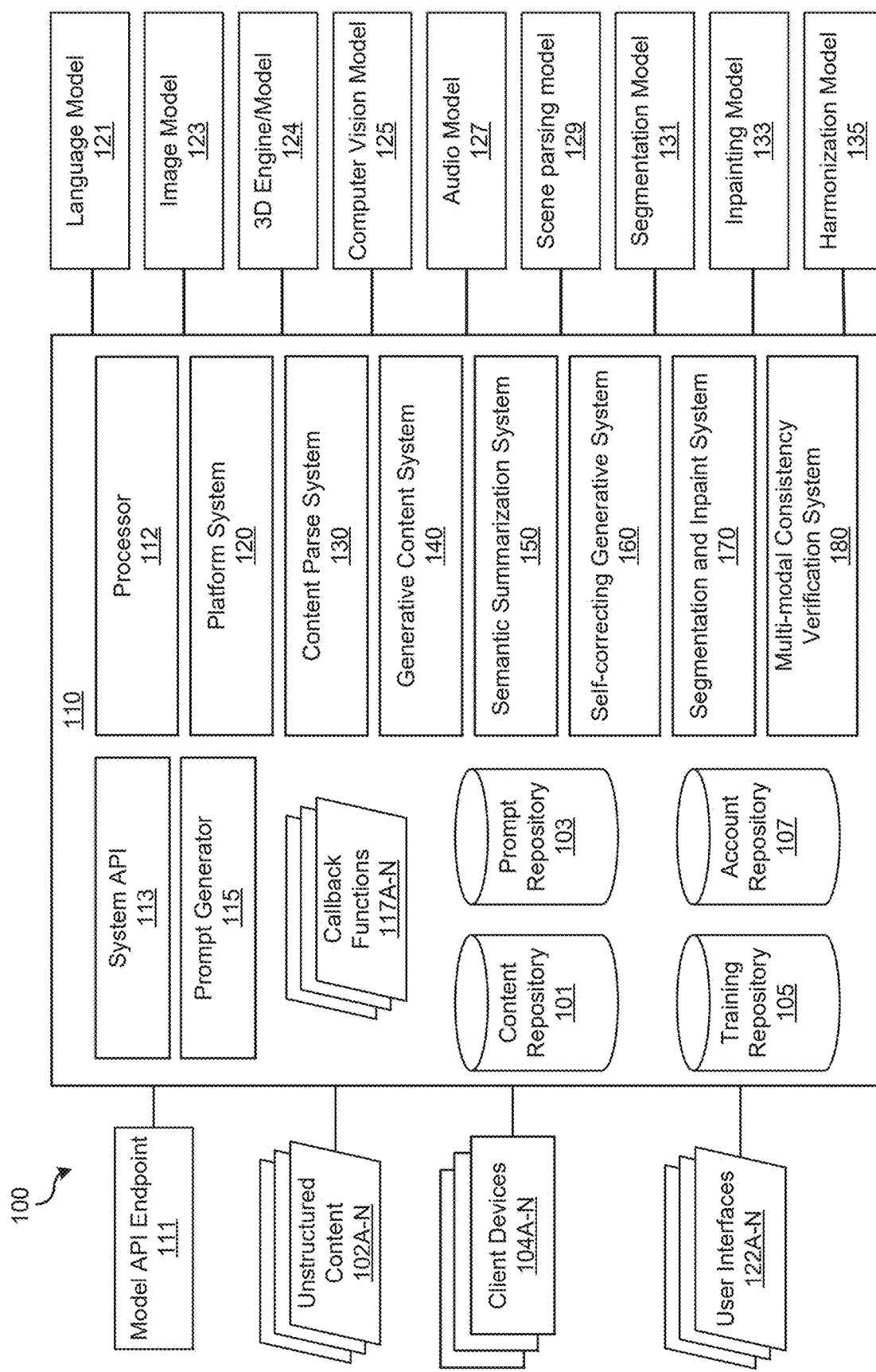
FIG. 1 shows an illustrative system environment for multi-modal content generation and retrieval, according to an implementation.

Various systems and methods relate to multi-modal content generation and retrieval that may address various issues with these and other advanced systems. In particular, the system provides a generative AI platform for generating, storing, searching, and summarizing content. The system may train, retrain, and/or execute various generative AI and other advanced systems to provide an integrated platform for tasks relating to content generation, storage, search, and summarization. The content may include scripts for, movies, shows, commercials, short videos, non-visual, and/or other types of content ("transcripts"). Using advanced systems and generative AI models, the system enables creators to generate content that spans full lifecycle development, from ideation, to storyboarding, character development, scene creation, and completed project. The system enables creators to collaborate with others to iteratively generate various aspects of project creation, including visual (image and video), audio, script, and other elements of the project. The system may be used in other contexts (other than for transcripts) in which one or more issues with generative AI and other advanced systems are implicated.

For example, the mass scale at which content such as text, visuals, audio, 3D objects, and other content can be generated is staggering. Providing meaningful search capabilities for this data can be problematic, leading to difficulties in storing, identifying, and retrieving relevant content. In particular, it may be difficult to find content such as transcripts. Furthermore, content to be processed may be unstructured, which may make it more difficult to perform various generative AI tasks, such as summarization or other processing of specific portions of unstructured content.

Another issue with these systems is that generative AI models may rely on appropriate inputs such as prompts to generate appropriate results. For example, one prompt may not be as effective as another prompt in obtaining an appropriate response from an LLM. Oftentimes it is difficult for users to formulate appropriate prompts, let alone gather contextual, semantic, or other information that may provide sufficient information for the models to generate good outputs. Thus, generating effective prompts to maximize relevance or appropriateness of generative AI model outputs can be problematic.

Furthermore, generative AI models may be non-deterministic: given the same input, the same output may not be generated. This can present various problems, such as when attempting to generate content consistently across different compute nodes in a parallelized architecture. For example, breaking apart long text for parallelized summarization may involve breaking the content into chunks and summarizing each chunk using an LLM. However, a given LLM may summarize a chunk using a different tone (and/or other way) compared to another chunk, resulting in an incohesive overall summary of the original content. This issue is further compounded when different LLMs are used for different chunks.

Even though context window sizes are increasing, enabling larger sized content to be analyzed via a single prompt, it can remain advantageous to parallelize this effort for various reasons. For example, parallelizing LLM or other generative AI tasks may advantageously reduce the computational load of this task by breaking up the task into smaller running instances. Parallelizing LLM or other generative AI tasks may also result in more accurate results because multiple content pieces are being analyzed separately. For example, summarizing long text in a single prompt may be subject to non-deterministic output in the single task. But doing so over multiple smaller chunks and aggregating the results may yield better performance since the chances of each chunk being subjected to non-deterministic output is less than a single task. Put another way, a given chunk may be subject to non-deterministic output but the parallelization may tolerate this since other chunks may not be subject to non-deterministic output.

Another issue with generative AI systems is that they may not produce desired results, whether or not appropriate inputs are provided. For example, an LLM may be tasked with generating text that is later deemed to be inappropriate, not the intended style, or otherwise not considered an appropriate response to a user request. In another example, an image model may inappropriately cut off a portion of an image in response to a request to zoom in on a particular item in a scene. In a related problem, generative AI systems are known to hallucinate. That is, they can generate inaccurate or falsified content. This can present problems in various contexts such as for content summarization or factual recounting.

One ancillary issue with generative AI systems is that as their use proliferates, content generation will become easier but also possibly more prone to human errors, in addition to inherent generative AI errors such as the generation of inappropriate results or hallucinations. For example, a human user writing a transcript with generative AI (or with other systems) may introduce inconsistencies in various aspects of the transcript or related content. To illustrate, a writer may change an aspect of the transcript so that the change conflicts with other parts of the transcript. This problem can (and does) manifest in other contexts, but can be especially acute with generative AI systems. These and other issues exist with generative AI systems and their use.

FIG. 1 shows an illustrative system environment 100 for multi-modal content generation and retrieval, according to an implementation. The system environment 100 may include one or more client devices 104 (illustrated as client devices 104A-N) and a computer system 110. Each client device 104 is a device that may be used by an end user to interact with the computer system 110. For example, each client device 104 may include a desktop computer, laptop computer, tablet computer, smartphone, and/or other types of devices that may communicate with the computer system 110.

The computer system 110 is a computational platform having one or more computer devices that generates, summarizes, and semantically searches content to provide a broad range of assistive and generative functionality. The computer system 110 may include a processor 112, a model Application Programming Interface ("API") endpoint 111, a system API 113, a prompt generator 115, a platform system 120, a content parsing system 130, a generative content system 140, a semantic summarization system 150, a self-correcting content generative system 160, an interface system 170, and/or other features. The computer system 110 may access (such as read, write, delete, and/or update) various databases, such as the content repository 101, the prompt repository 103, and training repository 105.

The computer system 110 may train, retrain, fine-tune, execute, or otherwise activate various computer models. The computer models may include a language model 121, an image model 123, a 3D engine/model 124, a vision model 125, an audio model 127, a scene parsing model 129, a segmentation model 131, an inpainting model 133, a harmonization model 135, and/or other models. At least some of these models are generative AI models. A generative AI model is a computer model that is trained to generate new content based on training data. Different types of content in different formats such as text, visuals, audio, and/or other types and formats of content are contemplated.

Each of the systems 120, 130, 140, 150, 160, 170, and 180 may call or otherwise use one or more of the other systems. For example, the platform system 120 may call the semantic summarization system 150 to generate summaries of content. Similarly, each of the systems 120, 130, 140, 150, 160, 170, and 180 may train, retrain, fine-tune, execute, and/or otherwise activate various computer models such as models 121, 123, 124, 125, 127, 129, 131, 133, and 135.

The processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some implementations, processor 112 may comprise a plurality of processing units. These processing units may be physically located within the same device, or processor 112 may represent processing functionality of a plurality of devices operating in coordination. Some or all processing units may be on-site within a computational facility and/or be located remotely such as at a cloud-based computing facility.

System Interfaces, Model Platform Interfaces, and Prompt Generation

The model API endpoint 111 is an API that provides an interface to one or more of the models. Although only one endpoint is shown, there may be multiple endpoints that each interface with a respective model. The system may activate a model via the model API endpoint 111. For example, to activate a model, the computer system 110 may generate or select a prompt via the prompt generator 115 and transmit the prompt as input via the model API endpoint 111. The system API 113 is an API that provides an interface to various system functions of the computer system 110. For example, inputs to and outputs from one or more systems and models of FIG. 1 may be made via the system API 113. For example, the various user interfaces described herein may provide user inputs to the system via the system API 113, which may provide system outputs to the user interfaces. It should be noted that inputs (whether or not through user interfaces) may be provided to the systems and models through the system API 113. Similarly, outputs of the systems and models may be provided via the system API 113 (whether or not through user interfaces). For example, hardware devices, software services, and/or components may interact with the systems and models disclosed herein through the system API 113.

The prompt generator 115 is a system component that receives an input and generates a prompt for execution by one or more of the models. A prompt is an instruction to a generative AI model to generate an output. The prompt may include a query to be answered and/or a description of the output to be generated. In some instances, the prompt may also include additional information to be used by the model to generate a response. The additional information may include contextual data, desired output formats, constraints, domain-specific knowledge, examples, templates, tone, style, localization information (such as output language, consideration of cultural information, and so forth), and/or other information that may be provided to the model to help shape its response. Thus, generation of the prompt itself can be an important factor in obtaining an appropriate response from one or more of the generative AI models.

Prompts can be in the form of a text prompt for models that can understand text inputs, machine prompts for models that can understand non-text such as vector inputs, and/or other types of prompts depending on the model for which the prompt is intended.

Dynamic Prompt Generation

The prompt generator 115 may receive an input from a user and generate a prompt based on the user input, contextual information, semantic information, and/or other data to generate a custom and targeted prompt. The prompt generator 115 may be programmed with instructions to dynamically generate specific prompts for various situations. The prompt generator 115 may have access to variable data in a runtime environment such that the prompt generator 115 is able to access the variable data. The variable data may include an indication and payload of content (if any) being viewed, generated, or analyzed, user inputs, contextual information, semantic information, and/or other types of data that may influence prompt generation. Further details of dynamic prompt generation and its use are described at FIGS. 2-5.

In some instances, the prompt generator 115 may access one or more preconfigured prompts that may be designed by a developer and/or historical prompts previously generated by one or more users. In these instances, the prompt generator 115 may provide a user-selectable listing of the preconfigured prompts. Preconfigured prompts may be advantageous in situations in which a prompt is found to be effective and can be re-used by the same or different users and/or to simplify and streamline prompts. In some instances, the prompt generator 115 may modify a preconfigured prompt for dynamic prompt generation based on the preconfigured prompt. The preconfigured prompts and/or dynamically generated prompts may be stored in the prompt database 103.

Callback Functions for Generative AI Models

In some implementations, the computer system 110 may store and execute one or more callback functions 117 (illustrated as callback functions 117A-N). A callback function 117 is a function executed by the computer system 110 in connection with a request from a generative AI model, such as the language model 121, to execute one or more functions to obtain data, generate data, query data, or otherwise provide additional data for the generative AI model. Typically, though not necessarily, the generative AI model will return a request for one or more callback functions when it requires more information to respond to a request such as a prompt. The computer system 110 may accordingly execute the requested callback functions and return additional information resulting from the one or more callback functions.

In some examples, a callback function 117 may include a clarify function that may be called back by a model, such as the language model 121. The clarify function may include a preconfigured instruction to clarify certain responses. If the model does not understand an input such as a prompt, the model may callback the clarify function that results in text that asks for clarification. The preconfigured instructions may therefore control how clarifications are directed back to users.

In some examples, a callback function 117 may include a virtual calculator function as a callback function. In these examples, the computer system 110 may train a language model 121 to execute a virtual calculator by including functions to press virtual buttons of a virtual calculator. Thus, a prompt to "what is 5+7" may result in a callback function to "press the number 5, press the button "+" then press the button "7." The virtual calculator will then provide an output of the virtual calculator. This is in contrast to, for example, directly executing a software function such as "print (5+7)" to perform the calculation.

Various systems of the computer system 110 may use callback functions 117 to obtain additional information about transcripts, visuals, audio, and/or other content that is the subject of modeling, whether generative AI modeling or other modeling described herein.

The following is an example flow of using a callback function 117 "query_content" for content generation.

Send the text as-is to the model (along with the rest of the conversation). If the conversation already contains a description of a character named Maggie, the model may pull from that and answer right away.

If the conversation does not include information (such as the description of Maggie), the model will call the "query_content" function and pass back a modified query. For example, "Describe the character Maggie from the show Subversion in great detail. Be sure to include both physical and personality characteristics."

The query_content function then breaks the document up into chunks and uses the modified query to extract information.

Information from all the chunks (each individual response) is combined into a single document, and then the aggregate is sent to the language model 121 with the original question (not the modified query). The result of this processing is provided to the user.

Computer Models, Including Generative AI Models

The language model 121 is a generative AI model for language. In particular, the language model 121 may be a pretrained deep-learning LLM trained on large language datasets. The language model 121 may be trained to semantically understand natural language and automatically generate new text based on this understanding. Examples of the language model 121 may include, without limitation, one or more variants of: OPENAI GPT, LLAMA from META, GOOGLE LaMBDA, BERT from GOOGLE, BIG-SCIENCE BLOOM, Multitask Unified Model (MUM), or other language models.

The computer system 110 may activate the language model 121 with one or more input prompts and one or more model parameter values. The prompt may be generated by the prompt generator 115. A model parameter value is an input that specifies behavior—and therefore output—of the language model 121. For example, a model parameter value may include a temperature parameter that adjusts the level of randomness for automatically generated text. Different temperature parameter values will result in different levels of randomness in the generated text. Thus, the temperature parameter value may be used to control the output of the language model 121. The language model 121 may return the automatically generated text based on the one or more input prompts and any model parameter values.

The image model 123 is a generative AI model for visual data such as images and video. As used herein, the term "visual data" will generally refer to images and video, whether two dimensional (2D) or three dimensional (3D). The image model 123 may be trained on visual data to automatically generate new visual content. The visual content may be two dimensional and/or three dimensional. The image model 123 may be a diffusion model trained to generate new visual content. Examples of image model 123 include diffusion models such as one or more variants of: STABLE diffusion, DALL-E, IMAGEN, and MIDJOURNEY.

Diffusion models may implement score-based generative modeling, denoising diffusion probabilistic models, and Stochastic Differential Equations ("SDE"), each playing a critical role in the model's ability to process and generate complex data. Score-based generative modeling through SDEs map data to a noise distribution (the prior) with an SDE and reverse this SDE for generative modeling. Denoising diffusion probabilistic models are a specific type of diffusion model that focuses on probabilistically removing noise from data. During training, these models learn how noise is added to data over time and how to reverse this process to recover the original data. This involves using probabilities to make educated guesses about what the data looked like before noise was added. SDEs are mathematical tools that describe the noise addition process in diffusion models. They provide a detailed blueprint of how noise is incrementally added to the data over time. This framework is essential because it gives diffusion models the flexibility to work with different types of data and applications, allowing them to be tailored for various generative tasks. Score-based generative models (SGMs) learn to understand and reverse the process of noise addition. Score-based generative modeling teaches the model to start with noisy data and progressively remove noise to reveal clear, detailed images.

The 3D engine/model 124 is a model that can render 2D or 3D scenes or objects based on input parameters. These input parameters may include values, machine instructions such as vector data, and/or other inputs that specify a 2D or 3D rendering. Non-limiting examples of the 3D engine/model 124 include UNITY, UNREAL, and CRYENGINE.

The computer vision model 125 is an AI model that is trained to process, understand, and identify objects in electronic visual data such as images and videos. Examples of computer vision models include GPT-4V, LaVA (Large Language and Vision Assistant), and BakLLaVA. These or other computer vision models 125 may integrate image identification and language understanding that provides an ability to analyze visuals and ask questions of the visuals.

The audio model 127 is a generative AI model that processes and generates audio data. Audio data (or simply "audio") is data that is intended to be heard, such as voices, music, sound effects, ambient noise, and/or other sounds. The training data can include music, speech, environmental sounds, or any other type of audio the model is designed to generate. By analyzing audio in the training data, the audio model 127 learns the underlying patterns and relationships between different sounds. Examples of audio models 127 include WAVENET, Variational Autoencoders (VAEs), and Generative Adversarial Networks ("GANs") for audio. Once trained, the audio model 127 can generate new audio content based on, for example, sampling from a learned distribution or starting from prompts or other starting points. Sampling from a learned distribution may involve predicting the probability of different sound elements occurring and sampling from this distribution to create entirely new audio. Starting from prompts or other starting points may involve receiving input from users to influence the generation process based on input audio prompts from users that include such as a melody, rhythm, specific sound effects, or other sounds. The audio model 127 then builds upon these inputs to create new audio. The audio model 127 may generate audio in various contexts, such as to generate musical compositions, sound effects, dialogue, and/or other sounds that may be derived from or otherwise automatically generated based on sounds in the training data or prompts.

The scene parsing model 129 is an AI model that converts unstructured content 202 into structured content. The unstructured content 202 can include text such as natural language text. The structured content can include an output in a format that structures parsed elements. An example structured format can include JavaScript Object Notation (JSON) output, although other structured formats such as XML can be used. For example, the system can parse scenes and its elements from text in screenplay format and generate JSON output.

The segmentation model 131 is a computer vision model that identifies different parts of an image. Image segmentation can be used to delimit an element in the image. For example, image segmentation (such as via the Segment Anything Model (SAM)) can be used to identify and mask sunglasses from an image.

The inpainting model 133 is a generative AI model that fills in a specified space in visual data. The specified space can include the mask generated by the segmentation model 131. The inpainting model 133 may take as input a set of visual data and generates content to fill in the specified space. The content may be consistent with the visual data. In this way, the inpainting model 133 may be tasked to generate content that is consistent with the visual data. In particular, a user may input the set of visual data, be able to infill content that is consistent with the set The harmonization model 135 is an AI model that can use various other model outputs to determine whether a content element such as lighting, shadows, and/or other elements in the content are appropriate given the context and/or semantics of the content.

The API endpoint 111 is a network location such as a uniform resource locator ("URL") or uniform resource interface ("URI") used to interact with a model that exposes an API. Each such model may expose a corresponding API that is reachable through a respective API endpoint 111. Thus, the various systems of the computer system 110 may identify a model to use and interface with that model through its API endpoint 111. For models that do not expose an API, the various systems of the computer system 110 may call the model directly through interfaces (such as a command line interface) exposed by the model.

Generative AI and Other Systems for Content Generation, Summarization, and Querying The platform system 120 is a generative AI platform for generating, storing, searching, and summarizing content, including transcripts for: movies, shows, commercials, short videos, novels, novellas, short stories, story treatment, non-fiction books, articles, audio such podcasts, game design documents, creative briefs, non-visual, and/or other types of content ("transcripts"). Using advanced systems and generative AI models, the platform system 120 enables creators to generate content that spans full lifecycle development, from ideation, to storyboarding, character development, scene creation, and completed project. The platform system 120 enables creators to collaborate with others to iteratively generate various aspects of project creation, including visual (image and video), audio, transcript, and other elements of the project.

User Profiles and Contextual Information for Generative AI Models

The platform system 120 may register users and/or organizations to access the system. Users may include writers who are writing a transcript, actors or talent agencies who are searching for transcripts, directors or producers seeking their next project, potential investors, or others. The registration may be made in connection with subscription, per-use, royalty, or other fees. Registered users may be assigned a user profile that includes a role, a username, security credential such as a password, user preferences, historical data (such as prior work), and/or other user data. The user profile may be stored at and retrieved from the account repository 107.

The role may specify a type of user, such as a producer, director, agent, writer, artist, sound engineer, investor, and/or other type of role involved in content creation, consumption, or investment. The user preferences may include data about what the user prefers such as genres, aesthetics, audio preferences, actor preferences, user interaction history with the system, and/or other aspects of content that the user prefers.

Some or all of the user profile, such as the role or user preferences may be used for contextual information to perform various functions accessed by the platform system 120 and provided by the other systems and models described herein. For example, when a user logs on to use the system, the platform system 120 may access and use the user preferences as contextual information for generative AI models to create customized content as will be described herein based on the user preferences and/or other aspects of the user profile.

Searchable Repository of Content and Marketplace for Obtaining Rights to Content The platform system 120 may include or interface with a content repository 101. The content repository 101 may store content generated or updated with the computer system 110. The platform system 120 may provide search capabilities that enable querying and retrieving content from the content repository 101. Search capabilities may include a semantic search, a keyword search, a visual search, an audio search, and/or other types of search.

Semantic search involves querying semantic similarity between a query and the content being queried, such as content stored in the content repository 101. Semantic similarity refers to a measure of similarity based on semantic content (meaning, context, or structure of words) rather than keyword matching. For example, "transportation" may be semantically similar to "automobile" and is not a keyword match. Thus, a search query having the word "Western" may be deemed to be semantically similar to a transcript having the word "Cowboy." On the other hand, in a keyword search, the response section having the word "Cowboy" would not be returned as a result of a keyword query for "Western."

Alternatively, or additionally, semantic similarity may refer to the relatedness of words rather than keyword matching. For example, "transportation" may be related to "highway." In this context, semantic similarity may refer to the similarity in relatedness of words. Thus, a query having the word "transportation" may be deemed to be semantically similar.

Semantic similarity may be measured based on various techniques, such as topological similarity, statistical similarity, semantics-based similarity, and/or other techniques. For example, an initial query may be passed to the semantic search engine that queries the content as word embeddings (vectors) in a vector space. In some examples, the initial query may be classified against known concepts or known entities to influence the vectors that are generated.

Visual search is a search based on a visual query. The visual query may include text, image, video, and/or other query data that is searched against visuals in the content repository 101. For example, the query may include terms such as "show me transcripts with images of Cowboys." In another example, the query may include an image and the results may include other images or visuals that are similar to the query image. Combinations of query inputs may also be used, such as "show me visuals that have the same colors as this image" along with an upload or selection of the query image.

Audio search is a search based on an audio query. Like the visual query, the audio query may include text, audio, and/or other query data that is searched against audio in the content repository 101. For example, the query may include terms such as "show me transcripts with classical music scores." In another example, the query may include a sound file and the results may include other audio that are similar to the query sound. Combinations of query inputs may also be used.

The various types of searches may be combined with one another. For example, a semantic search may include a keyword search, a visual search and/or an audio search. To illustrate, a combination search may include terms "show me transcripts in the Western genre with a classical music score."

One or more of the searches may incorporate contextual information, such as a user profile. For example, the platform system 120 may use some or all of the user profile of a registered user to provide context for searches. To illustrate, a registered actor may submit a query "find me transcripts that I would be interested in." The platform system 120 may obtain the user preferences and/or other information from the user profile of the registered actor and retrieve transcripts that are relevant to the search query and the user preferences. For example, if the user prefers Western or Sci-Fi genres, the results will be filtered according to these genres. The search results may also or instead be filtered based on user work history. For example, the platform system 120 may return transcripts that have one or more roles that are consistent with the type of role the user has played in the past.

One or more of the searches may be a recurring search that is executed automatically. For example, a registered user may specify one or more search queries that are periodically (such as daily, weekly, monthly, etc.) run. Search results may be transmitted to the registered user and/or be provided to the user via a user interface. To illustrate, a registered agency may enter data such as clients or criteria for specific content. As other users input and/or import content, connections can automatically be made. For example, an agent might have a client looking for a futuristic motorcycle movie. The agency could set up a "semantic notification" based on a recurring search with these or other search parameters, and be notified of any content matching that criteria, including content that is uploaded to the content repository 101 after the recurring search was initially setup.

In some implementations, the platform system 120 may provide an electronic or online marketplace ("marketplace") for content. The marketplace may enable the search (via one or more of the search capabilities of the platform system 120), use, download, or other permitted action with respect to the content. In this way, users may purchase, license, or otherwise obtain rights for a permitted action. The marketplace may include tracking features that track the use or appropriation of content. For example, various hash digests may be generated on some or all of a given content or its content elements. In some examples, the content may be subject to Digital Rights Management ("DRM") protection to ensure that creators and other providers of the content may securely share the content with the computer system 110 for dissemination via the marketplace.

User Interfaces

The platform system 120 may provide one or more user interfaces 122 (illustrated as user interfaces 122A-N) for interacting with the computer system 110. Examples of user interfaces are illustrated at, for example, FIGS. 10-23 and 32-43. Each of user interfaces 122 may be transmitted to or otherwise rendered at a client device 104. Each of the user interfaces 122 may provide data to and receive data from the client device 104. Each of the user interfaces 122 may enable interfacing with one or more systems or features of the computer system 110, such as to generate, update, summarize, or otherwise interact with content.

In some implementations, a user interface 122 may provide asset mapping and displays that show a timeline of where assets such as scenes, actors, props, certain audio, etc. appear in the transcript. For example, this user interface may query a transcript to identify when each assets appears on a timeline, and graphically represent such appearance. In this manner, this user interface may enable identification of a given asset in the transcript, the duration of time that the asset appears, and/or other information about the asset.

Streaming Buffers

Streaming buffers refer to storing content from a model or other source of the content in a buffer and then depicting the content from the buffer. This features allows output to a user to be perceived more favorably by the user by buffering the stream of data before it appears. In that way, the data appears to be fluidly provided and does not distinguish itself from other output. Doing this also avoids the user from jumping in to ask another question during hesitancies to which they were previously provided.

Computer Modeling for Transforming Unstructured Content to Structured Content

The content parsing system 130 may train and use the scene parsing model 129 to transform unstructured content 102 (illustrated as Unstructured Content 102A-N) into structured content. The unstructured content 102 may include text, including natural language text in any language. The structured content can include an output in a format that structures parsed elements, such as text, object, record, structure, dictionary, hash table, keyed list, array, properties, name, value, number, hexadecimal, label, codes, metadata, and/or token. An example structured format can include JavaScript Object Notation ("JSON") output, although other structured formats such as extensible Markup Language ("XML") can be used. The parsed elements can be collected, analyzed, filtered, connected together (relationally and otherwise), ordered, transformed, and stored in many ways.

The content parsing system 130 may train, retrain, finetune and use the scene parsing model 129 to recognize data elements from the unstructured content 102 and generate structured content based on the recognized data elements. Data element recognition may be based on specific types of unstructured content 102. Put another way, different types of unstructured content 102 will have different data elements the scene parsing model 129 is trained to recognize. Continuing the illustrative examples used herein, the unstructured content 102 may include a transcript and the content parsing system 130 may specifically train and use the scene parsing model 129 to parse scenes and other transcript elements (such as props, characters, etc.) from transcripts. The content parsing system 130 may generate structured content based on the scenes and transcript elements recognized by the scene parsing model 129. For example, the content parsing system 130 may provide a transcript to the scene parsing model 129, which generates a JSON output that encodes the scenes and other transcript elements in a structured format. It should be noted that the unstructured content 102 can be content other than a transcript and the scene parsing model 129 may be trained to transform other types of unstructured content and data elements into structured content based on the disclosures herein relating to transcript parsing and scene recognition.

Inputs to the content parsing system 130 may include unstructured content having text in various formats such as ASCII text, word processing documents, PDF documents, images having text, and/or other types of content having text or recognizable text.

If the unstructured content does not contain ASCII or other free text, the content parsing system 130 recognize text from the content using Optical Character Recognition ("OCR") (such as via TESSERACT) or translating, extracting, or reading, such as from native PDF format.

Training and Using the Scene Parsing Model 129

The content parsing system 130 may train and use the scene parsing model 129 to recognize data elements in unstructured content 102. For example, the content parsing system 130 may train the scene parsing model 129 to recognize the start and end of scenes and other elements associated with a transcript. In a transcript, for example, scenes generally starting with the strings "INT"; "ET"; or "I/E." To train the scene parsing model 129, the content parsing system 130 may access one or more training messages. Each training message includes an example of at least a portion of unstructured content 102 such as a transcript and the data elements that should be parsed from the unstructured content. A non-limiting example of unstructured content is shown in Table 1 for illustrative purposes. A non-limiting example of structured content transformed from the unstructured content in Table 1 is shown in Table 2.

TABLE 1

Example of unstructured content (in this example, an example of a transcript).

SUBVERSION
"Queenside Castle"
(Pilot)
Written by

TABLE 1-continued

Example of unstructured content (in this example, an example of a transcript).

Christian Cantrell
INT. DAVENPORT HOME - BEDROOM - MORNING
CLOSE-UP on an ancient, split-flap alarm clock matching the
mysterious background sounds. It's 7:59.
SUPER: "San Diego, California"
We know that at any second we will be assaulted by an
unnerving, tooth-grinding buzz. We wait for it, but then a
hand descends urgently upon the plunger.
The numbers flip anticlimactically to 8:00.
The hand belongs to MAGGIE DAVENPORT (40s) who has lunged,
bodily, over her husband, JAMISON (40s), in order to prevent
the imminent klaxon.
JAMISON
(blearily)
What's going on?
MAGGIE
(wild-eyed)
I refuse to be awakened by that
damn thing ever again.
As Jamison reaches for his tortoiseshell glasses, we see that
he has just enough gray sprinkled throughout his stubble to
look distinguished rather than old. If he were a college

TABLE 1-continued

Example of unstructured content (in this example, an example of a transcript).

5  professor, at least one student per class would have a crush
   on him. Maggie is plain in a way that age has cultivated into
   simple elegance. At high school reunions, the overweight,
   alcoholic salesmen who were once popular athletes wonder how
   they could have possibly overlooked her.
   JAMISON
10 This is the last day. You can take
   it to Goodwill tomorrow.
   MAGGIE
   Oh, I don't think so. Tomorrow it
   either goes out the window or under
   my tire. Or both.
15 JAMISON
   What happened to that sweet girl I
   married who was such a hippie she
   wouldn't even wear leather
   Birkenstocks?
   MAGGIE
20 She grew up. And then her husband
   took her iPhone away.

TABLE 2

Example of a training message that labels relevant parts of the unstructured content illustrated in Table 1 so that the model learns how to parse the unstructured content. Full text is omitted for clarity. Different numbers of training messages and their corresponding unstructured content may be used to train the model. In some instances, the number of training messages is 10000, although other numbers of messages may be used for particular needs or implementations. The training data (training messages and corresponding unstructured content) may be stored in the training repository 105. The example shown is a JSON structure with a single value called "messages". Messages is an array that contains three objects. Each object has a "role" and a "content" property. The role can be one of:
1. System: The high-level message to the LLM. This teaches it its personality, disposition, and objectives. In this case, "I reformat text-based screenplays into JSON data structures."
2. User: An example of text the user might pass in. In this case, unstructured text from a screenplay.
3. Assistant: How the assistant (LLM) should respond. In this case, with a data structure representing the scene.

{"messages":[{"role":"system","content":"I reformat text-based screenplays into JSON data structures."},{"role":"user","content":"Below is a scene from a screenplay formatted as text. Reformat the scene as JSON. Remove extraneous characters that are not part of the screenplay, and only return valid JSON.\n\nSUBVERSION\n\"Queenside Castle\"\n(Pilot)..."},{"role":"assistant","content":"{\"storyElements\":[{\"label\":\"frontMatter\",\"text\":\" SUBVERSION\n\"Queenside Castle\"\n(Pilot)...\""}]}

TABLE 3

Example of structured content. The structured content shown in Table 3 is transformed from the unstructured content illustrated in Table 1. This represents an example of output of the scene parsing model 129.

{"frontMatter": "SUBVERSION\n\"Queenside Castle\"\n(Pilot)\nWritten by\nChristian Cantrell,"storyElements": [{"label": "sceneHeading","text": "INT. DAVENPORT HOME - BEDROOM - MORNING"},{"label": "action","text": "CLOSE-UP on an ancient, split-flap alarm clock matching the mysterious background sounds. It's 7:59."},{"label": "action","text": "SUPER: "San Diego, California"\nWe know that at any second we will be assaulted by an unnerving, tooth-grinding buzz. We wait for it, but then a hand descends urgently upon the plunger."},{"label": "action","text": "The numbers flip anticlimactically to 8:00."},{"label": "action","text": "The hand belongs to MAGGIE DAVENPORT (40s) who has lunged, bodily, over her husband, JAMISON (40s), in order to prevent the imminent klaxon."},{"label": "characterName","text": "JAMISON"},{"label": "parenthetical","text": "(blearily)"},{"label": "dialogue","text": "What's going on?"},{"label": "characterName","text": "MAGGIE"},{"label": "parenthetical","text": "(wild-eyed)"},{"label": "dialogue","text": "I refuse to be awakened by that damn thing ever again."},{"label": "action","text": "As Jamison reaches for his tortoiseshell glasses, we see that he has just enough gray sprinkled throughout his stubble to look distinguished rather than old. If he were a college professor, at least one TABLE 3-continued Example of structured content. The structured content shown in Table 3 is transformed from the unstructured content illustrated in Table 1. This represents an example of output of the scene parsing model 129.

student per class would have a crush on him. Maggie is plain in a way that age has cultivated into simple elegance. At high school reunions, the overweight, alcoholic salesmen who were once popular athletes wonder how they could have possibly overlooked her."},{"label": "characterName","text": "JAMISON"},{"label": "dialogue","text": "This is the last day. You can take it to Goodwill tomorrow."},{"label": "characterName","text": "MAGGIE"},{"label": "dialogue","text": "Oh, I don't think so. Tomorrow it either goes out the window or under my tire. Or both."},{"label": "characterName","text": "JAMISON"},{"label": "dialogue","text": "What happened to that sweet girl I married who was such a hippie she wouldn't even wear leather Birkenstocks?"},{"label": "characterName","text": "MAGGIE"},{"label": "dialogue","text": "She grew up. And then her husband took her iPhone away."}]}

TABLE 4

Example of an input data structure for executing the screen parser model 129 to generate a summary.

[
  {
    role: 'system',
    content: 'I reformat text-based screenplays into JSON data structures.',
  },
  {
    role: 'user',
    content: 'Below is a scene from a screenplay formatted as text. Reformat the scene as JSON. Remove extraneous characters that are not part of the screenplay, and only return valid JSON.\n\nSUBVERSION\n\"Queenside Castle\"\n(Pilot)...',
  },
], HITL Retraining/Fine-Tuning Customized Human In the Loop ("HITL") processing: If the SP model fails to parse a scene, the user can provide an example of how to parse the failed scene via a GUI or other interface. The system generates a new training message based on the user example and can retrain or amend the model based on the new scene example.

Dynamic Platform Selection

The content parsing system 130 may perform dynamic model platform selection. For example, the content parsing system 130 may dynamically identify and select a model platform to use (OpenAI, MICROSOFT, etc.) based on various selection parameters such as context length, cost, performance, load, network congestion, output, system capabilities, and/or other criteria by which a model platform to use. Oftentimes this will involve selecting a corresponding API endpoint 111 for the selected model platform.

Model Failover—Dynamic Model Selection for Failure Mitigation with HITL Integration In some implementations, the content parsing system 130 may train and use a plurality of scene parsing models 129 for the same type of unstructured content 102. For example, if a first scene parsing model 129 fails to recognize a scene or other transcript element from a transcript, the content parsing system 130 may use a second scene parsing model 129 trained in a different way, and so forth until the transcript is successfully transformed to a structured format or until all of the second scene parsing models 129 have been tried. If all models have failed, then the content parsing system 130 may transmit a notification to the user of such failure. In some instances, HITL retraining may be used to train a new scene parsing model 129 or retrain a current one. Different scene parsing models 129 may be trained differently based on complexity and execution speed. For example, first training data used to train a first scene parsing model 129 may be simpler and less complex than second training data used to train a second scene parsing model 129. The first scene parsing model 129 in this example will train faster and take less computation resources than the second scene parsing model 129. For example, a first set of training messages for the first scene parsing model 129 may be less complex and have fewer ways to parse the transcript than a second set of training messages for the second scene parsing model 129.

Generative Content System

The generative content system 140 may generate content based on a user input, contextual data, semantic data, and/or other information. For example, the generative content system 140 may generate text using one or more language models 121, visuals using one or more image models 123, 3D scenes or environments using one or more 3D engine/models 124, and/or audio content using one or more audio models 127. The generative content system 140 may interact with these models through one or more iterations of the examples illustrated in FIGS. 2-5.

The user input may include natural language text, visual data, audio data, and/or other information related to the text to be generated. The contextual data may include information that provides an understanding of the intent, meaning or understanding of the user input. For example, the contextual information may include a scene of a transcript being viewed or interacted with by a user. The generative content system 140 in this example may use the contextual information to further understand the user input "give me two alternative endings to this scene." Other contextual information such as a cursor position on a screen to indicate focus on that part of a screen, a screenshot of the screen to understand what the user is viewing, text on screen, any highlighted features such as highlighted text, and/or other aspects of a screen being viewed by a user.

The semantic data may include meanings of underlying content that the generative content system 140 may use to generate the text content. Continuing the previous example, the generative content system 140 may leverage a semantic understanding of the words in the scene to generate two alternative endings to the scene. The generative content system 140 may therefore be aware of the context and/or semantics associated with a user input to generate text content in response to a user input. In particular, the generative content system 140 may use the prompt generator 115 to generate a prompt based on the user input, context, semantics, and/or other information.

Based on the user input, contextual awareness, semantic awareness, and/or other information, the generative content system 140 may perform content generation assistance, query functions, and summarization functions. To further illustrate the generative content system 140, examples using transcript assistance and functionality will be described.

Content Assistive Functions

The generative content system 140 may be used to write, revise, query or otherwise analyze a transcript. The generative content system 140 may a contextual and semantic understanding of the transcript and is able to add text relating to assets such as scenes, props, actors, lighting, etc., according to the overall meaning and context of the transcript. Visuals, audio, and/or other aspects related to the transcript may be added in an integrated and seamless manner through other systems described herein as well. Example User Input: "like I don't like Hank's name, give me some alternatives." User Input+transcript is provided to LLM, which analyzes the transcript to determine a new name for Hank. Example User Input: "what type of environment and lighting for this scene in this transcript"+transcript→LLM→response based on understanding of the transcript and contextual information identifying the scene being referenced or being viewed by the user.

Automatically Generating Content and Making Suggestions, and/or a System for Multimodal Creation.

For example, if I'm writing a story about a dragon, the system can automatically generate images of dragons, changing the dragon as I provide more detail. It can also generate alternatives for me to select. When I select an image, not only does it become part of my storyboard, but the system can also suggest changing the text to better match the image I selected. For example, if it generated a variation of a dragon with more voluminous wings, and I decide I like that, it can offer to rewrite my description so that the text is more consistent with the image.

Content Generation Based on Multimodal Input.

It may be that I want to adapt a novel to a screenplay; I should be able to start with the novel and have the system suggest a screenplay that I can use to start with.

I might find an image of a car I really like; I should be able to drag and drop it into my editor and get a description of that car generated as text.

If I want to capture a mood that a piece of music conveys, I should be able to import the music, and the system can then write text that conveys the mood of the music.

Multimodal Input System to Control Content

To get a character to pose correctly, turn on your webcam and make the pose yourself.

To give a character the right facial expression, hire an actor, turn on the webcam, and have the actor make the expressions (which are instantly transferred to characters).

Record all the lines for all the characters, then change things like gender, age, accents, etc.

Hum a tune as input for music.

Search Functionality

The generative content system 140 may provide search functionality to assist with content generation. To illustrate, the following is an example processing flow:

User Input: "find me all props in the transcript"

The generative content system 140 obtains the transcript and any contextual data, calls the prompt generator 115 to generate a prompt based on: (1) the user input and the transcript, and (2) any contextual information, any semantic information (such as from the transcript itself), any formatting conditions such as in table format, and/or other information.

Transmit the prompt to a language model 121.

Language model 121 returns a listing of props in a table format (if requested).

The generative content system 140 returns the listing of props via an interface.

Summarization Functions.

Example Flow:

User Input: "Summarize transcript up to this point."—context-based location summarization.

Generate LLM Prompt: "User is looking at a 50 scene transcript, currently looking at scene 25, and is asking for a summary up to this point. What scenes does the user need?"

LLM Response: 1-25.

System parses scenes 1-25 (such as via the Screen Parser) then provides a prompt to a pretrained model (such as the semantic summarization system 150) that requests a summary along with parsed scenes 1-25.

Summarization Including Semantic Summarization of Content

The semantic summarization system 150 generates summaries, reductions, or distillations of content. For example, the summarizer may generate textual summaries of screenplay transcripts. To generate the summaries, the summarizer implements data processing, such as MapReduce-like functionality, to divide content into chunks (such as different scenes of a transcript as generated by the custom scene parser—see above) and serially generate different resolutions of summaries.

The semantic summarization system 150 may provide preconfigured, user-modified, system-modified, or user-directed prompts to a language model 121 to generate the summaries. Different types of content will have different prompts. For example, a movie transcript will have different prompts to generate summaries than a TV show.

In some implementations, the semantic summarization system 150 may implement a multi-pass architecture for summarizations. To illustrate, reference will be made to FIG. 6, which illustrates a multi-pass generative AI architecture 600 for generating content summaries 620, according to an implementation. A content summary 620 is a summary, reduction, or distillation of original (non-summarized) content 610.

The multi-pass generative AI architecture 600 may include two or more passes 601 (illustrated as passes 601A-N) in which the original content 610 is summarized into a summary 620. The original content 610 may include a transcript and the summary 620 may include a summary, a reduction, or distillation of the transcript. The entertainment industry includes the summary 620 of a transcript as part of "script coverage" for the transcript. The particular number of passes 601 may vary according to particular needs.

The initial pass 601A will summarize different chunks of the original content 610 into first pass summaries 602A, 604A, 606A, 608A, 610A, and so forth. The number of first pass summaries will vary depending on the size and number of chunks of original content 610. For example, for transcripts, the initial pass 601A will include a scene-by-scene summaries. In this example, the semantic summarization system 150 may parse the transcript into different scenes using the content parse system 130. For each scene, the semantic summarization system 150 may use the prompt generator 115 to generate a prompt to summarize the scene and transmit the prompt (which includes the scene, a request to summarize the scene, and any contextual or semantic information) to a language model 121. The language model 121 will return a scene summary, which is illustrated as one of the first pass summaries 602A, 604A, 606A, 608A, and 610A. In some implementations, scenes in the first pass 601A are not merged together, maintaining separate summaries for each scene in the content 610. In particular, the semantic summarization system 150 may take a scene-by-scene approach by identifying scenes, and generating summaries of each scene without breaking apart the scene. This results in fully contextually aware summaries on logical chunks of the content, which may not be possible if chunks spanned two or more scenes. The semantic summarization system 150 may further select which LLM platform to use based on various parameters such as context window, cost, speed, current load, network congestion, output, system capabilities, and/or other parameters.

Each subsequent pass 601 may be a summary of two or more summaries from a previous pass. For example, as illustrated, summary 602B in pass 601B is a summary of summaries 602A and 604A from pass 601A. Likewise, summary 604B in pass 601B is a summary of summaries 608A and 610A from pass 601A. Pass 601B may continue until all previous summaries from 601A are summarized. Although two prior summaries from pass 601A are shown as being summarized into one summary in pass 601B, the number of prior summaries may vary. Summarization at pass 601B and any subsequent passes may be performed as described with respect to pass 601A until the final pass is reached to generate the summary 620. For example, summaries in the final pass (601N as illustrated) may be aggregated together to generate the summary 620. If the transcript were a screenplay transcript, the summary 620 could be a logline or a short summary of the entire screenplay or both. The summaries from pass 601A could be scene by scene summaries while the summaries in pass 601B could be a summary of certain (two or more) scenes.

It should be noted that the multi-pass generative AI architecture 600 may be associated with specific and targeted prompts for each summary (such as 602A, 602B, 604A, 604B, 608A, 610A) and/or each pass 601A-N. Alternatively or additionally, a different model platform/language model 121 may be used for each summary (such as 602A, 602B, 604A, 604B, 608A, 610A) and/or each pass 601A-N.

Harmonization Pass

Oftentimes, generative AI models (such as the language model 121) may generate slightly different content because they can be nondeterministic. Alternatively or additionally, different prompts may be used for each chunk's summary in each pass 601. As a result, each summary in a given pass 601 may have a different tone, style or other characteristic than another summary in the same pass or another pass. An overall summary 620 generated from these summaries may therefore have a combination of different tones, styles, or other characteristics as an artifact of generative AI summarization in the multi-pass generative AI architecture 600.

To reduce or eliminate these artifacts, the semantic summarization system 150 may perform a harmonization pass to make content generated by multiple threads more consistent. To illustrate, reference will be made to FIG. 7, which illustrates a harmonization pass 701 in the multi-pass generative AI architecture 600 (illustrated in FIG. 6 and partially illustrated as architecture 700 in FIG. 7 for clarity) for generating content summaries, according to an implementation. Instead of aggregating the summaries in the final pass 601N (more fully illustrated in FIG. 6), the semantic summarization system 150 may implement a harmonization pass 701. In the harmonization pass 701, the semantic summarization system 150 may generate (such as via the prompt generator 115) a prompt to summarize the summaries 712N and 714N in the final pass 601. In some instances, the prompt may include an instruction to generate a summary 702H with a consistent tone, style or other characteristic. The semantic summarization system 150 may transmit the prompt to a language model 121 for summarization. Responsive to the prompt, the language model 121 may return the summary 720.

It should be noted that the multi-pass generative AI architecture 600 and harmonization pass 701 may be used in contexts other than transcripts to summarize original content.

Reduction or Elimination of Generative AI Model Hallucination

Oftentimes generative AI models such as LLMs "hallucinate" when generating content. A hallucination is when generative AI models create inaccurate, misleading, or false content. For example, language models 121 may hallucinate because they are trained on large amounts of language data, which can include incomplete or incorrect information. Furthermore, weak prompts may further confuse the language models 121. In the context of summarization, this hallucination can create content such as text in a summary that was not in the original content being summarized or otherwise provide inaccurate summaries of events that did not occur. The semantic summarization system 150 may implement solutions to reduce or eliminate hallucinations. For example, semantic summarization system 150 may use templates for providing guardrails.

Table 5 illustrates an example of a generative AI hallucination guardrail template.

| INT. conference room org |
| [summary] |
| EXT kitchen |

The template specifies a starting scene "conference room" and a transition to a next see "kitchen." The "[summary]" placeholder is a template block that indicates what to summarize (the "conference room" scene. The semantic summarization system 150 may prompt the language model 121 to fill in the [summary] section with a summary of the conference room scene as indicated in the template. The foregoing places guardrails around the content that the language model 121 should consider for summarization and reduces or eliminates hallucinations that may result from conflating the scene with other scenes or otherwise taking into account too much input content. It should be noted that the hallucination guardrail may be used in contexts other than for transcript summaries. For example, guardrail templates may similarly place limits around other types of content, such as limiting summarization to specific parts of an online news article, novel chapter, etc. Furthermore, templated approaches may be used in other generative AI contexts other than summarization. For example, templated approaches may limit the specific material considered to generate new content.

Self-Correcting Content Generation

The self-correcting generative system 160 may analyze and correct content generated by generative AI models across different types of media such as visual, audio, and text. The content to be corrected may include a prompt (generated by a human user and/or the prompt generator 115), a conversation between a user and the computer system 110, automatically generated content (such as by the computer system 110), and/or other content input to the self-correcting generative system 160. A conversation as used herein includes at least one input from a user and at least one response from the computer system 110. In some instances, a conversation may include multiple inputs from the user and/or multiple responses or inputs from the computer system 110. In either example, the computer system 110 may temporarily or permanently store the conversation to use as context for future responses, training, and/or other purposes.

Generative AI models often cannot recognize mistakes in its output, determine that the output is inconsistent with the user's request, or is inconsistent with the user's expectation. 3D models 124 may suffer from similar problems. The self-correcting generative system 160 may mitigate these mistakes through self-correcting iteration of model outputs. For example, the self-correcting iteration may be based on iterative generation and execution of text prompts 201 and/or machine inputs 203 illustrated at FIGS. 2-5, depending on the task to be performed. Various example flows will be described as non-limiting illustrations of self-correcting iteration based on the data flows illustrated at FIGS. 2-5.

Example Flow 1—Iteratively Correct Visual Output of a Generative AI Model

User input: "give me a closeup of this character" and uploads an image of the character, user identifies a character in a visual, or contextual information identifies the character (such as user cursor or focus on the character).

The self-correcting generative system 160 uses the prompt generator 115 to generate a text prompt for a language model 121 to understand the request.

The language model 121 returns a text prompt for the image model 123.

The self-correcting generative system 160 provides the text prompt to the image model 123 along with the image that includes the character.

The image model 123 generates an output image.

The self-correcting generative system 160 uses the prompt generator 115 to generate a text prompt "Did what I try to do satisfy the request?"

The language model 121 returns a second text prompt that prompts the image model 123 to verify that the image is a closeup of the character such as with the character's head entirely in the frame and not cutoff.

The self-correcting generative system 160 provides the second text prompt to a computer vision model 125 along with the original image that includes the character and the output image from the image model 123.

The computer vision model 125 returns a response indicating whether or not the request was satisfied based on the second text prompt, the original image, and the output image.

The process is automatically iterated until a satisfactory response is achieved. In some instances, the process is automatically iterated until a maximum number of times at which point the self-correcting generative system 160 may notify the user that there may be a problem with fulfilling the request (along with one or more of the iterative image outputs for review).

Example Flow 2—Iteratively Correct 3D Output of a 3D Model/Engine

This feature will also incorporate control and interface with various visuals, including 3-D. These features enable natural language or other user inputs to control even 3-D scenes and other visuals.

It should be noted that other aspects such as text, audio, visual may similarly be checked for self-correction individually and in combination with one another based on the workflow examples above. For example, another example workflow may perform self-correction on text generation to ensure that requested text generation has been correctly satisfied. Yet another example workflow may perform self-correction on audio generation to ensure that requested text generation has been correctly satisfied. Combinations of content checking may be performed to ensure that requested generation of a combination of text, audio, visual, and/or other type of content has been satisfied using similar workflows.

It should be further noted that the same models may be used to generate content and verify generated content. For example, the same generative language model 121 may be used to both generate text as requested and correct or validate that the generated text is correct. Alternatively, a first generative language model 121 may be used to generate text as requested and a second generative language model 121 may be used to correct or validate that the generated text is correct.

Segmentation and Inpainting

The segmentation and inpainting system 170 may segment a visual and/or inpaint content into the visual. Image segmentation is a computer vision process that identifies different parts of an image. Image segmentation or simply removal can be used to delimit an element in or portion of an image. For example, image segmentation (such as via the Segment Anything Model (SAM)) can be used to identify and mask layers, portions, or even specific items in an image, such as sunglasses. Inpainting can then be used to fill in the segmented part, such as sunglasses, along with filling in remaining corresponding portions, such as those left after removal of the sunglasses and filling with the eyes. This can be used to add elements as well, such as adding sunglasses to an image of a face by masking off where sunglasses would be in the image of the face and then filling it with an image of sunglasses.

Examples of workflows are provided for illustration and not limitation:

In one example workflow, a user may provide the segmentation and inpainting system 170 with an image of a face wearing sunglasses. For example, the user may upload the image via a user interface 122. The user may further provide an input that makes the following request: "replace the sunglasses in this image with soulful eyes." The segmentation and inpainting system 170 may generate a prompt (via the prompt generator 115) and transmit the prompt to a language model 121, which may generate an instruction for the segmentation model 131 to mask the sunglasses from the image and an instruction for the inpainting model 133 to fill in images of eyes that are consistent with the requested description. Other examples of workflows may be similarly created to replace one image element with another similar image element (such as "replace the green tie with a red tie." Still other examples of workflows may include more advanced semantic processing, such as "create a poster for these actors in a western movie" with an input of actor images. The image model 123 may generate a background that is appropriate for the "western" genre, masks off items where characters (actor images) would be placed and add the characters (actor images) to the background. It should be noted that the actor images may similarly be changed by the image model 123 to be consistent with the western genre (such as by masking image items of actor images and replacing them with western themed image items). It should be further noted that the prompt generator 115 may use contextual, semantic, and/or other data described herein to generate the visuals, which can include 2D visuals and 3D visuals.

Multi-Modal Consistency Verification

Figure 9:
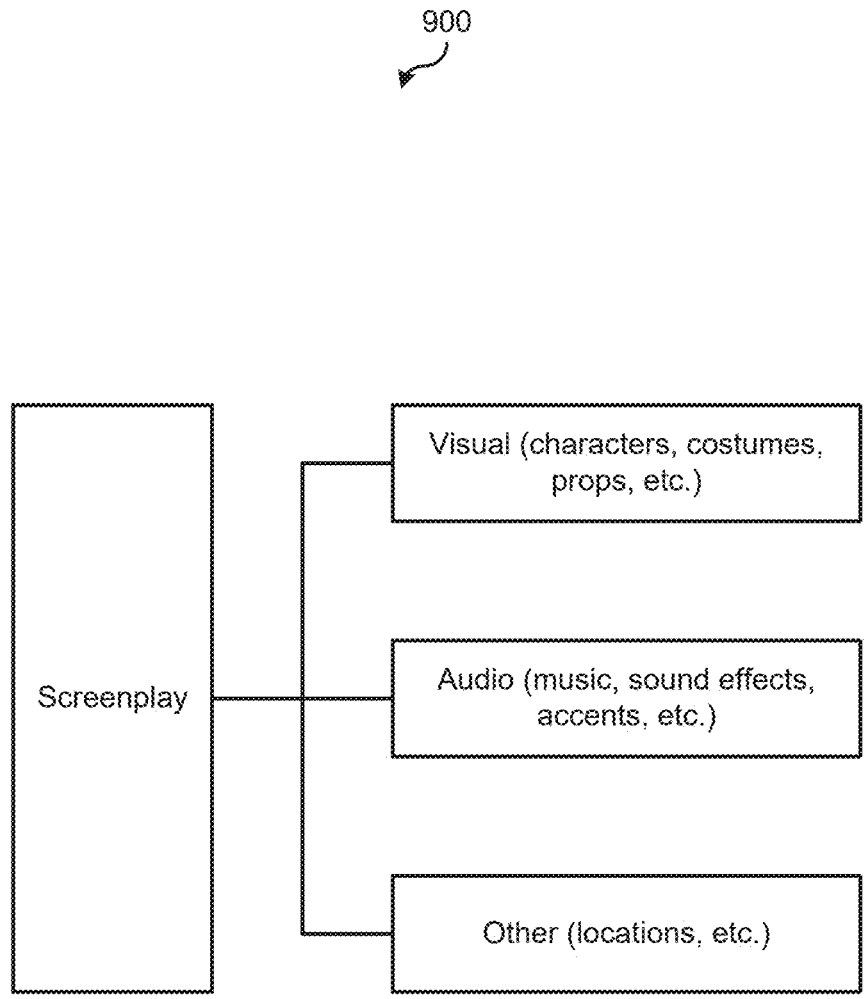
FIG. 9 illustrates a schematic example of a screenplay and various screenplay elements, according to an implementation.

The multi-modal consistency verification system 180 provides multi-modal consistency checks across all types of content (visual, audio, text, etc.). The system ensures that the various modes (i.e. transcript, props, scene depiction, etc.) are consistent with one another. FIG. 9 illustrates a schematic example 900 of a screenplay and various screenplay elements, according to an implementation. These and other screenplay elements may be checked for consistency with respect to one another. For example, suppose that the transcript says Sam is wearing a green tie. The props and scene depiction describe only a red tie. The multi-modal consistency verification system 180 may detect and mitigate this inconsistency. In another example, the order of scenes is changed. The system can ensure the storyboard images are reconciled with the new order. In another example, scene-to-scene verification can include determining that a skiing scene has been deleted and therefore, that another scene of the same person buying skis, should either be removed or at least, its continued inclusion in the transcript be questioned. Checker makes sure the various modes are consistent, changes one match the other modes and/or vice versa. Checker executes across all modalities, including visual, audio, emotion, etc.

To detect the inconsistency, the multi-modal consistency verification system 180 may identify and track each screenplay element (whether text, visual, audio, etc.) with respect to one another. In one example, the multi-modal consistency verification system 180 may track the transcript and its elements according to a graph-based data structure in which each scene is a node having various attributes (scene items such as visuals, text such as dialog or narration, etc.). In this way, a change to the order of scenes may be detected. Likewise, attributes such as tie worn by a character may be checked across nodes.

In some examples, the multi-modal consistency verification system 180 may detect changes to the transcript and/or its elements through diff tracking or embeddings.

In diff tracking, a diff is a change between different versions (such as a change from one version to a next version or a change from a current version to a prior version). Usually, but not necessarily, a root and complete version of the transcript and its elements is stored and any change is stored as a diff. A latest version of the transcript and its elements may be generated by obtaining the root version and applying all the diffs. If a change is made, such as a green tie being changed to a red tie, only this change will be stored as a diff. Through these diffs, the multi-modal consistency verification system 180 may identify inconsistencies that a given diff may have introduced as compared to a previous version of the transcript (such as by reviewing other diffs and/or the root version of the transcript and its elements).

For embeddings, the transcript and its elements may be converted to embeddings, or numerical representations for fast difference checking. When a new change is made, a new embedding representing the changed item or transcript will be generated. Inconsistencies may be detected when embeddings do not match as expected.

In response to a detected inconsistency, the multi-modal consistency verification system 180 may provide a notification (such as via an electronic communication channel or a user interface 122) to a user, guide the user to correct the inconsistency, or automatically correct the inconsistency. To automatically correct the inconsistency, the multi-modal consistency verification system 180 may use the prompt generator 115 to generate a prompt for a language model 121 to make a change to a transcript, a prompt for an image model 123 or 3D model 124 to make a change to a visual, and/or other make other changes to automatically correct a detected inconsistency. To guide the user, the multi-modal consistency verification system 180 may suggest prompts or other actions to take to resolve the inconsistency. For example, the multi-modal consistency verification system 180 may suggest that the user change green ties to red ties in all visuals and all portions of the transcript. In some instances, the multi-modal consistency verification system 180 may suggest an appropriate correction to an inconsistency based on various factors, such as timing, contextual or semantic data. For example, the multi-modal consistency verification system 180 may suggest that green ties in visuals should be changed to red ties because red ties were more recently indicated in the transcript. In another example, the multi-modal consistency verification system 180 may suggest that red ties be used based on contextual information that red ties are more seasonal (due to a holiday season). In another example, the multi-modal consistency verification system 180 may suggest that red ties be used from semantic information about a character that exhibits a preference for the color red in the transcript or other visuals.

Harmonization Modeling

In some implementations, the multi-modal consistency verification system 180 may use the harmonization model 135 to ensure that lighting, shadows, audio, or other aspects of the transcript are appropriate and consistent. This differs from the consistency checks because the lighting, for example, may be consistent from scene-to-scene but may be incorrect for the mood of the transcript. For example, suppose that an apple has been inpainted onto a wooden workbench, but its lighting and shadowing indicate a light source different from that shown by the grainy ridges of the worn wooden workbench on which the apple sits. The harmonization model can check as to whether there is a light source orientation problem (or be told there is such a problem) and then identify and reconcile one or more appropriate orientations and/or light sources, natural or man-made. In another example, the user sees a hat they like in another image. They select it and paste it into another photo. The system understands to remove everything but the hat from the pasted layer, and to resize it appropriately. The harmonization model pass then makes the hat appear to be realistic in the target image.

Figure 2:
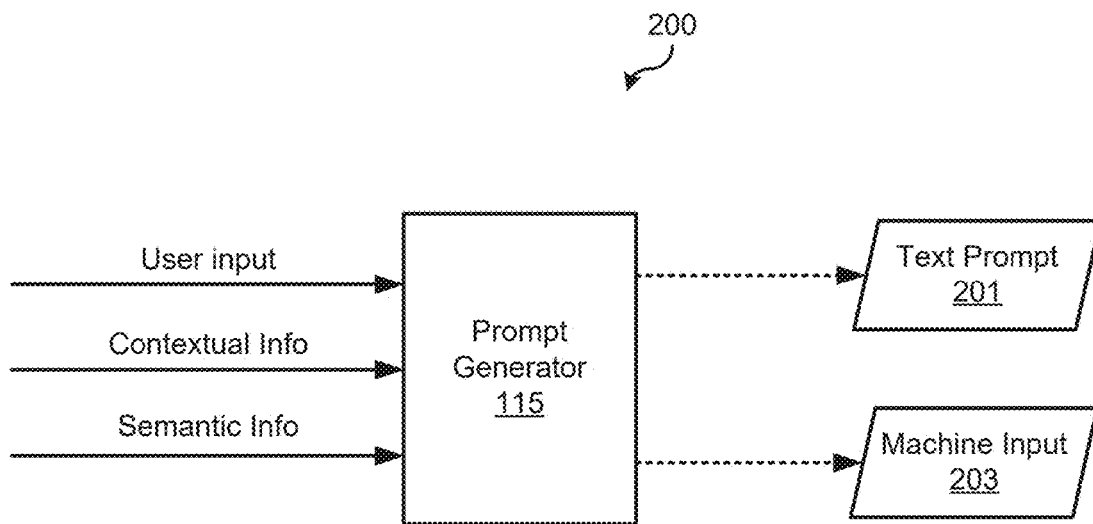
FIG. 2 illustrates a schematic flow for dynamic prompt generation based on user input, contextual information, and/or semantic information, according to an implementation.

FIG. 2 illustrates a schematic flow 200 for dynamic prompt generation based on user input, contextual information, and/or semantic information, according to an implementation. The prompt generator 115 may access user input, contextual information, and/or semantic information and generate a text prompt 201 or a machine input 203. A text prompt 201 is a prompt that is intended to be provided as input to a model using text that a human user would understand such as words or phrases in natural language prose. A machine input 203 is a prompt that is intended to be provided as input to a model without using machine instructions that does not primarily use natural language prose, such as vector data, pseudocode, software code, or other machine readable information. The machine input 203 is generally intended as input for 3D engine/models 124 or other models that take in machine instructions.

User input may include user-provided queries, text, visuals, audio, and/or other types of content to request a response from the computer system. For example, a user input may include a query such as "what is the tone of this scene?" or a command such as "show me what Hank should look like." The user input may also or instead include other types of data such as a visual along with a question "does the hat in this image fit with Hank's character?"

Contextual information may include information that provides context around what is being requested. Contextual information may include some or all of the user profile information, user interface state information, content currently being viewed or interacted with (such as a transcript or scene in the transcript), and/or other information that may provide a context of what is being requested. User interface states may include an identification of the screen being viewed, a focus area on the screen, a highlighted area of the screen, a typed or other input made via the user interface, and/or other information about how the user is interacting with the user interface. For example, contextual information may be used to identify the scene being referred to in the query "what is the tone in this scene?"

Semantic information may include the meaning of content being viewed or data relating to what is being requested. For example, the of words of the dialog or narration in "this scene" may be used to identify the tone in the scene by a downstream model and therefore the prompt generator 115 may dynamically extract the words or other semantic information from "this scene" and generate the text prompt 201 and/or machine input 203 accordingly. Thus, the prompt generator 115 may use some or all of the inputs to dynamically generate the text prompt 201 and/or the machine input 203.

Figure 3:
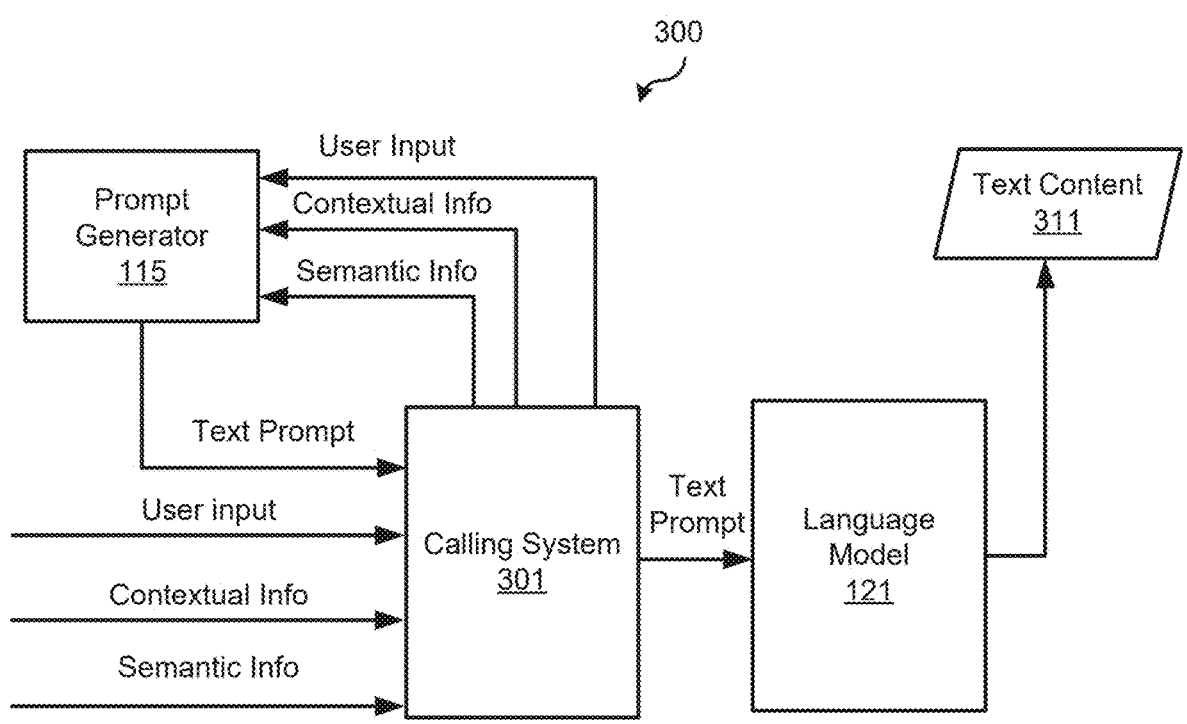
FIG. 3 illustrates a schematic flow for automated text generation based on a generative AI model and text prompt generation, according to an implementation.

FIG. 3 illustrates a schematic flow 300 for automated text generation based on a generative AI model and text prompt generation, according to an implementation. A calling system 301 may access a user input, contextual information, and/or semantic information relating to the user input and execute the prompt generator 115 to generate a text prompt. The calling system 301 may be any of the components illustrated in FIG. 1, including, without limitation, systems 120, 130, 140, 150, 160, 170, and 180. In particular, the calling system 301 may be the generative content system 140 that uses the prompt generator 115 to generate a text prompt for a language model 121, which generates the text content 311 responsive to the text prompt. It should be noted that the text content 311 may be a text prompt or machine input for another model. In this example, the language model 121 is used to understand user inputs, context, and/or semantics to generate appropriate text prompts or machine inputs.

Figure 4:
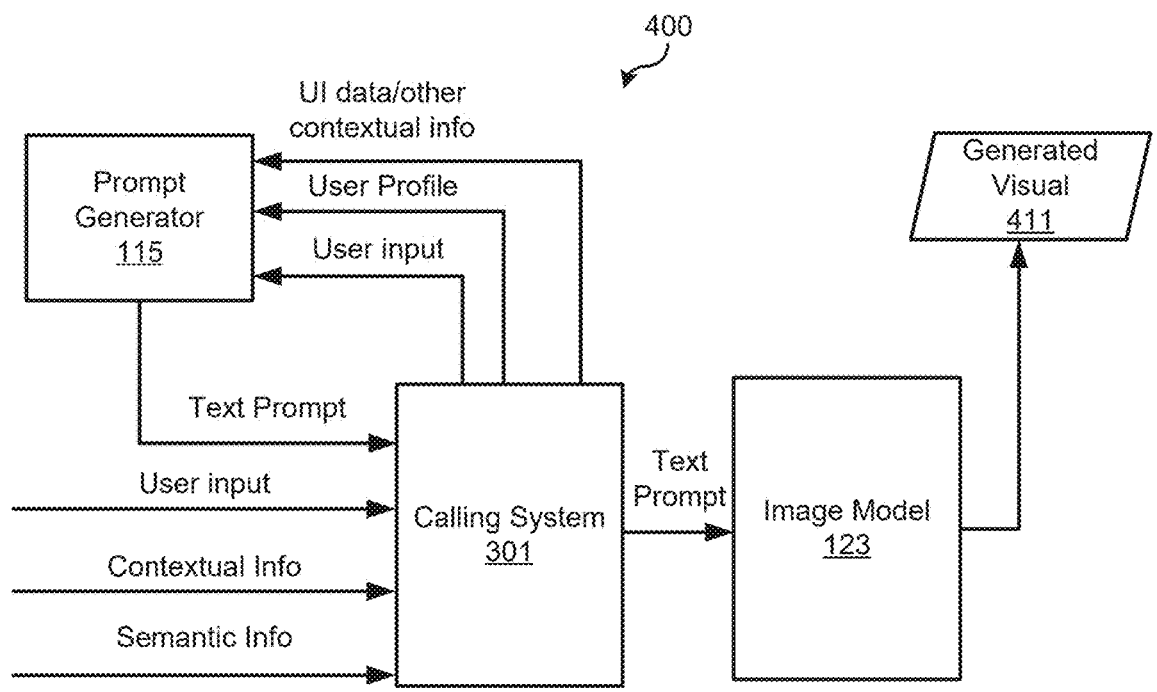
FIG. 4 illustrates a schematic flow for automated visual generation based on a generative AI model and text prompt generation, according to an implementation.

FIG. 4 illustrates a schematic flow 400 for automated visual generation based on a generative AI model and text prompt generation, according to an implementation. A calling system 301 may access a user input, contextual information, and/or semantic information relating to the user input and execute the prompt generator 115 to generate a text prompt. The calling system 301 may be any of the components illustrated in FIG. 1, including, without limitation, systems 120, 130, 140, 150, 160, 170, and 180. In particular, the calling system 301 may be the generative content system 140 that uses the prompt generator 115 to generate a text prompt for an image model 123, which generates the generated visual 411 responsive to the text prompt. The text prompt may alternatively be targeted for a computer vision model 125 (not illustrated) to ask questions about an image to the computer vision model 125. In this example, the calling system 301 may be, for example, the self-correcting generative system 160.

Figure 5:
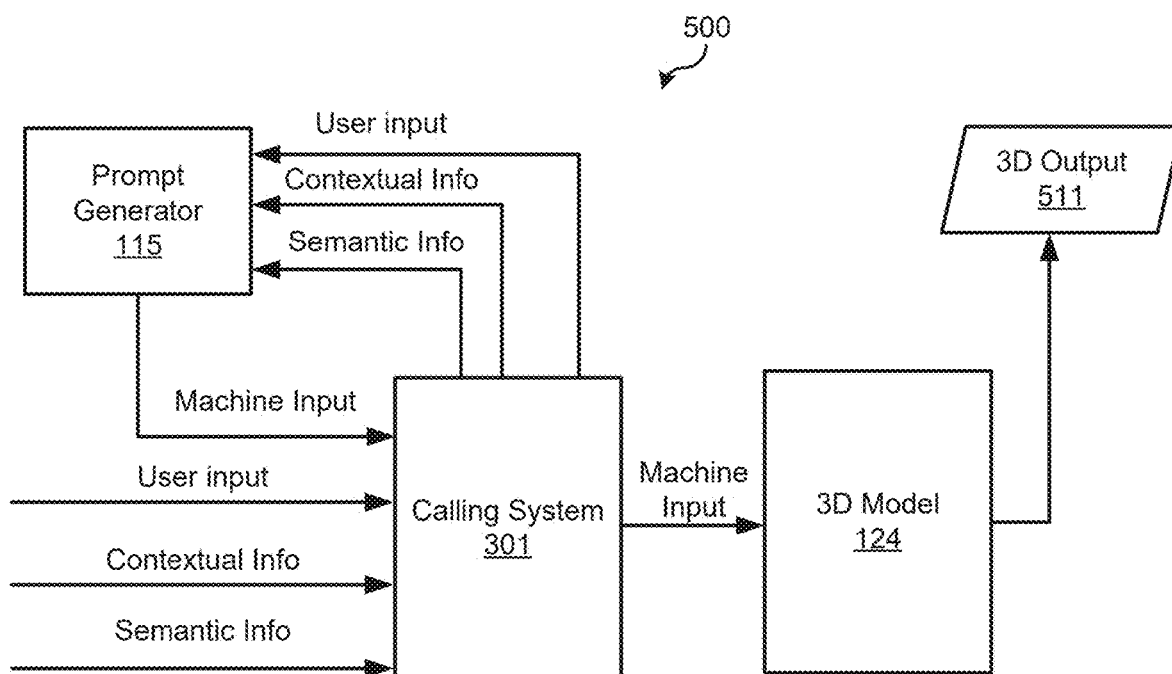
FIG. 5 illustrates a schematic flow for automated 3D output generation based on a generative AI model and machine input generation, according to an implementation.

FIG. 5 illustrates a schematic flow 500 for automated 3D output generation based on a generative AI model and machine input generation, according to an implementation. A calling system 301 may access a user input, contextual information, and/or semantic information relating to the user input and execute the prompt generator 115 to generate a text prompt. The calling system 301 may be any of the components illustrated in FIG. 1, including, without limitation systems 120, 130, 140, 150, 160, 170, and 180. In particular, the calling system 301 may be the generative content system 140 that uses the prompt generator 115 to generate a machine input for a 3D engine/model 124, which generates the 3D output 511 responsive to the machine input.

It should be noted that the schematic flows 200-500 illustrated in FIGS. 2-5 may be iterated by one or more systems to iteratively generate, revise, correct, or otherwise update various types of content such as text, visuals, audio, and/or other types of content as illustrated in various example and example workflows described herein throughout.

Figure 8:
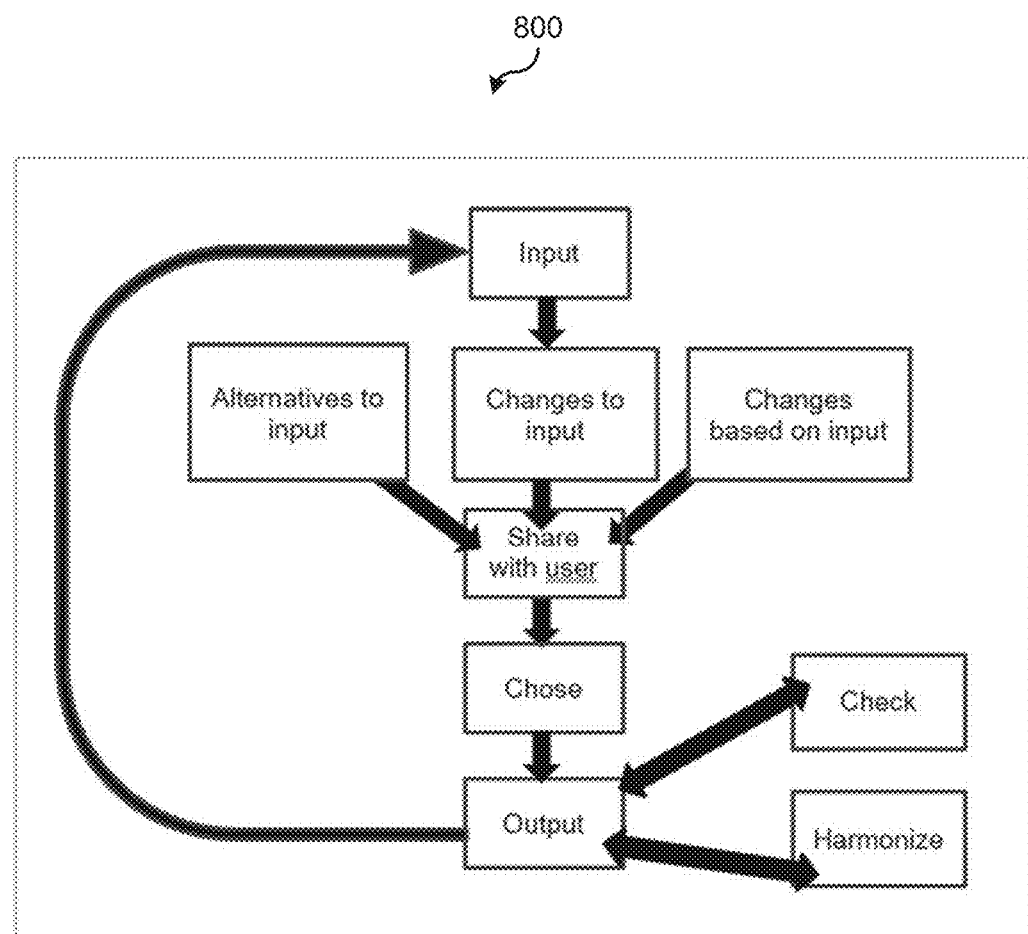
FIG. 8 illustrates a schematic flow for iterative content generation, according to an implementation.

FIG. 8 illustrates a schematic flow 800 for iterative content generation, according to an implementation. In the schematic flow, an input is received. The input may be to generate content. This illustrated example will use generation of transcript text as an example, although other types of content can be generated alone or in combination with other types of content based on the schematic flow 800. Alternatives to the input, changes to the input, and changes based on the input may be shared with the user. These alternatives or changes may relate to different versions of some or all of the transcript, such as changes to a scene. These alternatives or changes may be suggested by the system or uploaded by a user. The alternatives or changes may be shared with the user, who may select one or more of the alternatives or changes. For example, the user may prefer a particular version of a scene. The output, or selected alternative or change, may be checked for consistency and/or harmonization, such as by the self-correcting generative system 160. It should be noted that at least some of the alternatives or changes may be obtained through the processing flows described at FIGS. 2-5.

Referring to FIGS. 10-23, shown are example illustrations of features in a graphical user interface (GUI) that utilize various modules of the platform 100, according to some implementations. The GUI may allow a user to visualize and hear features of a screenplay through the use of generative AI. In general, the GUI provides the common user interfacing connection point to any of the AI models that are provided in the platform 100, such as the language model 121, image model 123, computer vision model 125, audio model, 127, scene parsing model 129, segmentation model 131, inpainting model 133, and harmonization model 135. The GUI allows the user to express what features of the screenplay they want the platform 100 to generate or modify visually and auditorily using the AI models. To do this, in general, the user's inputs into the GUI will be received and then converted by the prompt generator 115 into an appropriate query that has suitable syntax and input features for one or more of the AI models to create an intended output. The query generated by the prompt generator 115 may be passed through to the API endpoint 111 to one or more of the various AI models as appropriate, the type of models depending on what the user is asking for. The one or more AI models will then produce a depiction of the user's query, the platform 100 will ultimately cause the GUI to display the AI generated result in the GUI for the user. The GUI therefore provides an interface for the user to express in exploring various features of a screenplay without needing to manually interface with each individual AI model. Rather, the GUI provides the engine for essentially translating the user's intentions about exploring the screenplay into appropriate queries that the AI models utilize to generate the desired outputs.

Referring to FIG. 10, shown is an example initial display panel of the GUI, according to some implementations. On the left side are various elements 1002, 1004 that represent categories of what goes into producing a film or video that expresses a screenplay. These may be referred to as cards. Card 1002 is a graphical module for viewing and analyzing the script, while card 1004 is a graphical module for visualizing various styles of scenes that are contained in the screenplay. As other examples, card 1006 is a graphical module for visualizing and modifying the characters expressed in the screenplay. Card 1008 is a graphical module for hearing samples of what kind of music may be appropriate for various scenes in the screenplay. The card 1010 provides a graphical module for reviewing, analyzing and in some cases modifying the market or the target audience of the screenplay. The GUI also provides more options for adding or removing other modules that focus on different features of a movie or video that express the screenplay, shown in the module 1012. These cards 1002-1010 may be dragged and swapped within the GUI, according to some implementations.

In addition, prompt box 1020 provides a textual interface to enter queries to the platform 100 about the screenplay that is under consideration. The GUI will then convert the user's query into appropriate inputs for one or more of the AI models to generate content appropriate to the user's query. As an example, the user may type in the prompt a question, "What does Ed Rama look like?" In this example, Eduardo Rama is written in the screenplay as one of the characters, and the screenplay may not provide a succinct description of Eduardo Rama, but does contain his lines throughout, possibly some descriptions of his mannerisms or movements, and various contexts about his interactions with other characters. From just this prompt alone, the platform 100 may search through the entirety of the screenplay to find features of Ed Rama that are useful to provide to the one or more AI models for content generation. The prompt generator 115 may then create an appropriate prompt to feed to the one or more AI models that is based on the collective content about Ed Rama in the screenplay. For example, in response to the user's query, the prompt generator 115 may search through the entire screenplay to find any and all evidence about Ed Rama's characteristics. This may be based on lines that the character Ed Rama states, any narrative statements about Ed Rama's movements, clothes he wears, actions he takes, environments he resides in, and/or dialogue with other characters and what tones those may suggest, etc. The prompt generator 115 may then create an appropriate prompt that represents a description of Ed Rama that can be fed to the one or more AI models via the API endpoint 111. The one or more AI models may then produce at least a visual depiction of Ed Rama that the GUI can then display.

In this example, it can be seen that the platform 100, through the GUI, acts as a sort of translator or interpreter of the screenplay to provide appropriate inputs to the AI models. The user merely needs to ask questions about the screenplay without necessarily even knowing the full details of the screenplay, and the platform 100 then performs the work of examining the screenplay to find appropriate details to feed to the various AI models for content generation.

Still referring to FIG. 10, in addition to the displaying a visual depiction of a character, the GUI can display one or more outputs as answers from prompts inputted by the prompt box 1020, as shown in the posts 1022, 1024, 1026, 1028, and 1030. For example, in the post 1022, the user may have asked the question, "What does Ed Rama sound like?" Using the process described above but applying it to this question, the GUI may have responded back with the post 1022 that includes an example audio clip of Ed Rama's voice saying a line in the script. In this case, the prompt generator 115 may have sent the prompt to the audio model 127 via the API endpoint 111.

As another example, post 1024 may have been based on the user asking the question, "Tell me the backstory of Ed Rama." The platform 100 may have developed the answer posted there based on some lines Ed Rama says in the script, descriptions of his character in the screenplay, and so on. As another example, in post 1028, the user may have asked in the prompt box 1020, "What is Ed Rama's exit scene?" While in post 1030, the user may have asked in the prompt box 1020, "What is Ed Rama's intro scene?" These answers may have again been provided based on the information contained in the screenplay and prompts fed to the one or more AI models.

Referring to FIGS. 11-23, the additional example features of the GUI described below may be implemented using the same principles and concepts described in FIG. 10, in reference to the GUI acting as a wrapper or translator of the screenplay and providing the prompts to be fed into the various AI models. Referring to FIG. 11, the GUI may also provide features to include additional display elements from the Add card 1012, according to some implementations. For example, the Extras card 1102 may be added as shown by selected it from the Add card 1012.

Figure 12:
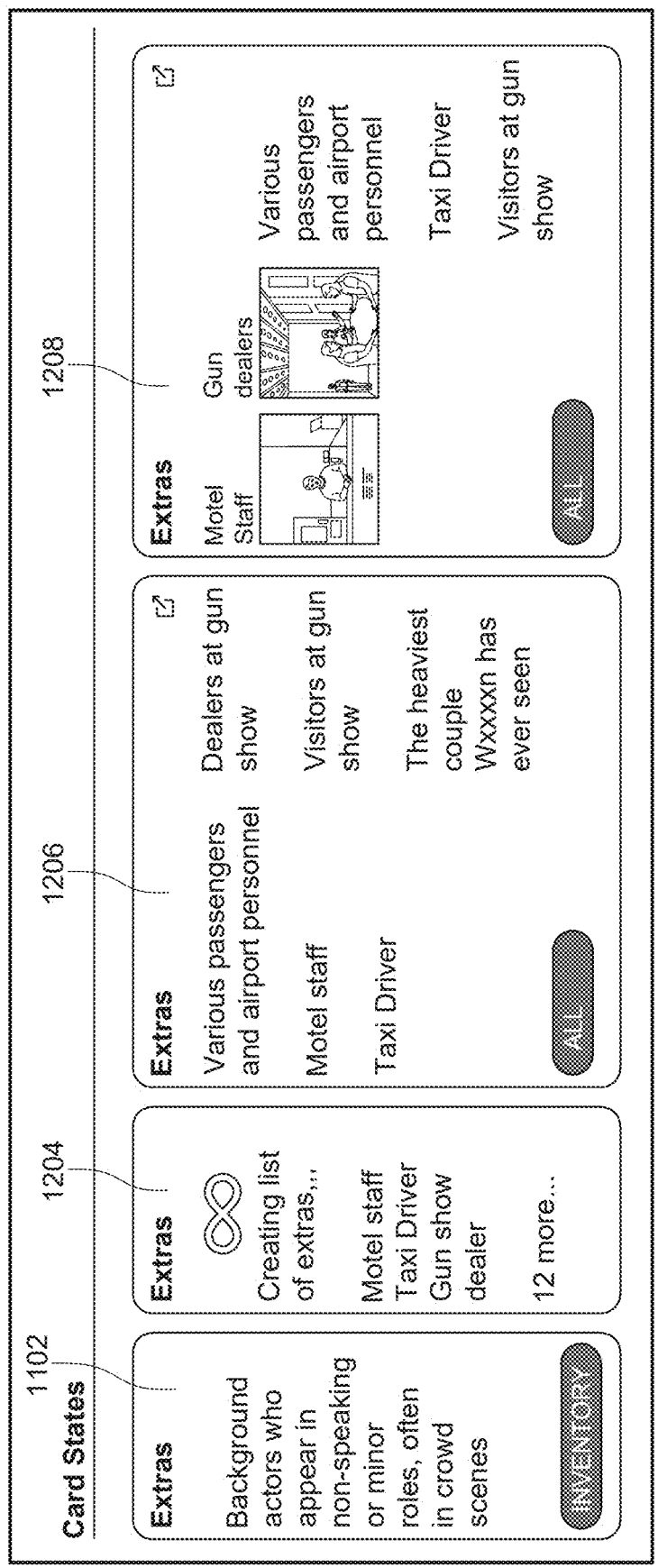

A follow-up step after creating the new card would be to populate the card with details derived from analyzing the screenplay. Referring to FIG. 12, shown are various displays for how extra details in a card may be established, according to some implementations. Shown here is an example of adding details to the "Extras" card that represent the extras in a movie. These details may include their descriptions, numbers, behaviors, and their context in various scenes. At 1204, the GUI may start populating information in the Extras card 1102 by analyzing the screenplay for explicit mentions and implicit presence of extras throughout. For example, the extras may be stated in the screenplay as taking some kind of action in the background. As another example, the platform 100 may infer that a scene should include extras based on the context of the environment, such as the scene takes place in a crowded urban environment.

At 1206, the GUI may then list the types of extra it found or inferred in the screenplay. At 1208, based on a user prompt or selection in the GUI, the Extras card 1208 may be further populated by visual depictions of what the extras may look like in the context of their scene according to the descriptions in the screenplay. Again, these generated images and lists of extras may be produced by an exchange between the prompt generator 115 and the AI models through the API endpoint 111, in a manner similar to the process described in FIG. 10.

Figure 13:
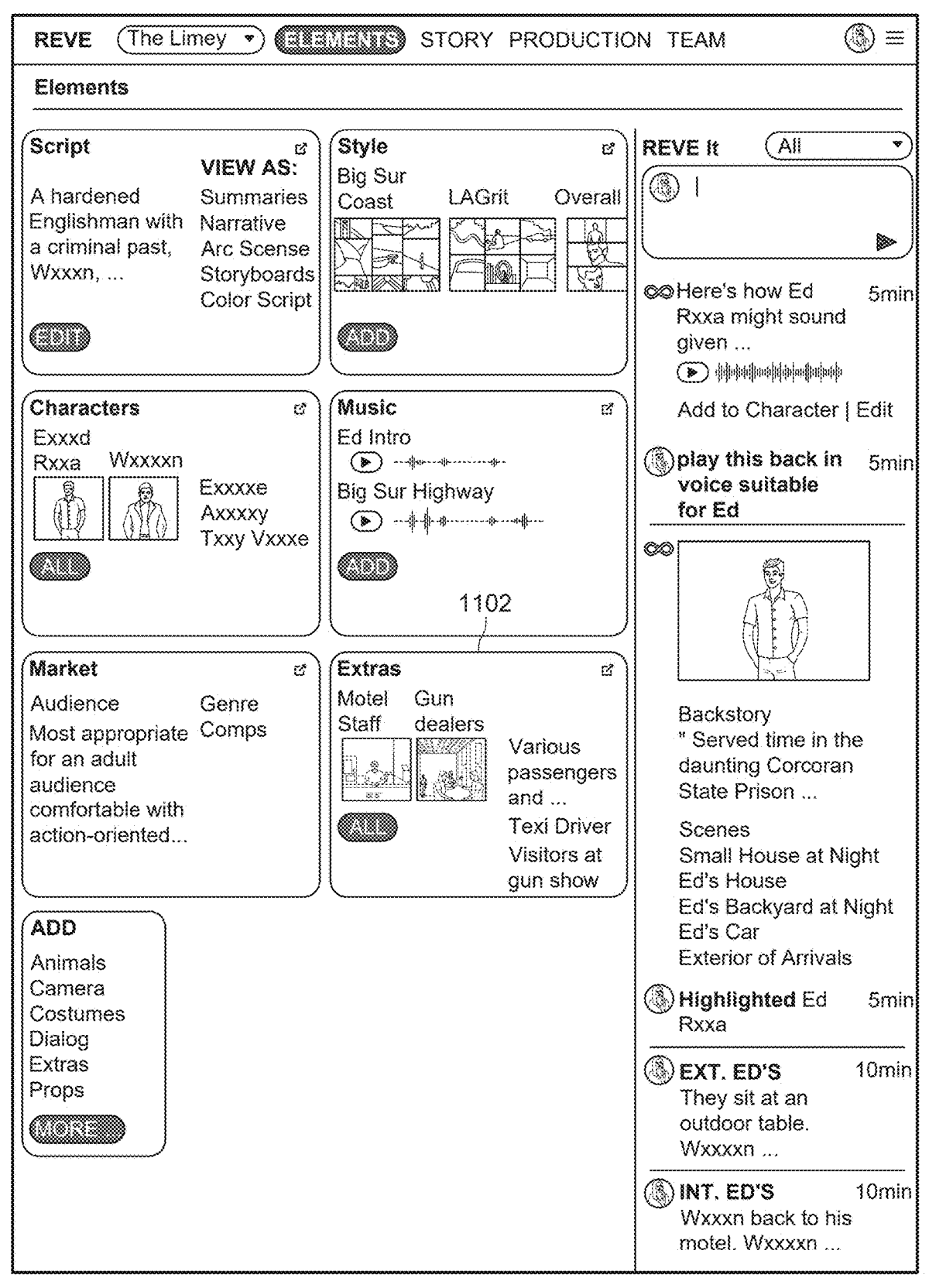

Referring to FIG. 13, shown is how a new card, in this case, the "Extras" card 1102, can be added to the bulletin board panel after it has been populated with content from the process in FIG. 12. The GUI may also allow for each card to be expanded to view additional details populated in each card. The user may select the "All" button, for example, to view an expanded set of information that is contained in that card.

Figure 14:

Referring to FIG. 14, shown is another example of a display of characters and various possible depictions of characters that were produced in response to prompts from the user, according to some implementations. As previously mentioned, the right side of the GUI dashboard may display the chronological outputs of queries provided by the user. In this example, the user may have asked for multiple iterations of a depiction of the character Edward Rama. The user may have asked for changes to how the character may look, behave or some other personality trait. The GUI may then have produced different outputs according to those prompts, as shown in the example depictions 1402. Further down, in illustration 1404, the user may have explored the depiction of another character, Wilson. Shown is the 45$^{th}$ iteration of Wilson, that may have been guided by inputs provided by the user.

Similar to the examples in FIGS. 10-13, the prompt generator 115 may have processed the user's general, vague, or less-detailed queries and then generated a more specific prompt to be fed to the one or more AI models to produce the example character depictions 1402 to 1404. The prompt generator 115 may have also combined the contexts of the character found in the screenplay.

Referring to FIG. 15, shown is a second display panel of the GUI featuring interfaces for an in-depth exploration of the story as described in the screenplay, according to some implementations. The main panel of the dashboard now shows a portion of the script 1502. The text can be interacted with. For example, the user may highlight a portion of the script 1502, such as at 1504. The user may then make a selection to hear an auditory depiction of those lines. Similar to the descriptions above, the prompt generator 115 may convert this selection into a set of instructions to be fed to one or more of the AI models, such as the audio model 127, which would then produce the example auditory sample 1506. The instructions to the audio model 127 may be based on the surrounding context of the scene that is selected to be depicted, and/or the perceived personality of the character, as some examples.

Referring to FIG. 16, shown is one example visual overlay of the story panel in the GUI, providing visual highlights of various elements of the story, according to some implementations. Another example of how the script can be interacted with is that the words in the script can be annotated with colored highlights that represent different categories of the features of a script. The user may push a selection in a top ribbon 1602 to turn on this feature, for example. The GUI may then provide colored highlights of various words in the script after analyzing the entire script to determine what are the relevant features. A color-coded bar 1604 may provide a key to what each of the colors represent. For example, the light purple highlights, such as 1606, are explained in the color-coded bar 1604 that the these are various sets. This may provide quick access to film producers for how many sets to prepare and what the overall scale of the script is. As another example, the orange highlight 1608 represents a type of extra, according to the color-coded bar 1604. As another example, the red highlight 1610 shows what text list a character in the script.

Figure 17:

Referring to FIG. 17, shown is an example of the GUI providing extra details of the script through interfacing with the actual text, according to some implementations. In this case, the user may select any word or phrase in the text, such as selection 1702. The GUI may interpret this selection as an request to provide a visual, textual, and/or audible depiction of the selection. Shown in the display 1704 is an example of the depiction based on the selection 1702. Like the processes described above, the prompt generator 115 may have generated a series of prompts about the selection 1702, based on the surrounding context and other described features throughout the script, to be fed to the one or more AI models to produce the output shown in 1704. In this example, an example visual depiction of the scene is provided, plus a textual description of the scene, as well as what characters may be present and what particular scene the room is placed in. Any extra notes known from the script may also be provided.

Referring to FIG. 18, shown is an example of the GUI providing a feature to modify, capture and save content creation by the platform 100, according to some implementations. The GUI may provide a panel 1802 for the user to focus on the finer details of a character and to even modify based on specific instructions. A bottom panel 1804 provides the current descriptions of the character, including name, textual description, and a color palette or visual environment to express a mood or setting of the character's personality. The user can save the current version as desired. In addition, the user may modify the character through various options in the right panel 1806. For example, the user may be able to change the skin color of the character, and the platform 100 may apply the modified skin color while taking into account lighting and other realistic features on the skin. The user may also type in the prompt box other changes to the character, such as clothes, build, facial features, hair color, hair style, posture, ethnicity, attitude, and so on. As another example, the user may ask in the prompt box what real life actor or actress is recommended to play the particular character as expressed in the screenplay or as currently modified. This may provide the user with further insights as to how the character ought to be portrayed.

Referring to FIG. 19, shown is an example display of scenes that the platform 100 is capable of generating that summarize the ingested screenplay, according to some implementations. Screenplays normally do not contain the organization needed to create storyboards on their own, and generally assistants are needed to read through the entire script before summarizing the various scenes in an organized manner. The platform 100 may be capable of organizing and categorizing the screenplay into its story components by analyzing and interpreting the screenplay. The GUI may provide a chronological listing 1902 of various categories of film components that are present in the screenplay. For example, the user may select at 1904 to display an ordering of the locations of the scenes. As another example, the user may select an ordering of the props used throughout the screenplay, or what type of extras and how many may be needed in chronological order. In the right side panel 1906, the user may see extra details of a selection made in the main panel 1902 to provide more complete context of what is intended in each scene. In some implementations, certain text may be color coded to describe what the text represents, such as the text describing a character's action, visual effects, sound effects, and so on.

Figure 20:
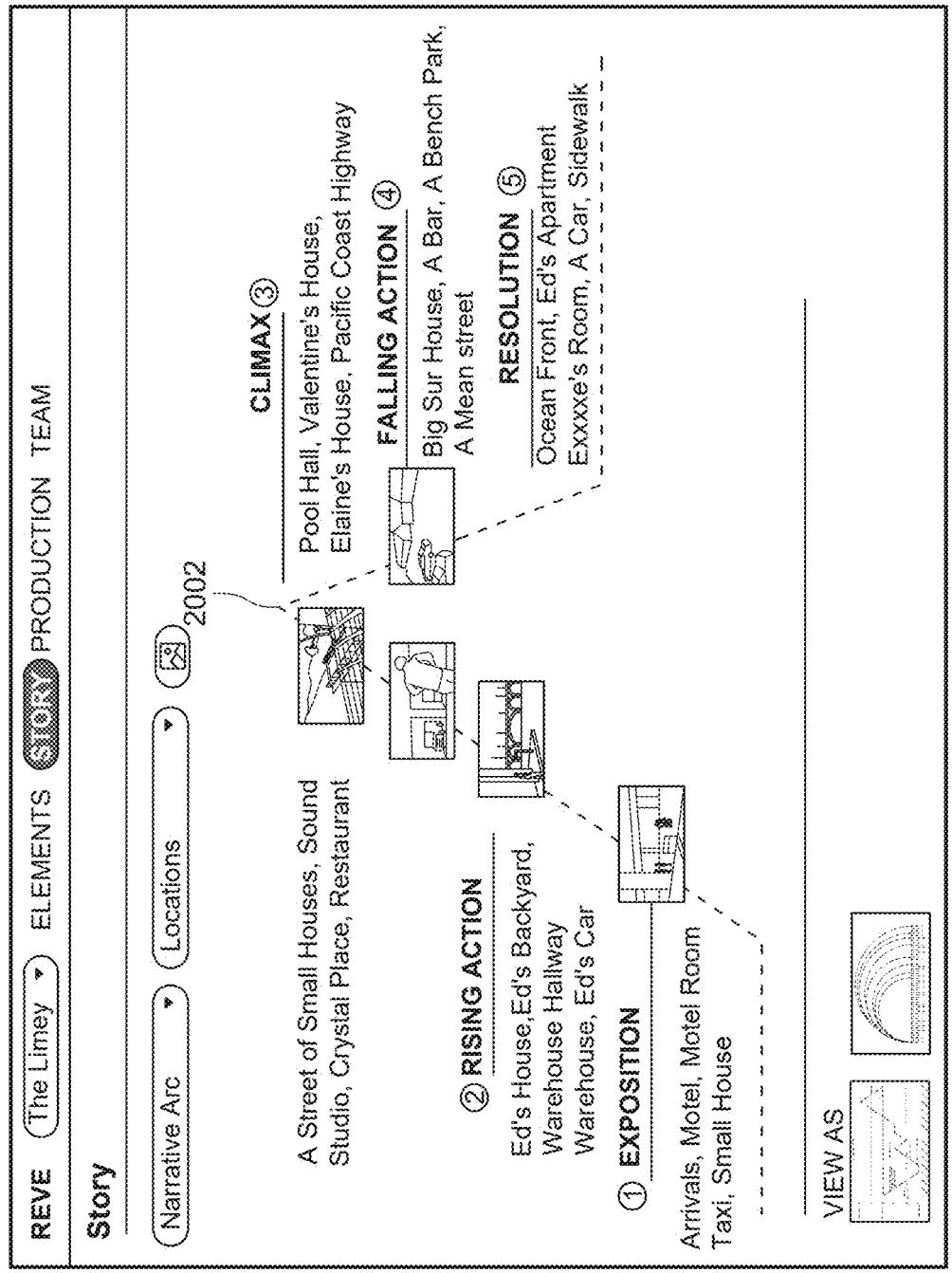

Referring to FIG. 20, shown is an example display of the platform 100 visually depicting the narrative arc of the ingested screenplay, according to some implementations. While some features of the GUI allow the user to focus on fine tuned details in the screenplay, the GUI also allows the user to grasp the larger, macro-oriented features of the screenplay. In this example display, the GUI provides a visual depiction 2002 of the narrative arc of the screenplay, which may expectedly follow the standard formula of exposition, rising action, climax, falling action and resolution. In other cases, this formula may not be present in the screenplay and the visual depiction of the narrative arc may be displayed accordingly. The GUI may include in the visual depiction 2002 key scenes to represent the various stages in the narrative arc, as well as key words or phrases to describe what is happening at each stage. The GUI may derive these features from the text of the screenplay itself, by analyzing it and utilizing one or more AI models to interpret the screenplay.

Figure 21:
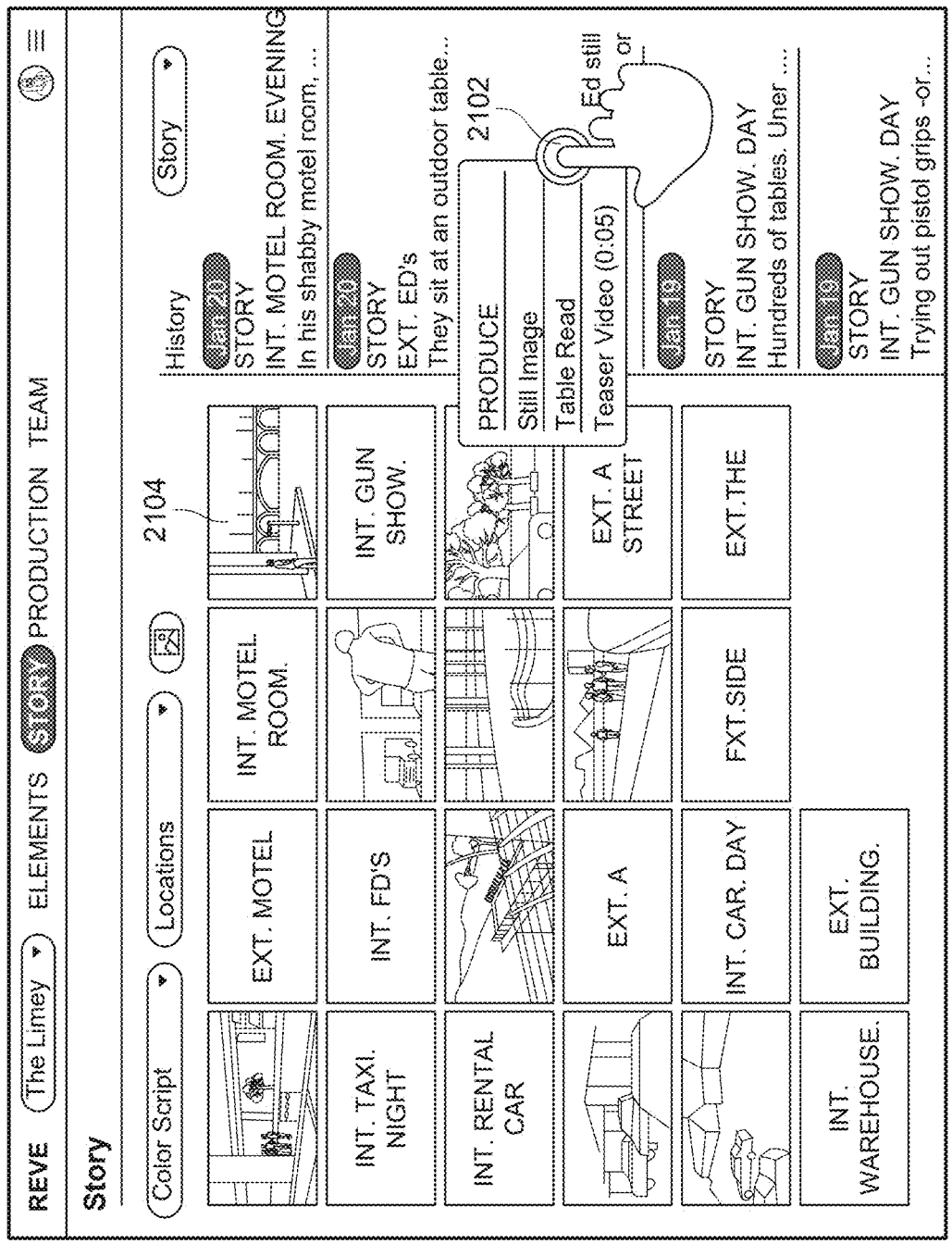

Referring to FIG. 21, shown is yet another feature of the GUI wherein the various scenes as extracted from the screenplay can be visually depicted in chronological order, according to some implementations. The user may make a selection 2102 to have the GUI produce content for a Table Read and to provide visual depictions of various locations to set the stage for the readers. The main panel 2104 may include an ordering of the scenes in the screenplay and the visual depictions currently produced by the GUI.

Figure 22:
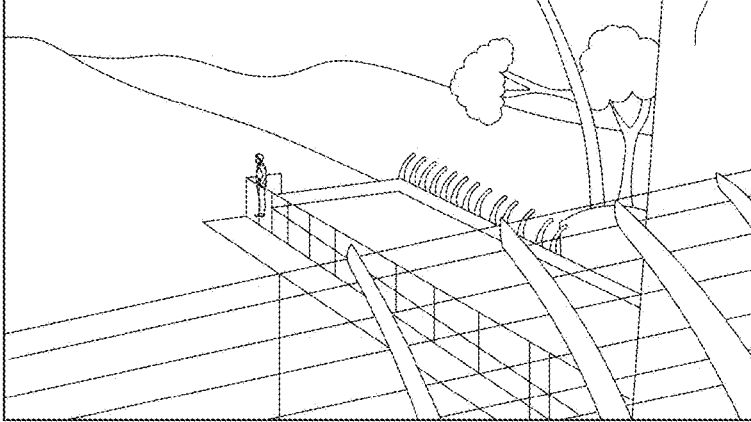

Referring to FIG. 22, shown is a feature of the GUI that allows the user to explore more in-depth one of the visually depicted scenes from FIG. 21, according to some implementations. A user may select one of the illustrations of the scenes to bring up a new display in the main panel 2202 that shows more details of that scene. The platform 100 may also generate animations of that scene that enact what is expressed in the screenplay for that particular scene. The prompt generator may analyze the screenplay for the actions in that scene to generate prompts to be fed to one or more AI models that can be used to produce animations. The GUI may also be capable of producing a series of frames for each scene at 2204 to visually depict what is happening in the screenplay.

Figure 23:
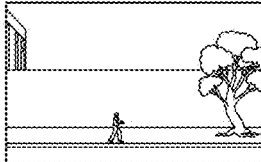

Referring to FIG. 23, shown is a compilation of the various produced features as described in FIGS. 10-22 that can be packaged into one or more stills, animated scenes, and even teaser trailers, that can be provided by the GUI, according to some implementations. When combining the various features described in FIGS. 10-22, persons of skill in the art would appreciate that the GUI is therefore capable of producing whole movie-type productions. The GUI may therefore allow the user to combine the various features to create a teaser trailer, a table read, or the visualization of an entire scene as expressed in the screenplay.

Figure 24:
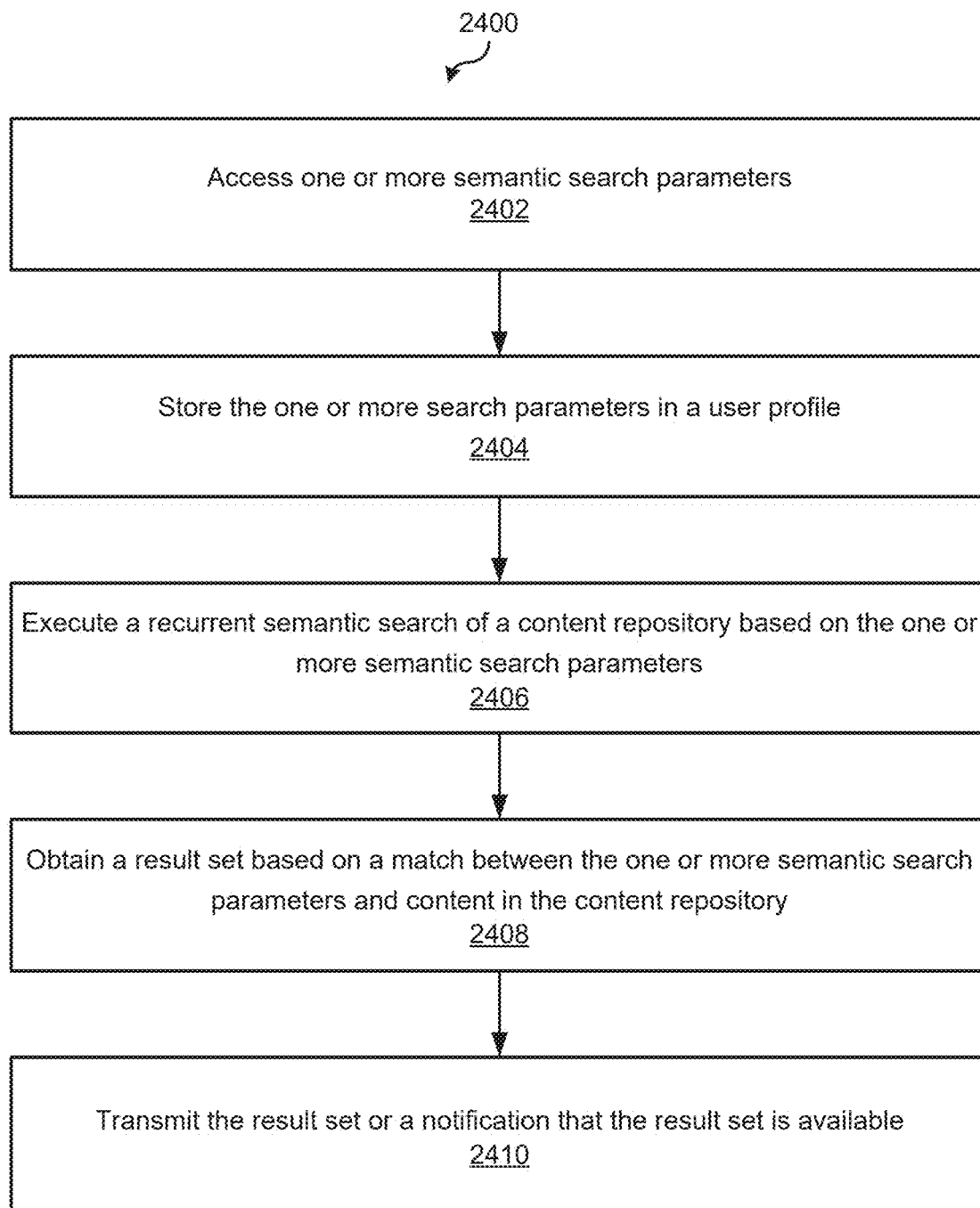
FIG. 24 illustrates an example method for semantically searching the content repository, according to an implementation.

FIG. 24 illustrates an example method 2400 for semantically searching the content repository 101, according to an implementation. At 2402, the method 2400 may include accessing one or more semantic search parameters. The semantic search parameters may include query terms that are to be semantically matched to content in the content repository 101. For example, a semantic search parameter may include the terms "movie transcripts with Cowboys." At 2404, the method 2400 may include storing the one or more search parameters in a user profile. At 2406, the method 2400 may include executing a recurrent semantic search of the content repository 101 based on the one or more semantic search parameters. The recurring search may be performed on a periodic (such as daily, weekly, etc.) basis and/or when new content is received at the content repository 101. At 2408, the method 2400 may include obtaining a match between the one or more semantic search parameters and content in the content repository 101. For example, a semantically similar match would include movie scripts with a Western genre even though "Cowboys" do not have a keyword match with "Western" but these terms are semantically similar. At 2410, the method 2400 may include transmitting the result set or a notification that the result set is available. The user may then obtain the content from the content repository 101 and/or rights to the content via the marketplace. It should be noted that keyword and/or other search criteria may be provided at 2402 in addition to the semantic search parameters. In these instances, all query criteria will be matched (for example, the user may specify that all required are match or only at least one is required to match).

Figure 25:
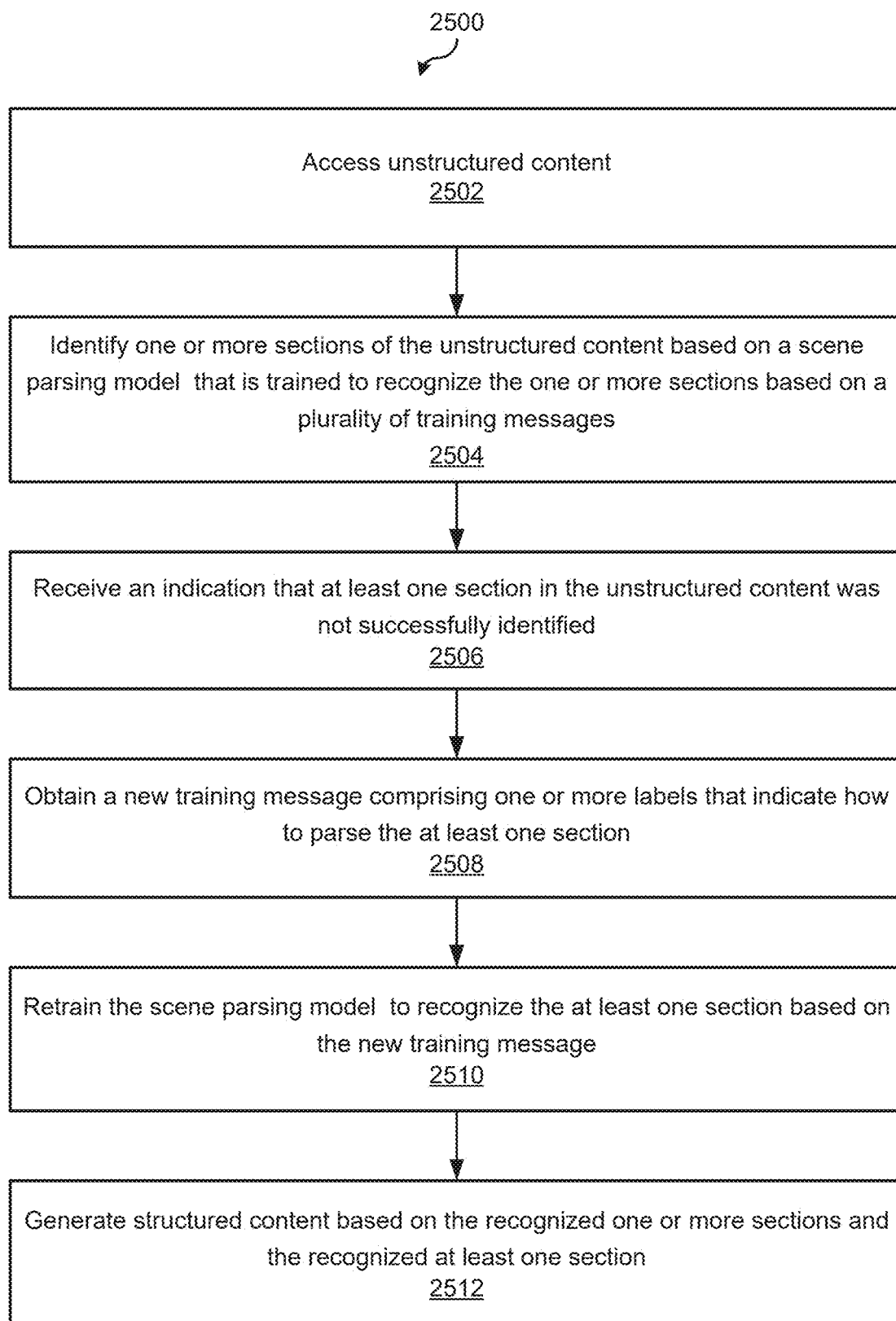
FIG. 25 illustrates an example method for transforming unstructured content to structured content based on a content parsing model trained with a plurality of training messages, according to an implementation.

FIG. 25 illustrates an example method 2500 for transforming unstructured content to structured content based on a content parsing model (such as the scene parsing model 129 illustrated in FIG. 1) trained with a plurality of training messages, according to an implementation. At 2502, the method 2500 may include accessing unstructured content 102, such as a transcript. At 2504, the method 2500 may include identifying one or more sections (such as scenes in the transcript) so the unstructured content based on a scene parsing model that is trained to recognize the one or more sections based on a plurality of training messages (an example of which is illustrated in Table 2). At 2506, the method 2500 may include receiving an indication that at least section in the unstructured content was not successfully identified. For example, the scene parsing model may not have seen this unrecognized section in the training messages. At 2508, the method 2500 may include obtaining a new training message comprising one or more labels that indicate how to parse the at least one section (the unrecognized section). In some instances, the new training message may be provided by a human user such as in HITL processing. At 2510, the method 2500 may include retraining the scene parsing model to recognize the at least one section based on the new training message. At 2512, the method 2500 may include generating structured content based on the recognized one or more sections and the recognized at least one section.

Figure 26:
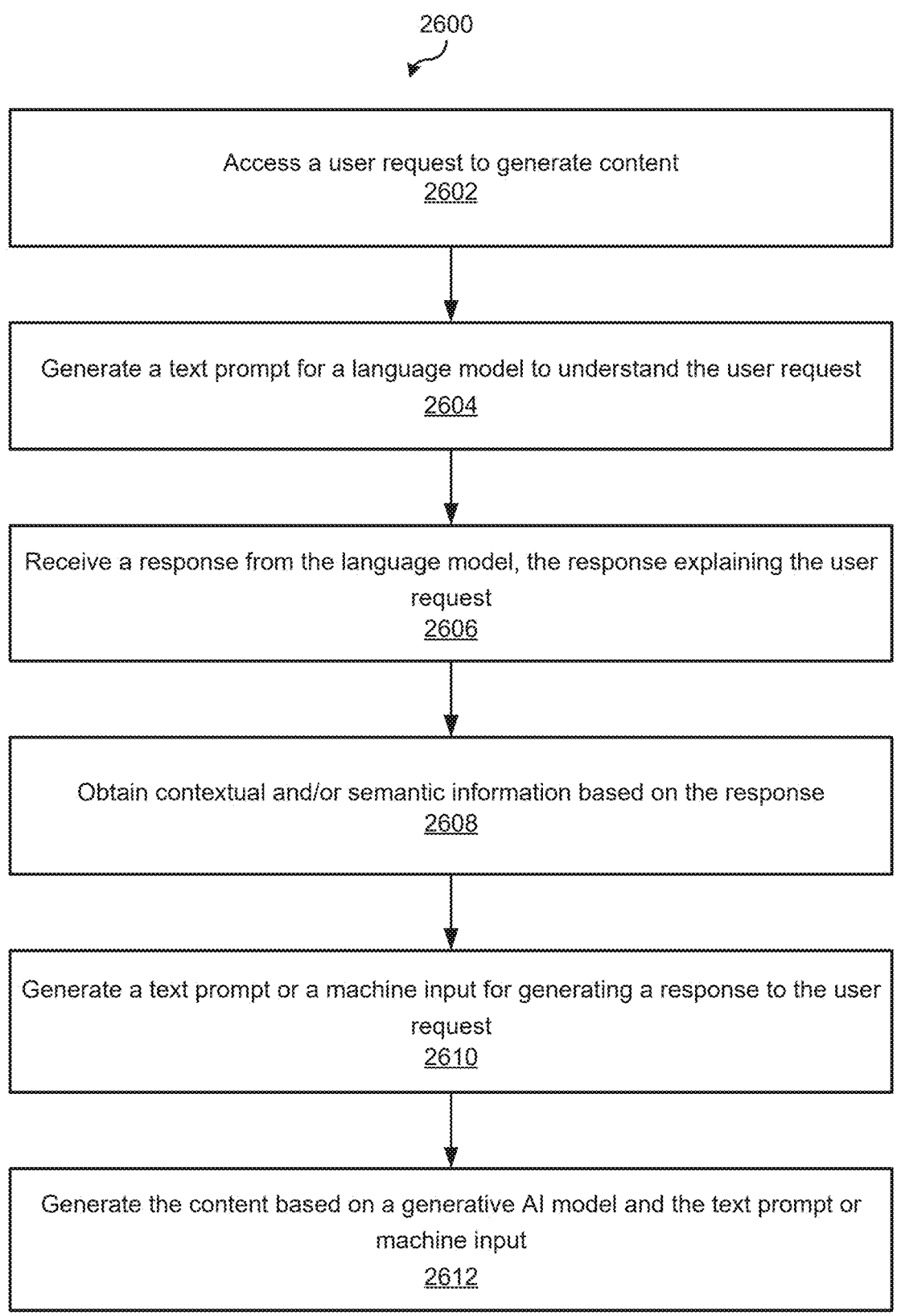
FIG. 26 illustrates an example method for generating content based on language model understanding of user requests and dynamic prompt generation for generative AI models, according to an implementation.

FIG. 26 illustrates an example method 2600 for generating content based on language model understanding of user requests and dynamic prompt generation for generative AI models, according to an implementation. At 2602, the method 2600 may include accessing a user request to generate content. The requested content may be text (text in transcript), visual, audio, and/or other types of content. At 2604, the method 2600 may include generating a text prompt for a language model 121 to understand the user request. At 2606, the method 2600 may include receiving a response from the language model, the response explaining the user request. At 2608, the method 2600 may include obtaining contextual and/or semantic information based on the response. At 2610, the method 2600 may include generating a text prompt or a machine input for generating a response to the user request. At 2612, the method 2600 may include generating the content based on: (1) the generative AI model and (2) the text prompt or the machine input. It should be noted that the generative AI model may be the language model 121 from block 2604, another language model 121, and/or other models illustrated in FIG. 1 depending on the type or types of content to be generated.

Figure 6:
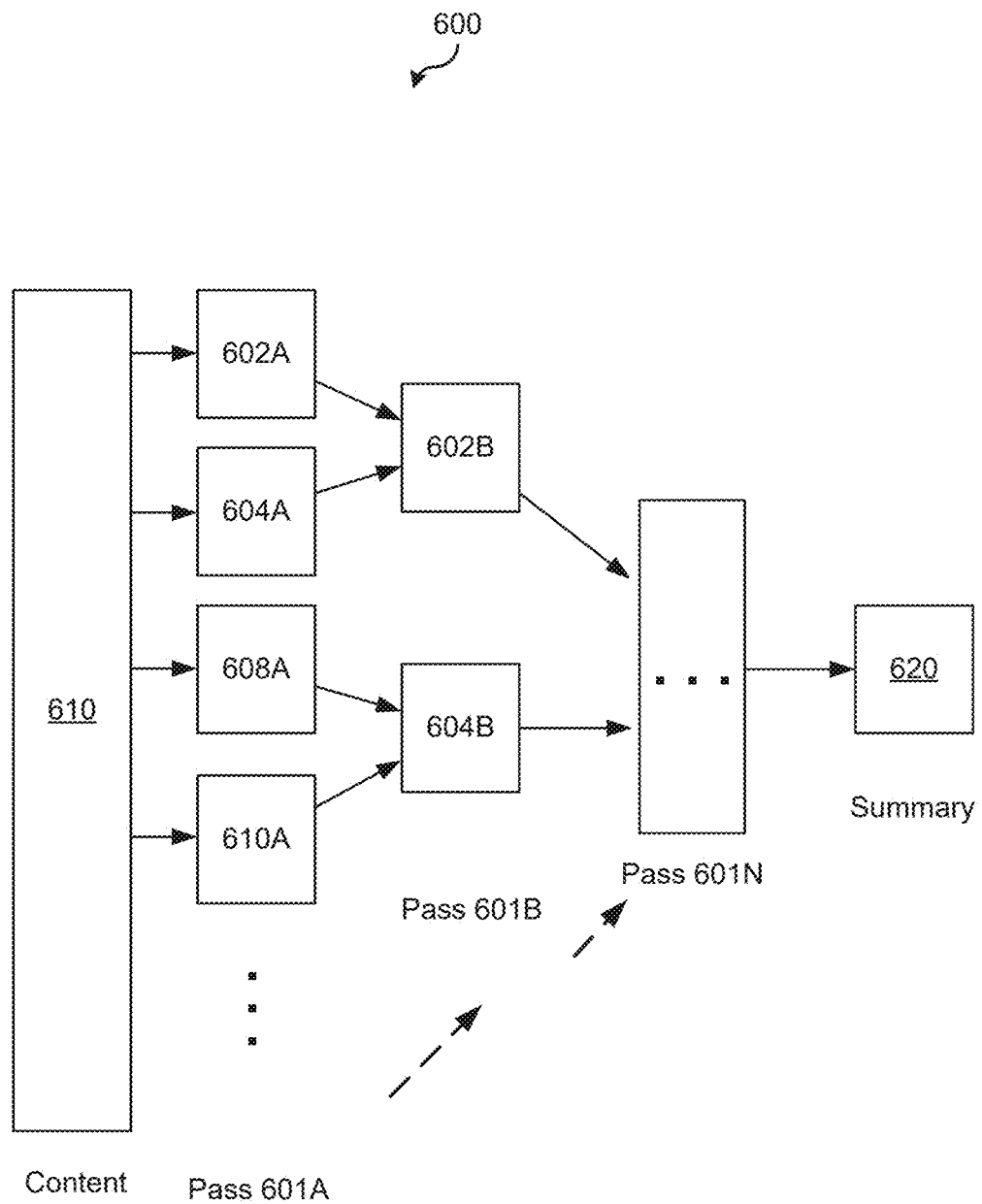
FIG. 6 illustrates a multi-pass generative AI architecture for generating content summaries, according to an implementation.
Figure 7:
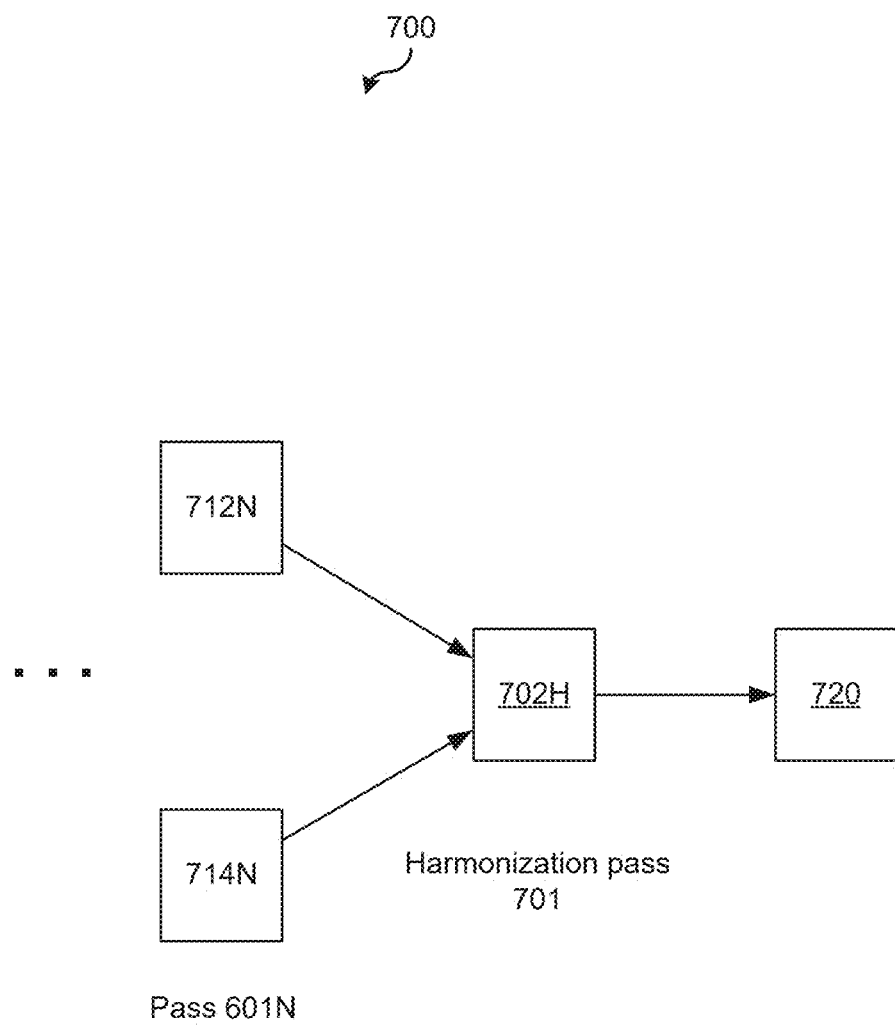
FIG. 7 illustrates a harmonization pass in the multi-pass generative AI architecture for generating content summaries, according to an implementation.
Figure 27:
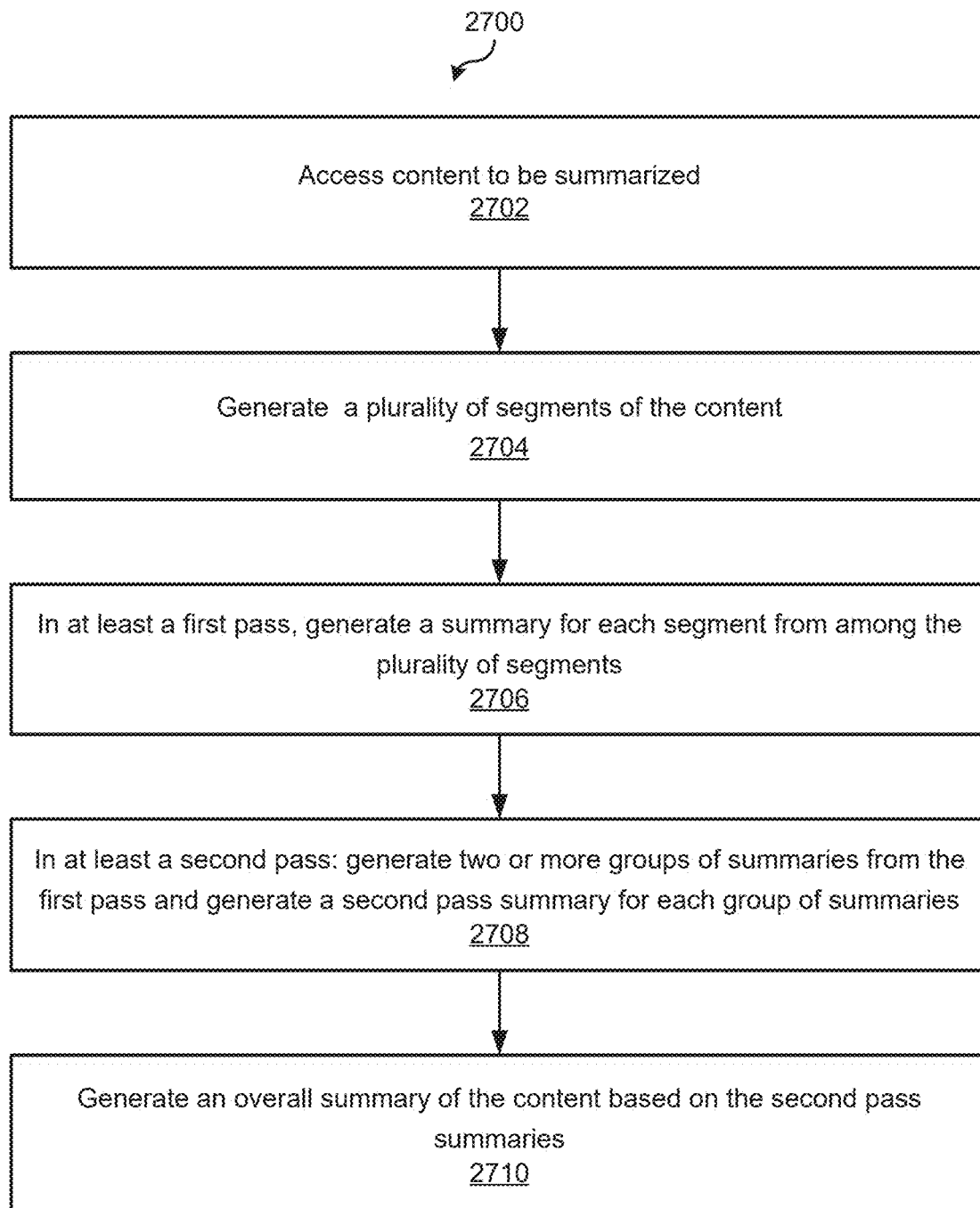
FIG. 27 illustrates an example method for generating a summary of content based on a multi-pass architecture using language models, according to an implementation.

FIG. 27 illustrates an example method 2700 for generating a summary of content (such as a transcript) based on a multi-pass architecture (such as the multi-pass generative AI architecture 600 illustrated in FIG. 6) using language models 121, according to an implementation. At 2702, the method 2700 may include accessing content to be summarized. At 2704, the method 2700 may include generating a plurality of segments of the content. For example, the method 2700 may use the scene parser model 129 to identify segments, or scenes of a transcript. At 2706, the method 2700 may include in at least a first pass, generate a summary for each segment from among the plurality of segments. At 2708, the method 2700 may include in at least a second pass: generating two or more groups of summaries from the first pass and generating a second pass summary for each group of summaries. At 2710, the method 2700 may include generating an overall summary of the content based on the second pass summaries. To generate the overall summary, the method 2700 may include aggregating the two or more groups of summaries. Alternatively, to generate the overall summary, the method 2700 may include executing a harmonization pass (such as the harmonization pass 701 illustrated in FIG. 7 in which the two or more groups of summaries are summarized by a large language model that generates the overall summary.

Figure 28:
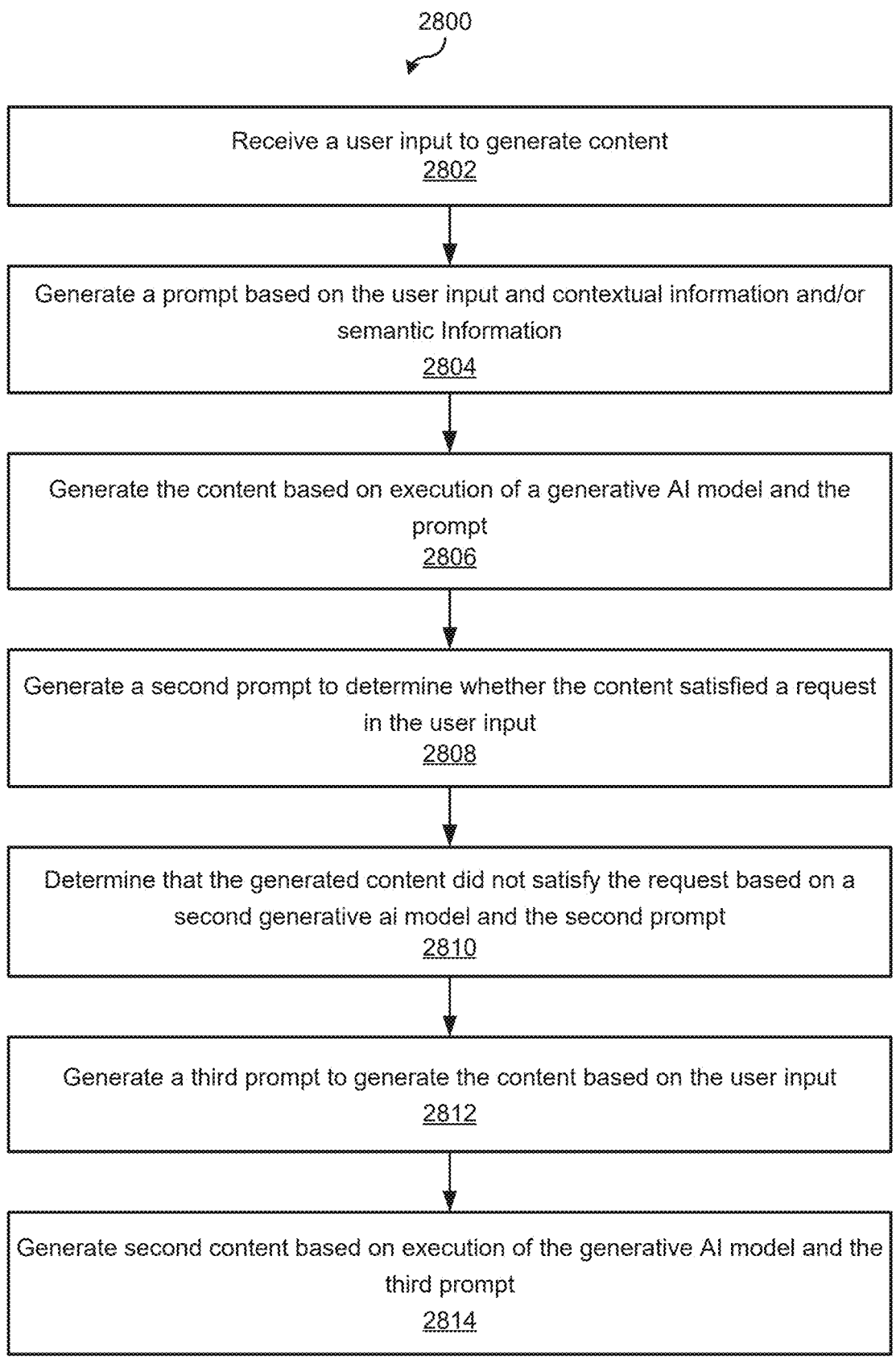
FIG. 28 illustrates an example method for self-correcting content generation, according to an implementation.

FIG. 28 illustrates an example method 2800 for self-correcting content generation, according to an implementation. At 2802, the method 2800 may include receiving a user input to generate content. At 2804, the method 2800 may include generating a prompt based on the user input and contextual information and/or semantic information. At 2806, the method 2800 may include generating the content based on execution of a generative AI model and the prompt. At 2808, the method 2800 may include generating a second prompt to determine whether the content satisfied a request in the user input. At 2810, the method 2800 may include determining that the generated content did not satisfy the request based on a second generative ai model and the second prompt. At 2812, the method 2800 may include generating a third prompt to generate the content based on the user input. At 2814, the method 2800 may include generating second content based on execution of the generative AI model and the third prompt.

Figure 29:
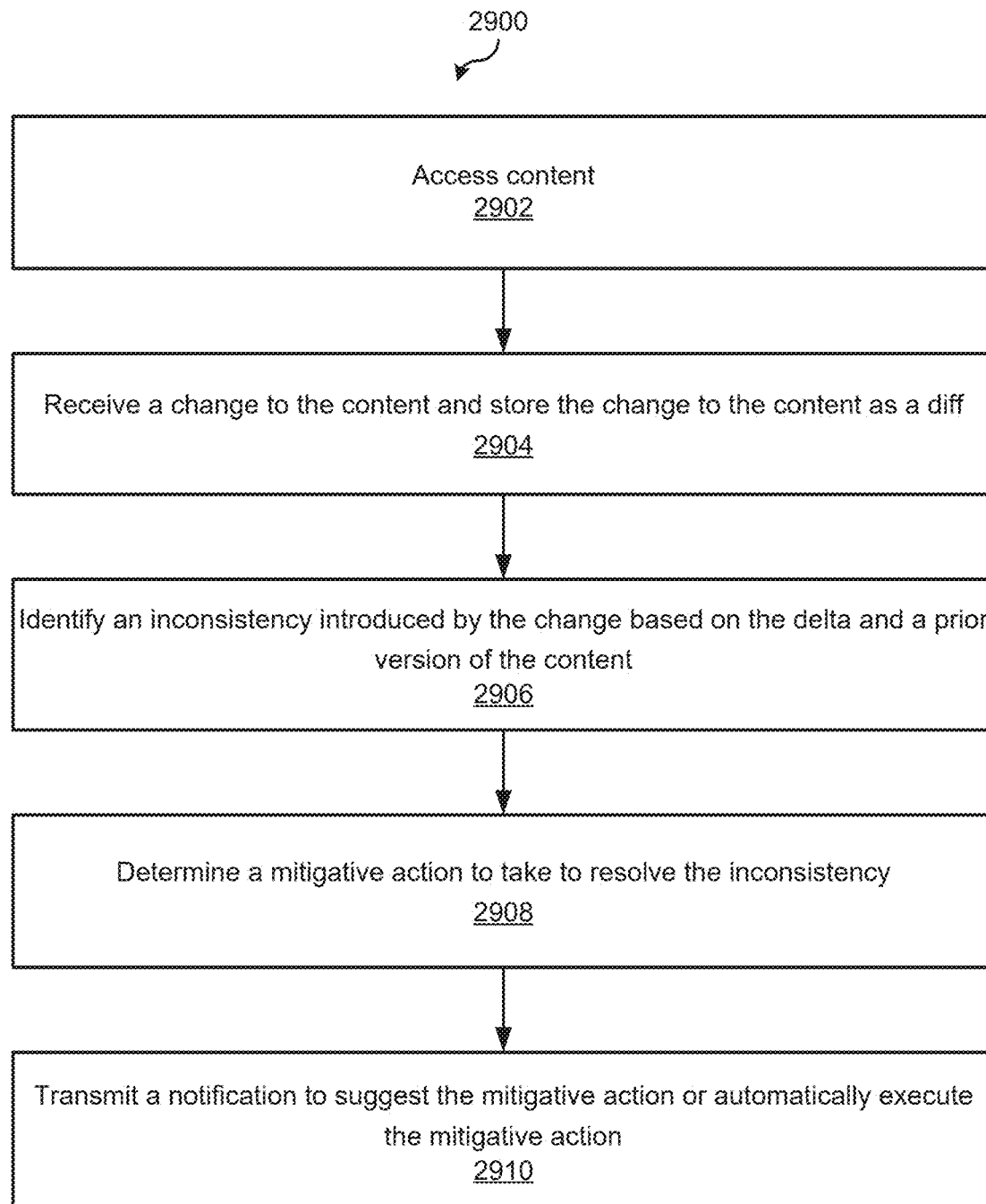
FIG. 29 illustrates an example method for consistency verification, according to an implementation.

FIG. 29 illustrates an example method 2900 for consistency verification, according to an implementation. At 2902, the method 2900 may include accessing content. At 2904, the method 2900 may include receiving a change to the content and storing the change to the content as a diff. At 2906, the method 2900 may include identifying an inconsistency introduced by the change based on the delta and a prior version of the content. At 2908, the method 2900 may include determining a mitigative action to take to resolve the inconsistency. At 2910, the method 2900 may include transmitting a notification to suggest the mitigative action or automatically execute the mitigative action.

Figure 30:
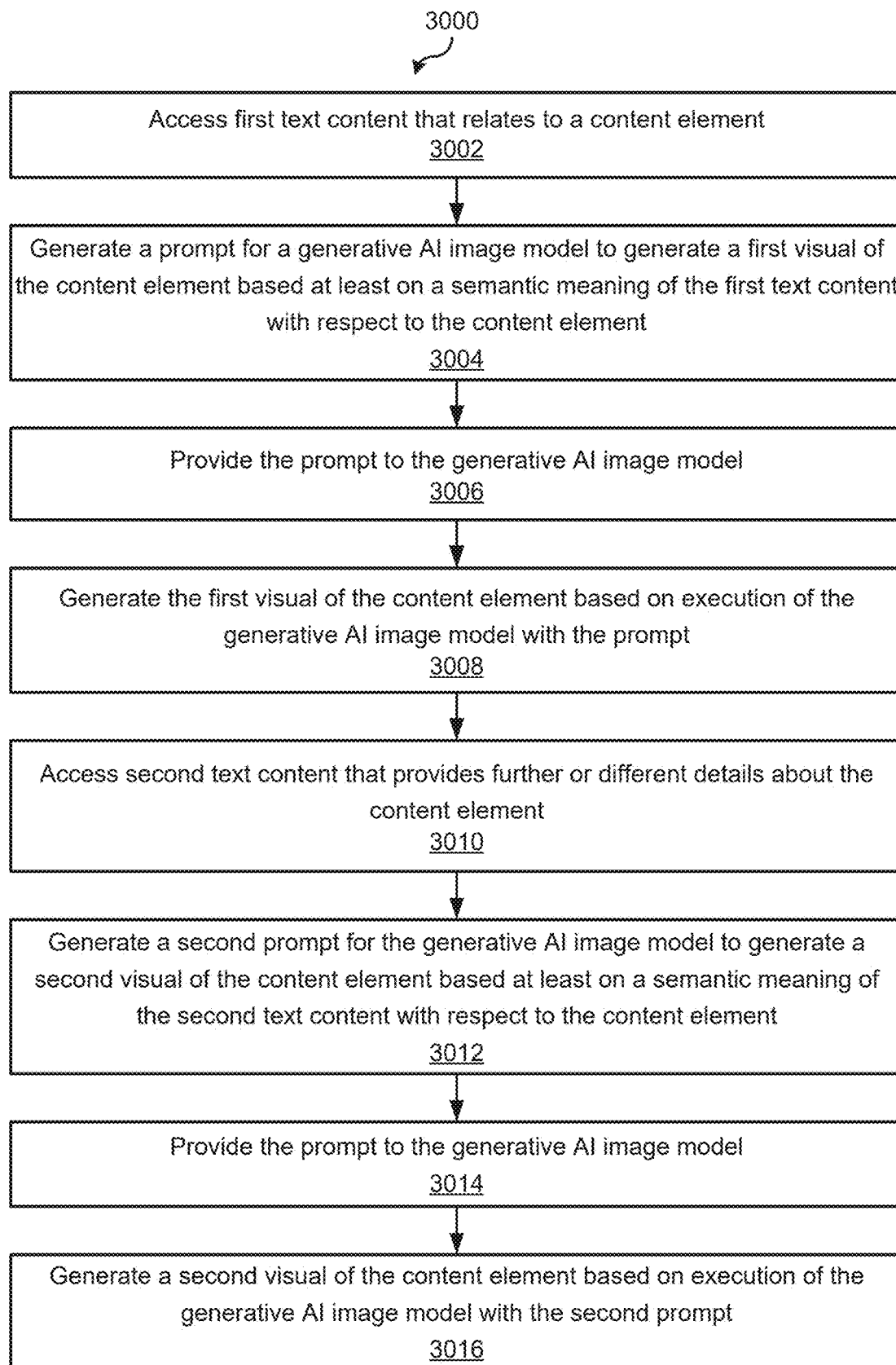
FIG. 30 illustrates an example method for automatically generating content and/or suggestions for multi-modal content creation, according to an implementation.

FIG. 30 illustrates an example method 3000 for automatically generating content and/or suggestions for multi-modal content creation, according to an implementation. At 3002, the method 3000 may include accessing first text content that relates to a content element. At 3004, the method 3000 may include generating a prompt for a generative AI image model to generate a first visual of the content element based at least on a semantic meaning of the first text content with respect to the content element. At 3006, the method 3000 may include providing the prompt to the generative AI image model. At 3008, the method 3000 may include generating the first visual of the content element based on execution of the generative AI image model with the prompt. At 3010, the method 3000 may include accessing second text content that provides further or different details about the content element. At 3012, the method 3000 may include generating a second prompt for the generative AI image model to generate a second visual of the content element based at least on a semantic meaning of the second text content with respect to the content element. At 3014, the method 3000 may include providing the prompt to the generative AI image model. At 3016, the method 3000 may include generating a second visual of the content element based on execution of the generative AI image model with the second prompt.

FIGS. 31A-D each illustrates custom content generation that can be selectable by an end user and can vary over time or location, according to various implementations. Custom content generation may be facilitated by the systems and models described herein. For example, the generative content system 140 illustrated in FIG. 1 may generate custom content illustrated at FIGS. 31A-D. The custom content in FIGS. 31A-D is described in the context of a custom visual of a movie character in a movie for illustration. However, types of content other than movie character visuals may be custom and/or types of content other than movies may be used.

Figure 31A:
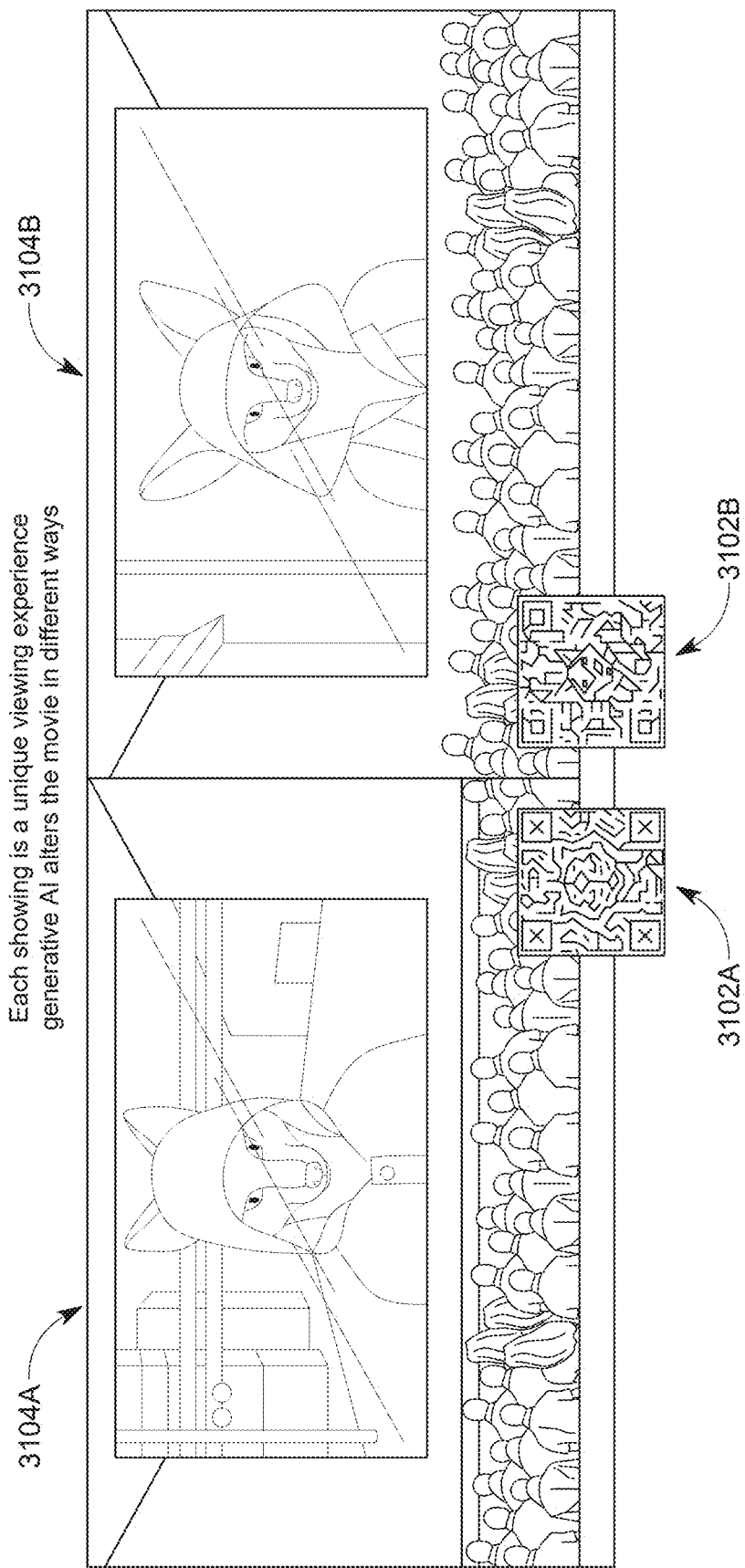
FIGS. 31A-D each illustrates customized content generation that can be selectable by an end user and can vary over time or location, according to various implementations.

Referring to FIG. 31A, custom content 3104A and 3104B may be generated for the same movie. Thus, one version of a movie may include custom content 3104A and another version of the same movie transcript may include custom content 3104B. As illustrated, custom content 3104A and 3104B are different visuals for the same movie character.

Each version of the movie may be associated with a corresponding identifier that can be used to identify and render or otherwise show the corresponding movie. As illustrated, the corresponding identifier may be encoded into respective QR codes 3102A and QR codes 3102B. When scanned or otherwise read by a QR code reader, such as a user's smartphone, each QR code 3102A or 3102B will respective result in custom content 3104A and 3104B. Encodings or other ways to read the identifier may be used instead, such as via barcodes, near field communication (NFC) identifiers, Bluetooth beacons, URLs, and so forth.

It should be noted that with the generative AI systems disclosed herein, such custom content may be generated ahead of time. When generated ahead of time, the custom content may be generated for different contexts such as different geolocations, customs, user preferences, and so forth. In other examples, with the generative AI systems disclosed herein, the custom content may be generated at run-time (such as when the QR code is scanned). In these examples, the custom content may be generated based on contextual information (such as geolocations of the user, customs of the user location, user preferences, and so forth) at runtime.

Figure 31B:
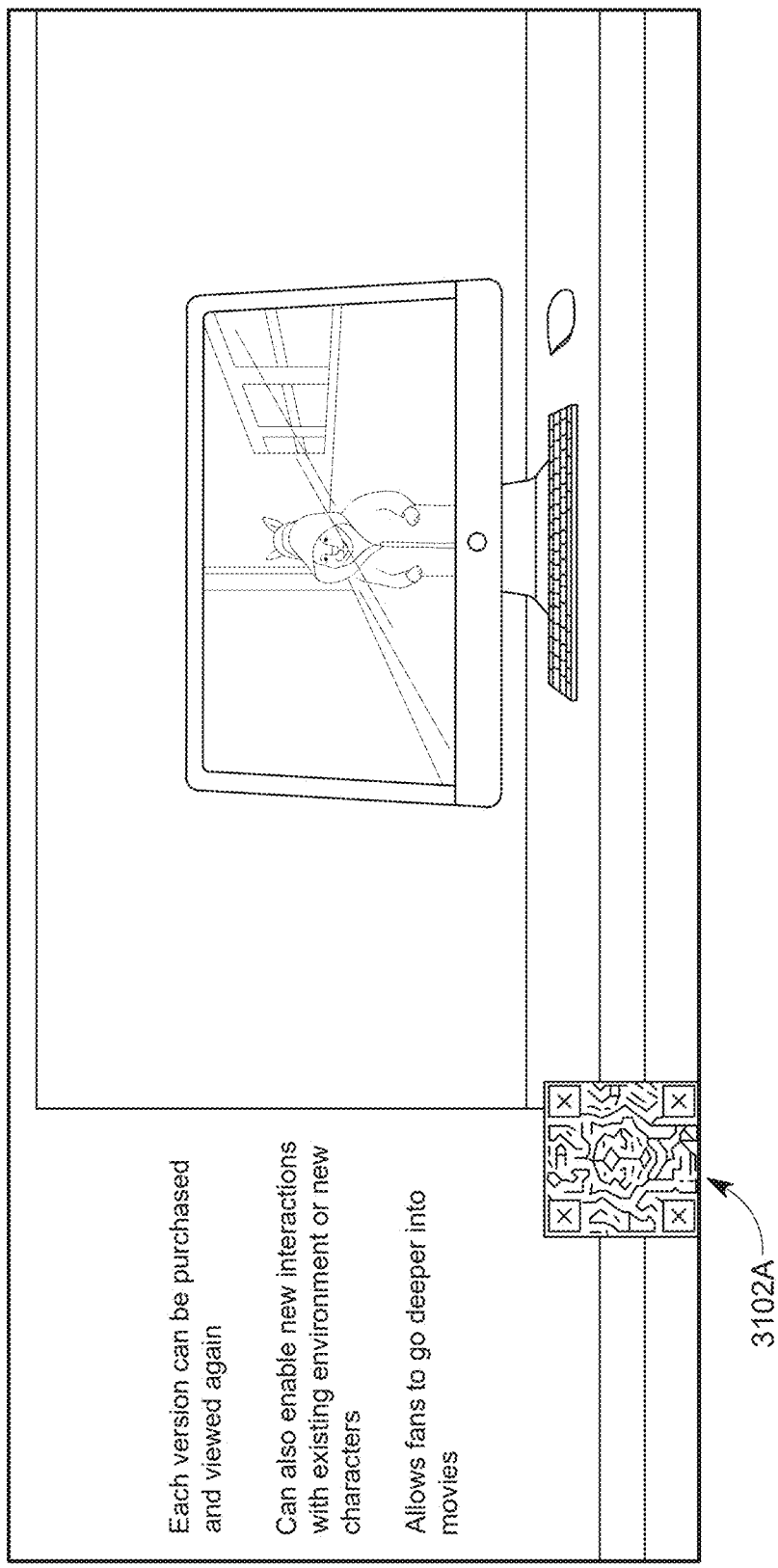

Referring to FIG. 31B, each version of custom content may be repurchased or viewed later based on the QR code or other identifier encoding. In this illustrated example, reading the QR code 3102A will enable the corresponding custom content 3104A to be viewed in the same movie or different movie. Similarly, reading the QR code 3102A will enable the corresponding custom content 3104A to interact with the same characters/environment or different characters/environment.

Figure 31C:
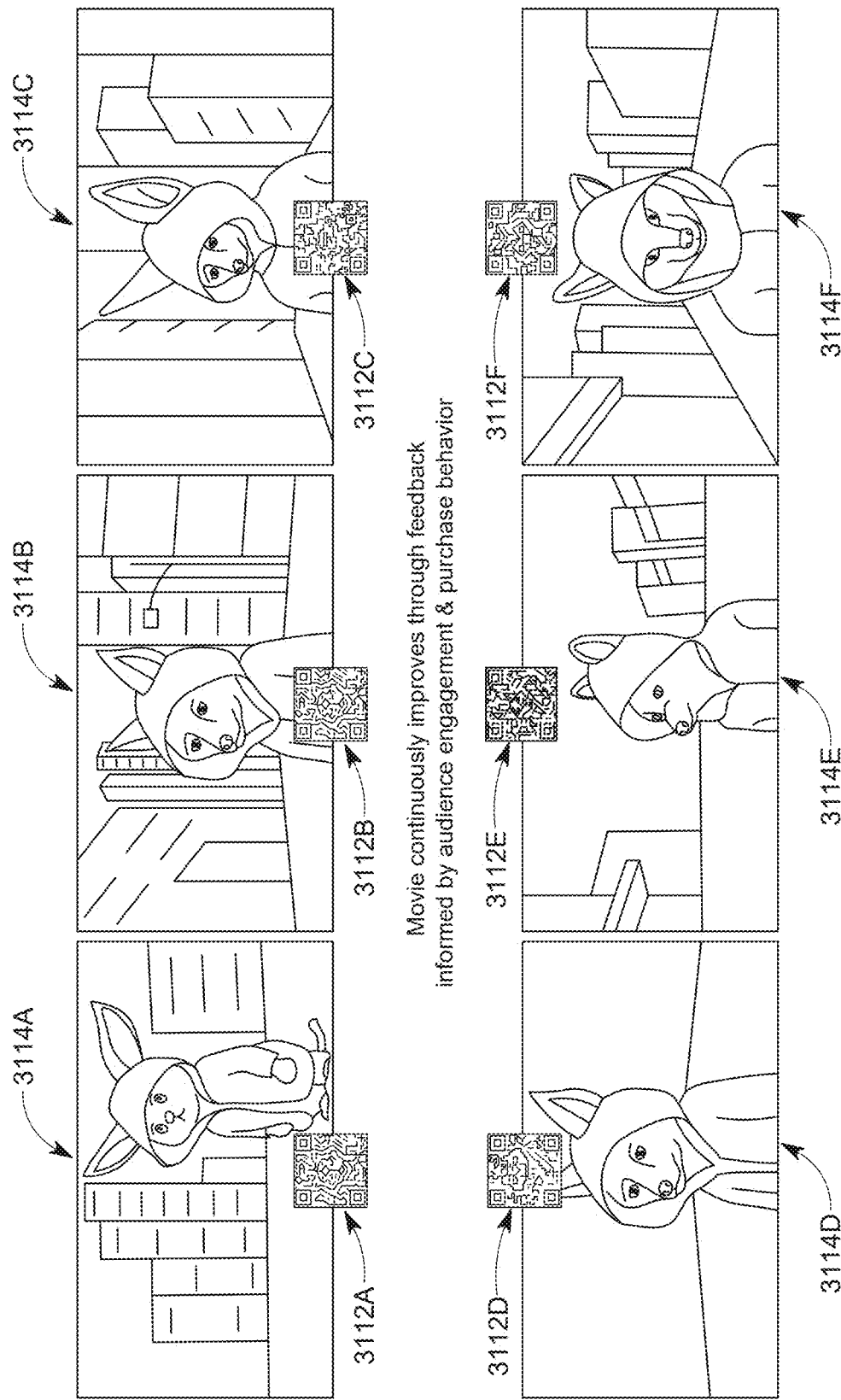
Figure 31D:
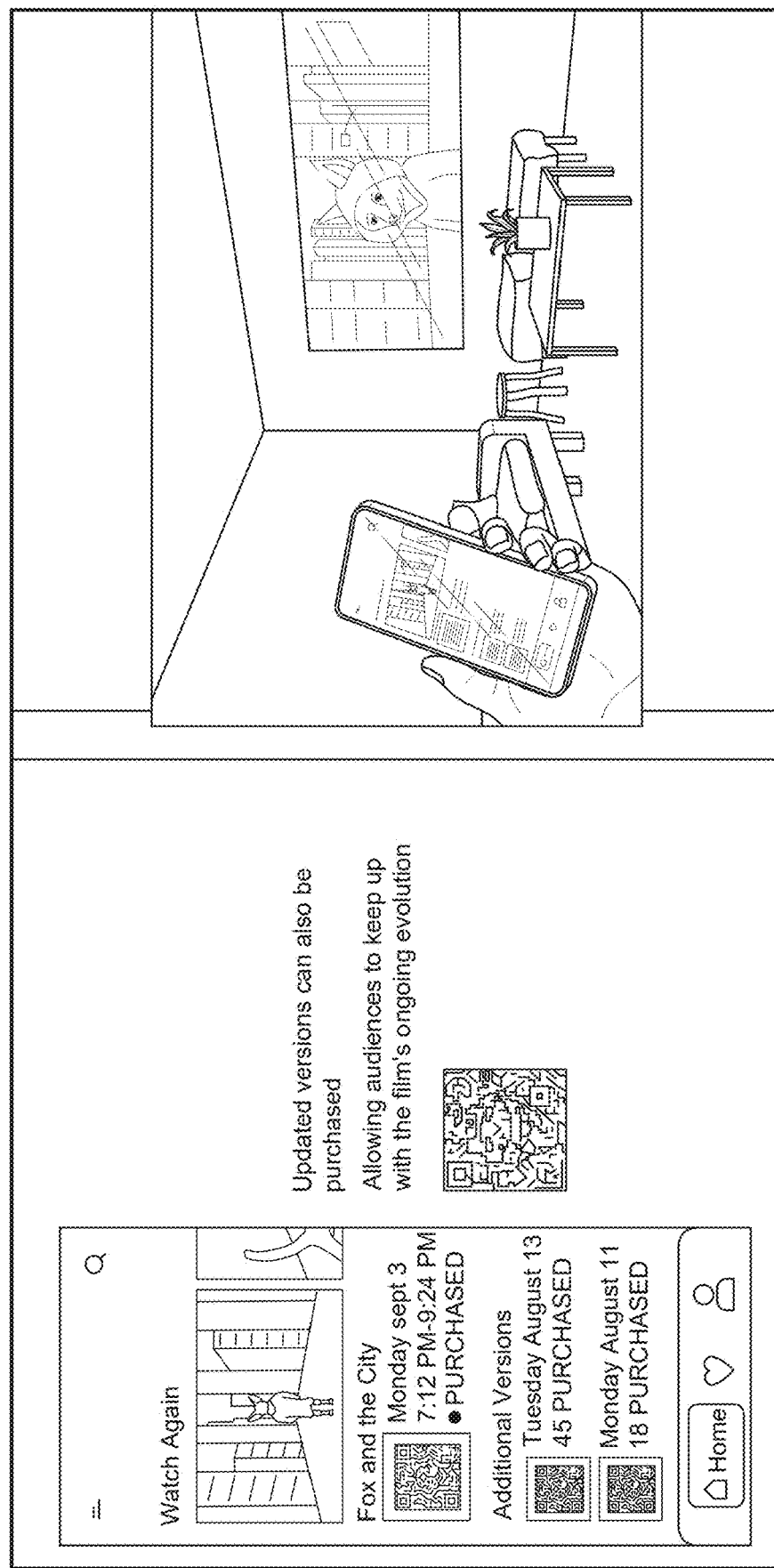

Referring to FIG. 31C, in some implementations, custom content 3114 may be customized over time based on user feedback, audience engagement, purchase behavior, and/or other parameters. For example, custom content 3114A may be customized through different iterations such as custom content 3114B, 3114C, 3114D, 3114E, 3114F, and/or other iterations. For example, if feedback, audience engagement, or purchase behavior is negative, then custom content 3114B may be generated. Alternatively or additionally, the computer system 110 illustrated in FIG. 1 may introduce new custom content 3114B and/or other iterations to gauge audience interest. Each of the custom content 3114A-F may be associated with respective QR codes 3112A, 3112B, 3112C, 3112D, 3112E, and 3112F or other respective identifiers. Referring to FIG. 31D, updated versions of any of the custom content may be later purchased, similar to the manner described with respect to FIG. 31B.

System and Method for Interactive Character Persona

In some implementations, custom content generation may be used to generate interactive character personas facilitated by the systems and models described herein. For example, the generative content system 140 illustrated in FIG. 1 may generate interactive character personas. Through these systems, for example, users may create, define, and iterate on character personas by creating images and by providing textual character descriptions such as a name, birthdate, gender, and/or persona parameters.

The system may provide a template (referred to herein as a "character sheet") for users to fill out, ask questions (interactive question and answer), enter in a free form fashion, and/or otherwise provide information about a character persona being customized. When the system has sufficient information (textual and/or images), the system will instantiate the character ("bring the character to life") and allow the user to interact with the character. For example, the user may interactively chat with the character. The user can then ask the character questions to learn more about them, and to ask how the character might respond in certain situations. This character metadata can also be used in making suggestions about how characters might behave—and what they might say—in specific parts of a creative work (script, novel, etc.).

Each character sheet may have associated contact information that allows the user to send and receive communications. For example, the contact information may include a phone number, an electronic mail address, a social media account handle, and/or other contact information that enables communication between the user and the persona (such as via the systems and models described herein, as well as the dynamic prompt and response illustrated in FIGS. 2-5). In particular, users may call their characters, participate in video chats with them, or interact with the personas when away from the computer. The characters' responses (including voice synthesis and animation) can be based on images the user created, textual character data (metadata), a recorded voice the character can use, previous discussions with the character, the character's part in the creative work, and/or other parameters.

The use of this system may help the user understand the character. Interacting with the character via text, voice, and/or video can also help shape the character, and inform how the character contributes to the story. After the creative work is released, the interactive character persona can be used as a marketing "activation." Fans of the movie or the book can also text, talk, or video chat with their favorite characters, thereby creating a heightened sense of immersion.

Figure 32:
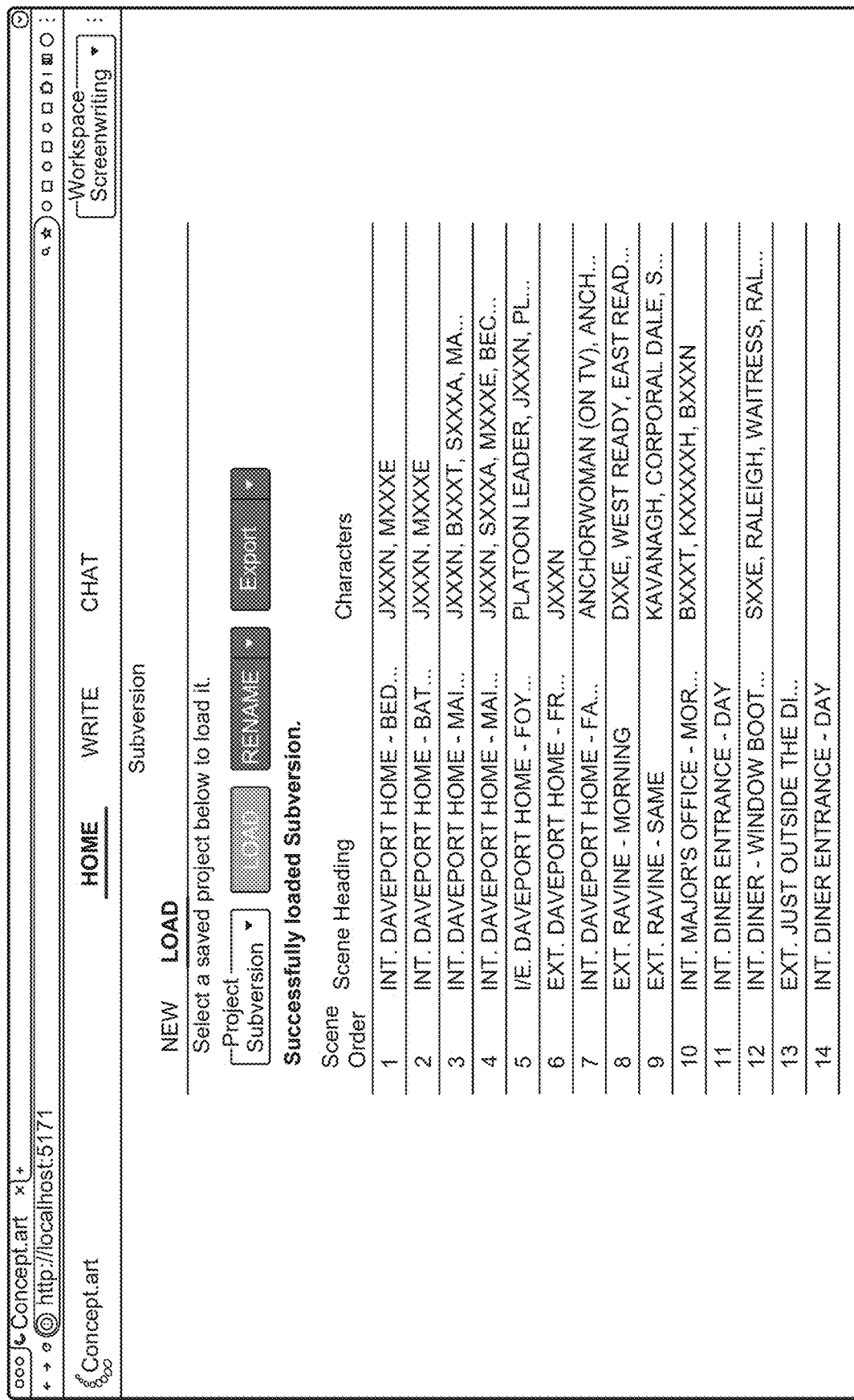

FIG. 32 illustrates an example of a user interface that shows semantic understanding of content such as a transcript, according to an implementation. The user interface as illustrated enables loading particular content such as a transcript entitle "Subversion." Also shown are parsed content such as scenes (including scene order), scene headings, and characters that appear in each scene. For example, the scene order, scene headings, and characters may be based on parsing the transcript and semantic understanding of the transcript through one or more systems and models described herein.

FIG. 33 illustrates an example of a user interface for an electronic writing assistant, according to an implementation. The user interface may present a selectable listing of scenes 3301 and content 3303 from the selected scene. The user interface may include a display portion 3305 that provides writing assistant functionality. At display portion 3305, a user may access various assistive functions such as "please summarize the story up to this point." The electronic writing assistant, via one or more systems and models, may understand the context (here, the user interface showing a selected scene) and then obtaining a summary of the story up to the currently selected scene. Other writing assistive tasks such as "suggest a new name for Hank" may be entered at display portion 3305.

Figure 34:
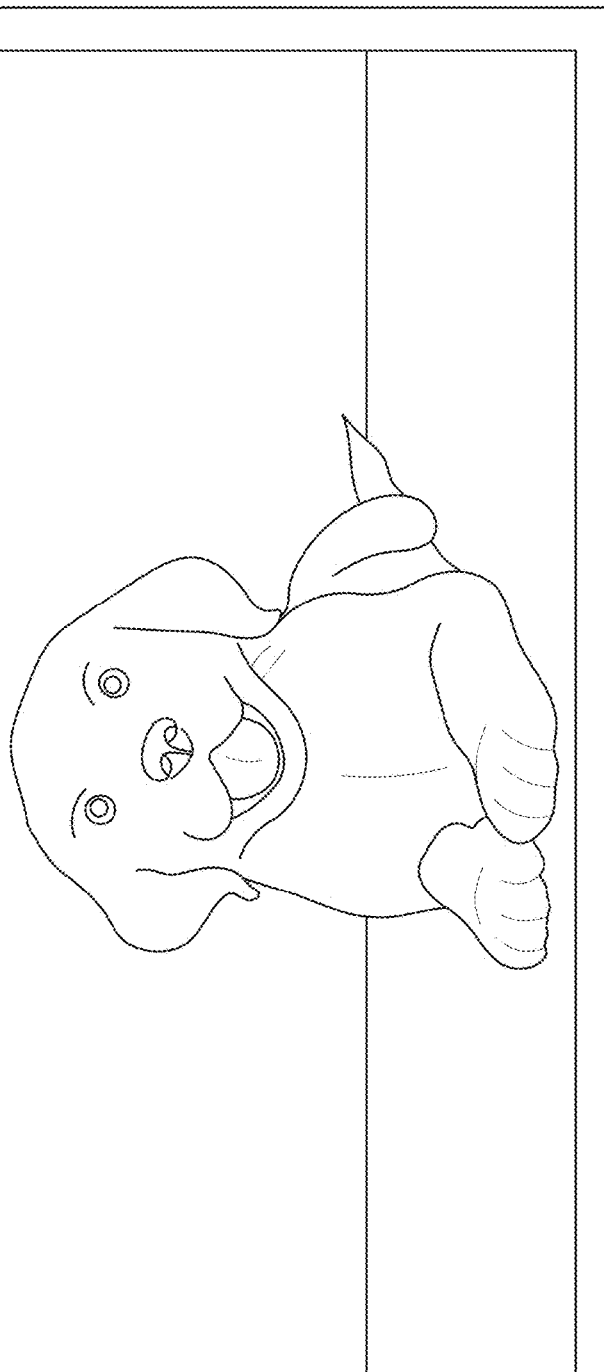

FIG. 34 illustrates an example of a user interface for image generation, according to an implementation. The user interface may provide an input area 3401 to request image generation, such as the input "generate an image of Davenport's dog." One or more systems and models may generate how the Davenport's dog would look based on a semantic understanding of the currently view transcript and/or a predefined image of Davenport's dog and present the image at 3403. Input portion 3405 provides an input to ask other questions or otherwise obtain information about the currently viewed transcript.

FIGS. 35-38 each illustrates examples of user interfaces for content summarization at respective resolutions, according to an implementation. For example, FIG. 35 shows a logline and synopsis, FIG. 36 shows an enhanced (2×) resolution summary, FIG. 37 shows an enhanced (3×) resolution summary, and FIG. 38 shows original content that has not been summarized.

Figure 39:
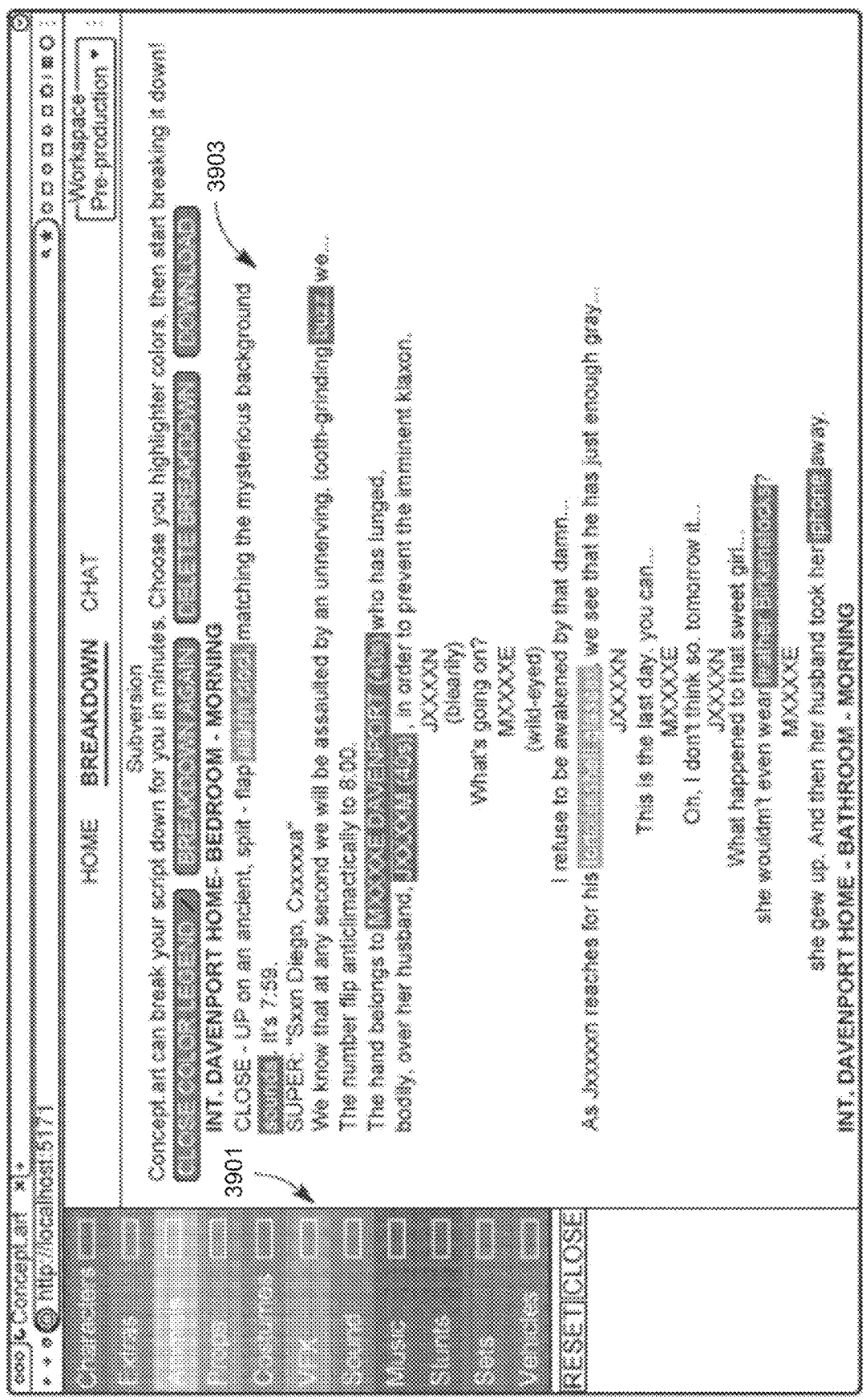

FIG. 39 illustrates an example of a user interface for a content breakdown, according to an implementation. The content breakdown may show individual content elements in a color-coded and/or other distinguishing way. For example, as illustrated, a display portion 3901 may provide a selectable list of transcript elements such as characters, extras, animals, props, costumes, VFX, sound, music, stunts, sets, vehicles, and/or other elements parsed from the transcript by one or more systems and models described herein. When a transcript element is selected in the display portion 3901, the selected element will be highlighted in color or otherwise identified in the transcript at the display portion 3903. It should be noted that the coloring, highlighting, or other distinguishing characteristics may be configured as needed.

Figure 40:

FIG. 40 illustrates an example of a user interface for interactive chat with the system, according to an implementation. The interactive chat may include an input 4001 that receives user chats to the system. The chat may include questions about the content, such as the currently viewed transcript. Answers may be generated by one or more of the systems and models described herein, and presented in the display portion 4003, which may also display previous chat interactions.

Figure 42:
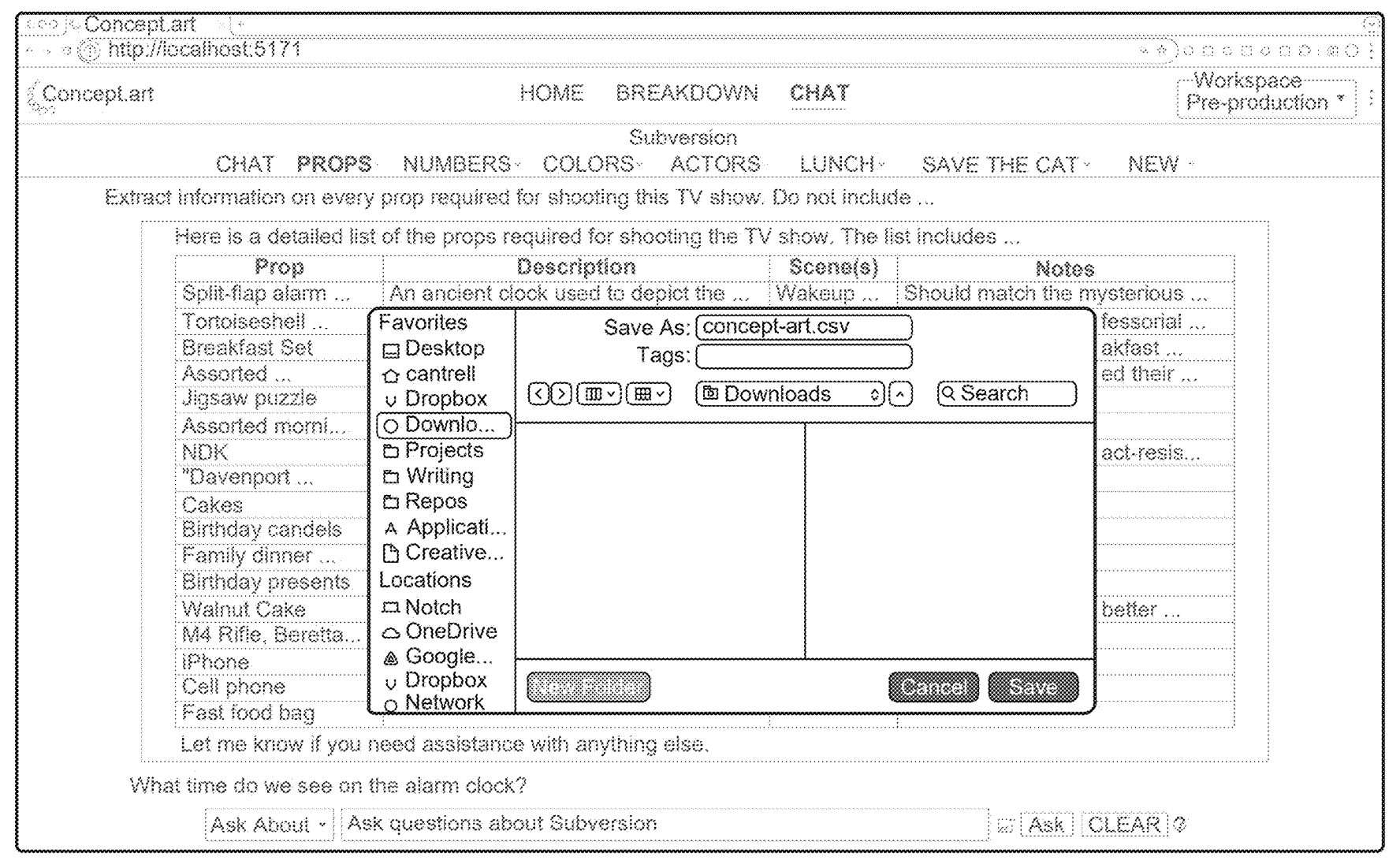

FIG. 41 illustrates an example of a user interface for showing particular content elements such as props in a transcript, according to an implementation. The user interface as shown may provide a response to a chat entered into the user interface illustrated in FIG. 40. In this case the user input included specific instruction to show certain props but not others, and also an instruction to format into a table with specific fields such as prop identification, description, scene in which prop appears, and any notes about the prop. One or more systems and models may generate the response 4103, which includes the requested prop information and the format requested by the user input. FIG. 42 illustrates an example of a user interface for downloading content elements shown in FIG. 41, according to an implementation.

Figure 43:
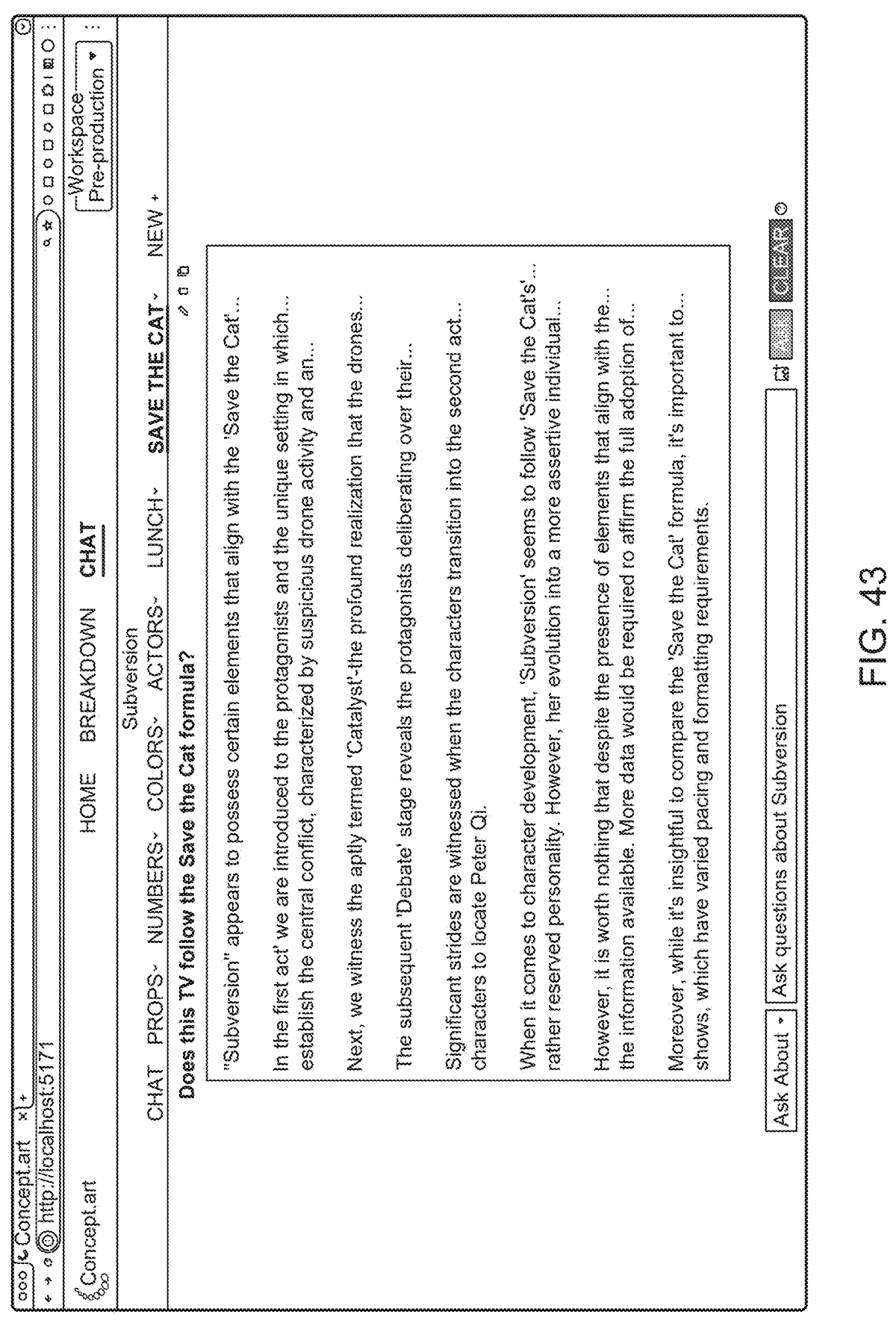

FIG. 43 illustrates an example of a user interface for querying whether content meets certain parameters, according to an implementation. The user interface illustrated in FIG. 43 shows the response to a query of whether content meets the "Save the Cat" formula. One or more systems and models described herein may generate a response based on a semantic understanding of the transcript and the "Save the Cat" formula.

Multi-modal refers to at least different modalities. For example, multi-modal content generation can refer to an ability to create different types of content such as text (including natural language text), visuals, audio, and/or other types of content, either alone or in combination. Similarly, multi-modal inputs can refer to different types of input modalities such as text, visual, audio, and/or other types of inputs.

Training the various models as disclosed herein may include supervised, semi-supervised, and unsupervised techniques. For example, when training models with labeled data, such as for the scene parsing model 129, supervised machine learning techniques may be used. Suitable Models: Several machine learning models can be used for this task, depending on the complexity of your data and desired output. Here are some common choices: Supervised Learning Models: Rule-based Systems: If your data has clear patterns and rules for identifying key-value pairs, rule-based systems can be implemented. Conditional Random Fields (CRFs): These models excel at sequence labeling tasks like identifying named entities within text, which can be useful for parsing key-value pairs. Recurrent Neural Networks (RNNs) and Long Short-Term Memory (LSTMs): These models are powerful for handling sequential data like text and can learn complex relationships between words for accurate parsing. Deep Learning Models: Transformers: This powerful architecture, including models like BERT and RoBERTa, has shown excellent performance in various NLP tasks, including text parsing. Model Training: Splitting Data: Divide your labeled data into training, validation, and testing sets. The training set is used to train the model, the validation set helps fine-tune hyperparameters, and the testing set evaluates the model's final performance on unseen data. Hyperparameter Tuning: Adjust hyperparameters (learning rate, batch size, etc.) of the chosen model to optimize its performance on the validation set. Training the Model: Train the model on the training data. The model learns to identify patterns and relationships within the labeled data to predict the corresponding JSON structure for new, unseen text. Evaluation and Refinement. Testing and Evaluation: Evaluate the model's performance on the testing set using metrics like accuracy (percentage of correctly parsed documents) and F1-score (harmonic mean of precision and recall). Error Analysis and Refinement: Analyze errors made by the model and identify areas for improvement. This may involve collecting more labeled data or refining the model architecture/hyperparameters. Additional Considerations: Handling Ambiguity: Unstructured text can be ambiguous. Define clear guidelines for handling cases where the structure might be unclear or conflicting information exists. Model Explainability: For complex models like LSTMs and Transformers, consider techniques to understand how the model arrives at its predictions, especially in case of errors. Continuous Learning: As you acquire new data, consider retraining the model to improve its accuracy and adaptability over time. By following these steps and considering the additional points, you can train a model to effectively parse unstructured text into structured JSON using labeled data. Remember, the quality and quantity of your labeled data will significantly impact the model's performance.

To ingest the unstructured content 102 (such as transcripts or other content), the computer system 110 may use the system API 113 to provide upload capabilities for client devices 104. This data upload or access may be made via Java Database Connectivity (JDBC), Representational state transfer (RESTful) services, Simple Mail Transfer Protocol (SMTP) protocols, direct file upload, and/or other file transfer services or techniques. In particular, the system API 113 may include a MICROSOFT SHAREPOINT API Connector, an Hyper Text Transfer Protocol (HTTP)/HTTP-secure (HTTPS), a Network Drive Connector, a File Transfer Protocol (FTP) Connector, SMTP Artifact Collector, Object Store Connector, MICROSOFT ONEDRIVE Connector, GOOGLE DRIVE Connector, DROPBOX Connector, and/ or other types of connector interfaces.

The computer system 110 and the one or more client devices 104 may be connected to one another via a communication network (not illustrated), such as the Internet or the Internet in combination with various other networks, like local area networks, cellular networks, or personal area networks, internal organizational networks, and/or other networks. It should be noted that the computer system 110 may transmit data, via the communication network, conveying the predictions to one or more of the client devices 104. The data conveying the predictions may be a user interface generated for display at the one or more client devices 104, one or more messages transmitted to the one or more client devices 104, and/or other types of data for transmission. Although not shown, the one or more client devices 104 may each include one or more processors.

Processor 112 may be programmed to execute one or more computer program components. The computer program components may include software programs and/or algorithms coded and/or otherwise embedded in the processor 112. The one or more computer program components or features may include various subsystems such as the platform system 120, the content parsing system 130, the generative content system 140, the semantic summarization system 150, the self-correcting generative system 160, the interface system 170, and/or other components.

Processor 112 may be configured to execute or implement 120, 130, 140, 150, 160, 170, and 180 by software; hardware; firmware; some combination of software, hardware, and/or firmware; and/or other mechanisms for configuring processing capabilities on processor 112. It should be appreciated that although 120, 130, 140, 150, 160, 170, and 180 are illustrated in FIG. 1 as being co-located in the computer system 110, one or more of the components or features 120, 130, 140, 150, 160, 170, and 180 may be located remotely from the other components or features. The description of the functionality provided by the different components or features 120, 130, 140, and 150 described below is for illustrative purposes, and is not intended to be limiting, as any of the components or features 120, 130, 140, 150, 160, 170, and 180 may provide more or less functionality than is described, which is not to imply that other descriptions are limiting. For example, one or more of the components or features 120, 130, 140, 150, 160, and 170 may be eliminated, and some or all of its functionality may be provided by others of the components or features 120, 130, 140, 150, 160, 170, and 180, again which is not to imply that other descriptions are limiting. As another example, processor 112 may include one or more additional components that may perform some or all of the functionality attributed below to one of the components or features 120, 130, 140, 150, 160, 170, and 180.

Each of the computer system 110 and client devices 104 may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

The databases and data stores (such as 101, 103, 105, 107) may be, include, or interface to, for example, an ORACLE relational database sold commercially by ORACLE Corporation. Other databases, such as INFORMIX, DB2 or other data storage, including file-based, or query formats, platforms, or resources such as OLAP (On Line Analytical Processing), SQL (Structured Query Language), a SAN (storage area network), MICROSOFT ACCESS or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or custom data described herein.

The preceding uses the term LLM. Large language models or LLMs are trained on many different kinds of data and information and similarly, can output many different kinds of data and information. With input, training, and/or modeling, it is understood and appreciated that an LLM can change and be modified and may be called by other names.

Although the foregoing has been described in detail for the purpose of illustration, it is to be understood that such detail is solely for that purpose and that the present patent application is not limited to the disclosed embodiments or implementations, but, on the contrary, is intended to cover modifications and equivalent arrangements. In addition, it is to be understood that the present patent application contemplates that, to the extent possible, one or more features or functions of any embodiment or implementation can be combined with one or more features or functions of any other. Furthermore, the systems and processes described and taught in the foregoing are not limited to the specific implementations or embodiments described herein. In addition, components of each system and each process can be practiced independently and separate from other components and processes described herein. Each component and process can also be used in combination with other assembly packages, processes, implementations, or embodiments. The flow charts and descriptions thereof should be understood to not prescribe a fixed order of performing the method blocks described therein. Rather the method blocks may be performed in any order that is practicable including simultaneous performance of at least some method blocks. Furthermore, each of the methods may be performed by one or more of the system features illustrated in FIG. 1.

The foregoing implementations and embodiments have been provided for the purposes of illustration and description. They are not intended to be exhaustive or to limit what is disclosed to the precise forms disclosed. Obviously, many modifications and variations will be apparent to practitioners skilled in this art. In particular, and without limitation, any and all variations described, suggested by this patent application or by the material incorporated by reference are specifically incorporated by reference into the description herein of the embodiments or implementations of the invention. In addition, any and all variations described, suggested, or incorporated by reference herein with respect to any one embodiment or implementation are also to be considered taught with respect to all others. The descriptions herein were chosen and provided to best explain the principles and practical applications, thereby enabling others skilled in the art to understand the invention for various embodiments and implementations and with various modifications as are suited to the particular use contemplated.

In some aspects, the techniques described herein relate to a system, including: a content repository configured to store a multi-modal content including text, visual content, and/or audio content; a processor programmed to: access a prompt including a text query that describes text to be found, a visual query including text that describes a visual to be found, and/or an audio query including text that describes audio to be found; execute a language model based on the prompt to identify content from the content repository; receive, from the language model, a request for a callback function that seeks additional information to satisfy the multi-modal query; execute the callback function to obtain the additional information and provide the additional information to the language model in response to the request for the callback function; re-execute the language model based on the multi-modal query and the additional information; obtain, from the language model, content responsive to the prompt based on the additional information.

In some aspects, the techniques described herein relate to a system, wherein the callback function includes a clarify function that includes an instruction to clarify the prompt or obtain additional information about the content being requested.

In some aspects, the techniques described herein relate to a system, wherein the callback function includes a function to perform a computation.

In some aspects, the techniques described herein relate to a system, wherein the processor is further programmed to: access a user profile associated with a user for which the content is to be found; and provide at least a portion of the user profile to the language model, wherein the language model uses the portion of the user profile as context to identify the content from the content repository, wherein different user profiles result in different content identified from the content repository.

In some aspects, the techniques described herein relate to a system, wherein the portion of the user profile defines a role of the user, and wherein the processor is programmed to identify the content based on the role of the user such that, given the same prompt, different content is identified based on the role of the user.

In some aspects, the techniques described herein relate to a system, wherein the portion of the user profile defines a preference of the user, and wherein the processor is programmed to identify the content based on the preference of the user such that, given the same prompt, different content is identified based on the preference of the user.

In some aspects, the techniques described herein relate to a system, wherein the processor is further programmed to: retrieve, at periodic intervals, the prompt; and perform, at the periodic intervals, a recurring search based on the prompt.

In some aspects, the techniques described herein relate to a system, wherein the processor is further programmed to: access a request to provide a timeline that identifies an order in which one or more objects or entities appear in the content; generate a prompt requesting the timeline; execute the language model with the prompt; and generate the timeline based on the executed language model.

In some aspects, the techniques described herein relate to a system, wherein the processor is further programmed to: store the content in a buffer while the content is being obtained from the language model; and begin transmitting the content only when the content is obtained and stored in the buffer.

In some aspects, the techniques described herein relate to a method, including: accessing a prompt including a text query that describes text to be found, a visual query including text that describes a visual to be found, and/or an audio query including text that describes audio to be found; executing a language model based on the prompt to identify content from a content repository; receiving, from the language model, a request for a callback function that seeks additional information to satisfy the multi-modal query; executing the callback function to obtain the additional information and provide the additional information to the language model in response to the request for the call function; re-executing the language model based on the multi-modal query and the additional information; obtaining, from the language model, content responsive to the prompt based on the additional information.

In some aspects, the techniques described herein relate to a method, wherein the callback function includes a clarify function that includes an instruction to clarify the prompt or obtain additional information about the content being requested.

In some aspects, the techniques described herein relate to a method, wherein the callback function includes a function to perform a computation.

In some aspects, the techniques described herein relate to a method, further including: accessing a user profile associated with a user for which the content is to be found; and providing at least a portion of the user profile to the language model, wherein the language model uses the portion of the user profile as context to identify the content from the content repository, wherein different user profiles result in different content identified from the content repository.

In some aspects, the techniques described herein relate to a method, wherein the portion of the user profile defines a role of the user, and wherein the processor is programmed to identify the content based on the role of the user such that, given the same prompt, different content is identified based on the role of the user.

In some aspects, the techniques described herein relate to a method, wherein the portion of the user profile defines a preference of the user, and wherein the processor is programmed to identify the content based on the preference of the user such that, given the same prompt, different content is identified based on the preference of the user.

In some aspects, the techniques described herein relate to a method, further including: retrieving, at periodic intervals, the prompt; and performing, at the periodic intervals, a recurring search based on the prompt.

In some aspects, the techniques described herein relate to a method, further including: accessing a request to provide a timeline that identifies an order in which one or more objects or entities appear in the content; generating a prompt requesting the timeline; executing the language model with the prompt; and generating the timeline based on the executed language model.

In some aspects, the techniques described herein relate to a method, further including: storing the content in a buffer while the content is being obtained from the language model; and begin transmitting the content only when the content is obtained and stored in the buffer.

In some aspects, the techniques described herein relate to a non-transitory computer readable medium storing instructions that, when executed by a processor, programs the processor to: receive a multi-modal query including a text query that describes text to be found, a visual query including text that describes a visual to be found, and/or an audio query including text that describes audio to be found; identify content, from a content repository, based on the multi-modal query, the identified content including: (i) text that is semantically similar to the semantic query, (ii) visual content that matches a text description of a visual to be found, and/or (iii) audio content that matches an audio description of the visual to be found; and transmit the content responsive to the multi-modal query.

In some aspects, the techniques described herein relate to a non-transitory computer readable medium, wherein the instructions, when executed by the processor, further program the processor to: access a user profile associated with a user for which the content is to be found; and provide at least a portion of the user profile to the language model, wherein the language model uses the portion of the user profile as context to identify the content from the content repository, wherein different user profiles result in different content identified from the content repository.

In some aspects, the techniques described herein relate to a system for multi-pass summarization, including: a processor programmed to: access a request to summarize content; in a first pass, from among the multi-pass summarization: divide the content into a plurality of chunks; for each chunk, from among the plurality of chunks: execute a language model with the chunk and an instruction to summarize the chunk; generate, based on the executed language model, a summary of the chunk; in a subsequent pass, from among the multi-pass summarization: generate a plurality of groups of summaries, each group of summaries from among the plurality of groups of summaries including two or more summaries, each summary corresponding to a respective chunk; for each group of summaries from among the plurality of groups: execute a language model with the group of summaries and an instruction to summarize the group of summaries; generate, based on the executed language model on the group of summaries, a group summary; and iteratively repeat the subsequent pass for group summaries until a summary of the content is reached.

In some aspects, the techniques described herein relate to a system, wherein the processor is further programmed to: access a guardrail template for the content, the guardrail template including one or more delimiters for specific portions of the content to summarize; and generate the summary within one or more delimiters for the specific portions of the content, wherein the one or more delimiters prevent summarization across overlapping portions of the content to reduce artificial intelligence hallucination.

In some aspects, the techniques described herein relate to a system, wherein each chunk has a respective portion of the content.

In some aspects, the techniques described herein relate to a system, wherein a logical chunk does not overlap with a neighboring chunk to generate a respective summary for the logical chunk that is not influenced by the neighboring chunk for artificial intelligence hallucination mitigation.

In some aspects, the techniques described herein relate to a system, wherein the content includes a transcript and each logical chunk corresponds to a scene in the transcript.

In some aspects, the techniques described herein relate to a system, wherein the processor is further programmed to: execute a scene parsing model that is trained to convert unstructured content in the transcript into a structured format for summarization.

In some aspects, the techniques described herein relate to a system, wherein the processor is further programmed to: select one or more language models for the summarization based on one or more parameters.

In some aspects, the techniques described herein relate to a system, wherein the one or more parameters include: a context window size, a cost, a speed, a current load, a level of network congestion, and/or a system capability.

In some aspects, the techniques described herein relate to a system, wherein the processor is further programmed to: execute a harmonization pass on at least two groups of summaries to harmonize the at least two groups of summaries with respect to one another.

In some aspects, the techniques described herein relate to a method, including: accessing a request to summarize content; in a first pass, from among the multi-pass summarization: dividing the content into a plurality of chunks; for each chunk, from among the plurality of chunks: executing a language model with the chunk and an instruction to summarize the chunk; generating, based on the executed language model, a summary of the chunk; in a subsequent pass, from among the multi-pass summarization: generating a plurality of groups of summaries, each group of summaries from among the plurality of groups of summaries including two or more summaries, each summary corresponding to a respective chunk; for each group of summaries from among the plurality of groups: executing a language model with the group of summaries and an instruction to summarize the group of summaries; generating, based on the executed language model on the group of summaries, a group summary; and iteratively repeating the subsequent pass for group summaries until a summary of the content is reached.

In some aspects, the techniques described herein relate to a method, further including: accessing a guardrail template for the content, the guardrail template including one or more delimiters for specific portions of the content to summarize; and generating the summary within one or more delimiters for the specific portions of the content, wherein the one or more delimiters prevent summarization across overlapping portions of the content to reduce artificial intelligence hallucination.

In some aspects, the techniques described herein relate to a method, wherein each chunk has a respective portion of the content.

In some aspects, the techniques described herein relate to a method, wherein a logical chunk does not overlap with a neighboring chunk to generate a respective summary for the logical chunk that is not influenced by the neighboring chunk for artificial intelligence hallucination mitigation.

In some aspects, the techniques described herein relate to a method, wherein the content includes a transcript and each logical chunk corresponds to a scene in the transcript.

In some aspects, the techniques described herein relate to a method, further including: executing a scene parsing model that is trained to convert unstructured content in the transcript into a structured format for summarization.

In some aspects, the techniques described herein relate to a method, further including: selecting one or more language models for the summarization based on one or more parameters.

In some aspects, the techniques described herein relate to a method, wherein the one or more parameters include: a context window size, a cost, a speed, a current load, a level of network congestion, and/or a system capability.

In some aspects, the techniques described herein relate to a method, further including: executing a harmonization pass on at least two groups of summaries to harmonize the at least two groups of summaries with respect to one another.

In some aspects, the techniques described herein relate to a non-transitory computer readable medium storing instructions for multi-pass summarization, the instructions, when executed by a processor, programs the processor to: access a request to summarize content; in a first pass, from among the multi-pass summarization: divide the content into a plurality of chunks; for each chunk, from among the plurality of chunk execute a language model with the chunk and an instruction to summarize the chunk; generate, based on the executed language model, a summary of the chunk; in a subsequent pass, from among the multi-pass summarization: generate a plurality of groups of summaries, each group of summaries from among the plurality of groups of summaries including two or more summaries, each summary corresponding to a respective chunk; for each group of summaries from among the plurality of groups: execute a language model with the group of summaries and an instruction to summarize the group of summaries; generate, based on the executed language model on the group of summaries, a group summary; and iteratively repeat the subsequent pass for group summaries until a summary of the content is reached.

In some aspects, the techniques described herein relate to a non-transitory computer readable medium, wherein the instructions, when executed, further program the processor to: access a guardrail template for the content, the guardrail template including one or more delimiters for specific portions of the content to summarize; and generate the summary within one or more delimiters for the specific portions of the content, wherein the one or more delimiters prevent summarization across overlapping portions of the content to reduce artificial intelligence hallucination.

In some aspects, the techniques described herein relate to a system, including: a processor programmed to: access content including text content, visual content, and/or audio content; perform, based on a harmonization model and/or consistency model, a harmonization check and/or a consistency check on the content; recognize, based on the harmonization check and/or the consistency check, a conflict to be corrected; identify a property of the content that should be changed based on the recognized conflict; and generate a corrective action based on the property of the content that should be changed.

In some aspects, the techniques described herein relate to a system, wherein the content includes multi-modal content and wherein to recognize the conflict to be corrected, the processor is programmed to: identify an inconsistency between text in the multi-modal content and a visual in the multi-modal content.

In some aspects, the techniques described herein relate to a system, wherein the content includes multi-modal content and wherein to recognize the conflict to be corrected, the processor is programmed to: identify an inconsistency between a first visual in the multi-modal content and a second visual in the multi-modal content.

In some aspects, the techniques described herein relate to a system, wherein the content includes a prompt for input to a language model, and wherein to recognize the conflict, the processor is programmed to: identify an inconsistency between one or more first words in the prompt and one or more second words in the prompt.

In some aspects, the techniques described herein relate to a system, wherein to generate a corrective action, the processor is programmed to: generate a recommendation to modify the prompt based on recognized conflict.

In some aspects, the techniques described herein relate to a system, wherein to generate a corrective action, the processor is programmed to: modify the prompt based on recognized conflict.

In some aspects, the techniques described herein relate to a system, wherein the content includes a prompt for input to a language model, and wherein to recognize the conflict, the processor is programmed to: identify an inconsistency between one or more words in the prompt and one or more words in a previous prompt.

In some aspects, the techniques described herein relate to a system, wherein to generate a corrective action, the processor is programmed to: generate a recommendation to modify the prompt based on recognized conflict.

In some aspects, the techniques described herein relate to a system, wherein to generate a corrective action, the processor is programmed to: modify the prompt based on recognized conflict.

In some aspects, the techniques described herein relate to a system, wherein to recognize the conflict to be corrected, the processor is programmed to: identify and store an object in the content; and determine a difference between a first version of the object and a second version of the object, wherein the difference indicates the conflict to be corrected.

In some aspects, the techniques described herein relate to a system, wherein to recognize the conflict to be corrected, the processor is programmed to: identify and store an object in the content; and generate a first embedding for the object at a first time; generate a second embedding for the object at a second time; and determine a difference between the first embedding and the second embedding, wherein the difference indicates the conflict to be corrected.

In some aspects, the techniques described herein relate to a system, wherein to identify and store the object in the content, the processor is programmed to: store the object in a graph database that includes one or more other objects in a timeline of the content.

In some aspects, the techniques described herein relate to a system, wherein to identify a property of the content that should be changed based on the recognized conflict, the processor is further programmed to: determine a first mood of a first portion of the content; determine a second mood of a second portion of the content; determine that the first mood and the second mood conflict with one another; wherein to generate the corrective action, the processor is programmed to: modify the first portion and/or the second portion so that the first mood is consistent with the second mood.

In some aspects, the techniques described herein relate to a system, wherein the first portion includes first text and the second portion includes second text, and wherein the processor is further programmed to: determine the first mood based on the first text; and determine the second mood based on the second text.

In some aspects, the techniques described herein relate to a system, wherein the first portion includes text and the second portion includes an image, and wherein the processor is further programmed to: determine the first mood based on the text; and determine the second mood based on the image.

In some aspects, the techniques described herein relate to a method, including: accessing content including text content, visual content, and/or audio content; performing, based on a harmonization model and/or consistency model, a harmonization check and/or a consistency check on the content; recognizing, based on the harmonization check and/or the consistency check, a conflict to be corrected; identifying a property of the content that should be changed based on the recognized conflict; and generating a corrective action based on the property of the content that should be changed.

In some aspects, the techniques described herein relate to a method, wherein the content includes multi-modal content and wherein recognizing the conflict to be corrected includes: identifying an inconsistency between text in the multi-modal content and a visual in the multi-modal content.

In some aspects, the techniques described herein relate to a method, wherein the content includes multi-modal content and wherein recognizing the conflict to be corrected includes: identifying an inconsistency between a first visual in the multi-modal content and a second visual in the multi-modal content.

In some aspects, the techniques described herein relate to a non-transitory computer readable medium storing instructions that, when executed by a processor, programs the processor to: access content including text content, visual content, and/or audio content; perform, based on a harmonization model and/or consistency model, a harmonization check and/or a consistency check on the content; recognize, based on the harmonization check and/or the consistency check, a conflict to be corrected; identify a property of the content that should be changed based on the recognized conflict; and generate a corrective action based on the property of the content that should be changed.

In some aspects, the techniques described herein relate to a non-transitory computer readable medium, wherein the content includes multi-modal content and wherein to recognize the conflict to be corrected, and wherein the instructions, when executed by the processor, further program the processor to: identify an inconsistency between text in the multi-modal content and a visual in the multi-modal content.

In some aspects, the techniques described herein relate to a system, including: a processor programmed to: receive, during iterative content generation, a first user input; identify a context associated with the first user input; execute, based on the user input and the identified context, a language model trained to generate text and/or an image model trained to generate images; generate, as an output of the language model and/or the image model, content based on the user input and the identified context; receive, during the iterative content generation, a second user input; and modify, by the language model and/or the image model, the content based on the second user input.

In some aspects, the techniques described herein relate to a system, wherein the second user input includes a request to recommend changes to the content, and wherein to modify the content, the processor is programmed to: generate a suggestion based on the content and the request to change the content.

In some aspects, the techniques described herein relate to a system, wherein the first user input includes text and the generated content includes text an image based on the first user input.

In some aspects, the techniques described herein relate to a system, wherein the first user input includes an image and the content to be changed includes text that describes the image, wherein the processor is programmed to: generate a first instruction, for input to an image model, to describe the image; execute the image model with the image and the instruction to generate the text that describes the image; generate a second instruction, for input to the language model, to generate text based on the text that describes the image, wherein the content includes the text generated by the language model.

In some aspects, the techniques described herein relate to a system, wherein the first user input includes an image and the content to be changed includes text that describes the image, wherein the processor is programmed to: generate an instruction, for input to an image model, to describe the image; and execute the image model with the image and the instruction to generate the text that describes the image.

In some aspects, the techniques described herein relate to a system, wherein the first user input includes an image of a pose, and wherein to generate the content, the processor is programmed to: generate an image of a character in the content that matches the pose.

In some aspects, the techniques described herein relate to a system, wherein the first user input includes an image of a face having a facial expression, and wherein to generate the content, the processor is programmed to: generate an image of a character in the content that matches the facial expression.

In some aspects, the techniques described herein relate to a system, wherein the first user input includes audio, and wherein to generate the content, the processor is programmed to: generate audio output for the content that matches based on the audio of the first user input.

In some aspects, the techniques described herein relate to a system, wherein the context includes an area of focus on an interface of the user making the request.

In some aspects, the techniques described herein relate to a system, wherein the context for the second user input includes the content generated in response to the first user input.

In some aspects, the techniques described herein relate to a system, wherein the processor is further programmed to: receive a query input for searching the content; and retrieve at least a portion of the content based on the query input.

In some aspects, the techniques described herein relate to a system, wherein the processor is further programmed to: receive a request to summarize the content; and generate a summary of the content.

In some aspects, the techniques described herein relate to a system, wherein the processor is further programmed to conduct a consistency check between the content generated in response to the first user input and the content generated in response to the first second input.

In some aspects, the techniques described herein relate to a system, wherein the processor is further programmed to conduct a harmonization check between the content generated in response to the first user input and the content generated in response to the first second input.

In some aspects, the techniques described herein relate to a method, including: receiving, during iterative content generation, a first user input; identifying a context associated with the first user input; executing, based on the user input and the identified context, a language model trained to generate text and/or an image model trained to generate images; generating, as an output of the language model and/or the image model, content based on the user input and the identified context; receiving, during the iterative content generation, a second user input; and modifying, by the language model and/or the image model, the content based on the second user input.

In some aspects, the techniques described herein relate to a method, wherein the second user input includes a request to recommend changes to the content, and wherein modifying the content includes: generating a suggestion based on the content and the request to change the content.

In some aspects, the techniques described herein relate to a method, wherein the first user input includes text and the generated content includes text based on the first user input.

In some aspects, the techniques described herein relate to a method, wherein the first user input includes an image and the content to be changed includes text that describes the image, the method further including: generating a first instruction, for input to an image model, to describe the image; executing the image model with the image and the instruction to generate the text that describes the image; generating a second instruction, for input to the language model, to generate text based on the text that describes the image, wherein the content includes the text generated by the language model.

In some aspects, the techniques described herein relate to a non-transitory computer readable medium storing instructions that, when executed by a processor, programs the processor to: receive, during iterative content generation, a first user input; identify a context associated with the first user input; execute, based on the user input and the identified context, a language model trained to generate text and/or an image model trained to generate images; generate, as an output of the language model and/or the image model, content based on the user input and the identified context; receive, during the iterative content generation, a second user input; and modify, by the language model and/or the image model, the content based on the second user input.

In some aspects, the techniques described herein relate to a non-transitory computer readable medium, wherein the first user input includes an image and the content to be changed includes text that describes the image, and wherein the instructions, when executed by the processor, further program the processor to: generate a first instruction, for input to an image model, to describe the image; execute the image model with the image and the instruction to generate the text that describes the image; generate a second instruction, for input to the language model, to generate text based on the text that describes the image, wherein the content includes the text generated by the language model.

This written description uses examples to disclose the implementations and embodiments and to enable any person skilled in the art to practice them, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
a content repository configured to store multi-modal content comprising text, visual content, and/or audio content;
a processor programmed to:
access a prompt comprising a multi-modal query that describes text to be found, a visual query comprising text that describes a visual to be found, and/or an audio query comprising text that describes audio to be found;
execute a language model based on the prompt to identify content from the content repository;
receive, from the language model, a request for a callback function that seeks additional information to satisfy the multi-modal query, the language model making the request for the callback function to seek clarity regarding the multi-modal query;
execute the callback function to obtain the additional information and provide the additional information to the language model in response to the request for the callback function, wherein to execute the callback function, the processor is further programmed to dynamically obtain contextual information specific to the multi-modal query;
automatically generate, by a prompt generator, a new input for the language model based on the multi-modal query and the contextual information;
re-execute the language model based on the new input; and
obtain, from the language model, content responsive to the prompt based on the additional information.

2. The system of claim 1, wherein the callback function comprises a clarify function that includes an instruction to clarify the prompt or obtain additional information about the content being requested.

3. The system of claim 1, wherein the callback function comprises a function to perform a computation.

4. The system of claim 1, wherein the processor is further programmed to:
access a user profile associated with a user for which the content is to be found; and
provide at least a portion of the user profile to the language model, wherein the language model uses the portion of the user profile as context to identify the content from the content repository, wherein different user profiles result in different content identified from the content repository.

5. The system of claim 4, wherein the portion of the user profile defines a role of the user, and wherein the processor is programmed to identify the content based on the role of the user such that, given a same prompt, different content is identified based on the role of the user.

6. The system of claim 4, wherein the portion of the user profile defines a preference of the user, and wherein the processor is programmed to identify the content based on the preference of the user such that, given a same prompt, different content is identified based on the preference of the user.

7. The system of claim 1, wherein the processor is further programmed to:
retrieve, at periodic intervals, the prompt; and
perform, at the periodic intervals, a recurring search based on the prompt.

8. The system of claim 1, wherein the processor is further programmed to:
access a request to provide a timeline that identifies an order in which one or more objects or entities appear in the content;
generate a prompt requesting the timeline;
execute the language model with the prompt; and
generate the timeline based on the executed language model.

9. The system of claim 1, wherein the processor is further programmed to:
store the content in a buffer while the content is being obtained from the language model; and
begin transmitting the content only when the content is obtained and stored in the buffer.

10. A method, comprising:
accessing a prompt comprising a multi-modal query that describes text to be found, a visual query comprising text that describes a visual to be found, and/or an audio query comprising text that describes audio to be found;
executing a language model based on the prompt to identify content from a content repository;
receiving, from the language model, a request for a callback function that seeks additional information to satisfy the multi-modal query, the language model making the request for the callback function to seek clarity regarding the multi-modal query;
executing the callback function to obtain the additional information and provide the additional information to the language model in response to the request for the callback function, wherein executing the callback function comprises dynamically obtaining contextual information specific to the multi-modal query;
automatically generating, by a prompt generator, a new input for the language model based on the multi-modal query and the contextual information;
re-executing the language model based on the new input; and
obtaining, from the language model, content responsive to the prompt based on the additional information.

11. The method of claim 10, wherein the callback function comprises a clarify function that includes an instruction to clarify the prompt or obtain additional information about the content being requested.

12. The method of claim 10, wherein the callback function comprises a function to perform a computation.

13. The method of claim 10, further comprising:
accessing a user profile associated with a user for which the content is to be found; and
providing at least a portion of the user profile to the language model, wherein the language model uses the portion of the user profile as context to identify the content from the content repository, wherein different user profiles result in different content identified from the content repository.

14. The method of claim 13, wherein the portion of the user profile defines a role of the user, the method further comprising: identifying the content based on the role of the user such that, given a same prompt, different content is identified based on the role of the user.

15. The method of claim 13, wherein the portion of the user profile defines a preference of the user, and wherein the processor is programmed to identify the content based on the preference of the user such that, given a same prompt, different content is identified based on the preference of the user.

16. The method of claim 10, further comprising:
retrieving, at periodic intervals, the prompt;
and performing, at the periodic intervals, a recurring search based on the prompt.

17. The method of claim 10, further comprising:
accessing a request to provide a timeline that identifies an order in which one or more objects or entities appear in the content;
generating a prompt requesting the timeline;
executing the language model with the prompt;
and generating the timeline based on the executed language model.

18. The method of claim 10, further comprising:
storing the content in a buffer while the content is being obtained from the language model;
and begin transmitting the content only when the content is obtained and stored in the buffer.

19. A non-transitory computer readable medium storing instructions that, when executed by a processor, programs the processor to:
receive a multi-modal query comprising a multi-modal query that describes text to be found, a visual query comprising text that describes a visual to be found, and/or an audio query comprising text that describes audio to be found;
receive, from a language model, a request for a callback function that seeks additional information to satisfy the multi-modal query, the language model making the request for the callback function to seek clarity regarding the multi-modal query;
execute the callback function to obtain the additional information and provide the additional information to the language model in response to the request for the callback function, wherein to execute the callback function, the processor is further programmed to dynamically obtain contextual information specific to the multi-modal query;
automatically generate, by a prompt generator, a new input for the language model based on the multi-modal query and the contextual information;
identify content, from a content repository, based on the new input, the identified content comprising: (i) text based on a semantic similarity match to the multi-modal query, (ii) visual content that matches a text description of a visual to be found, and/or (iii) audio content that matches an audio description of the visual to be found; and
transmit the content responsive to the multi-modal query.

20. The non-transitory computer readable medium of claim 19, wherein the instructions, when executed by the processor, further program the processor to:
access a user profile associated with a user for which the content is to be found; and
provide at least a portion of the user profile to the language model, wherein the language model uses the portion of the user profile as context to identify the content from the content repository, wherein different user profiles result in different content identified from the content repository.

* * * * *